United States Patent
Yurt et al.

(10) Patent No.: US 7,730,512 B2
(45) Date of Patent: Jun. 1, 2010

(54) AUDIO AND VIDEO TRANSMISSION AND RECEIVING SYSTEM

(75) Inventors: Paul Yurt, Scottsdale, AZ (US); H. Lee Browne, Greenwich, CT (US)

(73) Assignee: Acacia Media Technologies Corporation, Newport Beach, CA (US)

( * ) Notice: Subject to any disclaimer, the term of this patent is extended or adjusted under 35 U.S.C. 154(b) by 789 days.

(21) Appl. No.: 11/414,699

(22) Filed: Apr. 28, 2006

(65) Prior Publication Data

US 2006/0271976 A1 Nov. 30, 2006

Related U.S. Application Data

(60) Continuation of application No. 10/274,242, filed on Oct. 17, 2002, now abandoned, which is a continuation of application No. 09/651,115, filed on Aug. 30, 2000, now abandoned, which is a continuation of application No. 09/120,452, filed on Jul. 23, 1998, now Pat. No. 6,144,702, which is a division of application No. 08/630,590, filed on Apr. 10, 1996, now Pat. No. 6,002,720, which is a continuation of application No. 08/133,982, filed on Oct. 8, 1993, now Pat. No. 5,550,863, which is a continuation of application No. 07/862,508, filed on Apr. 2, 1992, now Pat. No. 5,253,275, which is a continuation of application No. 07/637,562, filed on Jan. 7, 1991, now Pat. No. 5,132,992.

(51) Int. Cl.
*H04N 7/20* (2006.01)
*H04N 7/173* (2006.01)

(52) U.S. Cl. .............................. 725/93; 725/89; 725/90; 725/105; 725/63

(58) Field of Classification Search ........... 725/86–104, 725/63, 105
See application file for complete search history.

(56) References Cited

U.S. PATENT DOCUMENTS

| | | | |
|---|---|---|---|
| 3,278,677 A | 10/1966 | Fannoy | |
| 3,586,767 A | 6/1971 | Morchand | |
| 3,597,692 A | 8/1971 | Fannoy | |
| 3,599,178 A | 8/1971 | Jackson et al | |

(Continued)

FOREIGN PATENT DOCUMENTS

EP 0 309 298 A2 3/1989

(Continued)

OTHER PUBLICATIONS

Mourad, M.M. Some Issues in the Implementation of Multimedia Communication Systems, Oct. 2, 1990, entire document.*

(Continued)

*Primary Examiner*—Hunter B. Lonsberry
(74) *Attorney, Agent, or Firm*—Martin & Ferraro, LLP

(57) ABSTRACT

A system of distributing video and/or audio information employs digital signal processing to achieve high rates of data compression. The compressed and encoded audio and/or video information is sent over standard telephone, cable or satellite broadcast channels to a receiver specified by a subscriber of the service, preferably in less than real time, for later playback and optional recording on standard audio and/or video tape.

12 Claims, 12 Drawing Sheets

U.S. PATENT DOCUMENTS

| | | |
|---|---|---|
| 3,609,227 A | 9/1971 | Kuljian |
| 3,673,318 A | 6/1972 | Olsen et al. |
| 3,720,791 A | 3/1973 | Yada et al. |
| 3,725,874 A | 4/1973 | Van Heel |
| 3,729,581 A | 4/1973 | Anderson |
| 3,746,780 A | 7/1973 | Stetten et al. |
| 3,790,700 A | 2/1974 | Callais et al. |
| 3,825,899 A | 7/1974 | Haeberle et al. |
| 3,836,888 A | 9/1974 | Boenke et al. |
| 3,886,302 A | 5/1975 | Kosco |
| 3,919,462 A | 11/1975 | Hartung et al. |
| 3,938,189 A | 2/1976 | Goldmark |
| 3,990,710 A | 11/1976 | Hughes |
| 4,009,344 A | 2/1977 | Flemming |
| 4,009,346 A | 2/1977 | Parker et al. |
| 4,028,733 A | 6/1977 | Ulicki |
| 4,058,672 A | 11/1977 | Crager et al. |
| 4,062,043 A | 12/1977 | Zeidler et al. |
| 4,071,697 A | 1/1978 | Bushnell et al. |
| 4,091,242 A | 5/1978 | Carrubba et al. |
| 4,122,299 A | 10/1978 | Cannon |
| 4,124,773 A | 11/1978 | Elkins |
| 4,135,202 A | 1/1979 | Cutler |
| 4,163,254 A | 7/1979 | Block et al. |
| 4,179,709 A | 12/1979 | Workman |
| 4,183,054 A | 1/1980 | Patisaul et al. |
| 4,206,316 A | 6/1980 | Burnsweig et al. |
| 4,216,354 A | 8/1980 | Esteban et al. |
| 4,232,295 A | 11/1980 | McConnell |
| 4,245,245 A | 1/1981 | Matsumoto et al. |
| 4,247,106 A | 1/1981 | Jeffers et al. |
| 4,251,691 A | 2/1981 | Kakihara et al. |
| 4,264,925 A | 4/1981 | Freeman et al. |
| 4,266,243 A | 5/1981 | Shutterly |
| 4,280,139 A | 7/1981 | Mogi et al. |
| 4,295,154 A | 10/1981 | Hata et al. |
| 4,302,775 A | 11/1981 | Widergren et al. |
| 4,308,558 A | 12/1981 | Hernandez et al. |
| 4,318,126 A | 3/1982 | Sassler |
| 4,333,110 A | 6/1982 | Faerber et al. |
| 4,337,483 A | 6/1982 | Guillou |
| 4,354,201 A | 10/1982 | Sechet et al. |
| 4,361,851 A | 11/1982 | Asip et al. |
| 4,381,522 A | 4/1983 | Lambert |
| 4,388,643 A | 6/1983 | Aminetzah |
| 4,394,774 A | 7/1983 | Widergren et al. |
| 4,400,717 A | 8/1983 | Southworth et al. |
| 4,422,093 A | 12/1983 | Pargee, Jr. |
| 4,446,490 A | 5/1984 | Hoshimi et al. |
| 4,450,477 A | 5/1984 | Lovett |
| 4,455,570 A | 6/1984 | Saeki et al. |
| 4,484,217 A | 11/1984 | Block et al. |
| 4,488,179 A | 12/1984 | Krüger et al. |
| 4,499,568 A | 2/1985 | Gremillet |
| 4,504,852 A | 3/1985 | Ducret |
| 4,506,387 A | 3/1985 | Walter |
| 4,513,390 A | 4/1985 | Walter et al. |
| 4,518,989 A | 5/1985 | Yabiki et al. |
| 4,521,806 A | 6/1985 | Abraham |
| 4,528,643 A | 7/1985 | Freeny, Jr. |
| 4,533,936 A | 8/1985 | Tiemann et al. |
| 4,534,054 A | 8/1985 | Maisel |
| 4,538,174 A | 8/1985 | Gargini et al. |
| 4,538,176 A | 8/1985 | Nakajima et al. |
| 4,544,950 A | 10/1985 | Tu |
| 4,546,342 A | 10/1985 | Weaver et al. |
| 4,554,597 A | 11/1985 | Sugiyama et al. |
| 4,567,512 A | 1/1986 | Abraham |
| 4,581,484 A | 4/1986 | Bendig |
| 4,584,603 A | 4/1986 | Harrison |
| 4,590,516 A | 5/1986 | Abraham |
| 4,593,318 A | 6/1986 | Eng et al. |
| 4,597,058 A | 6/1986 | Izumi et al. |
| 4,605,950 A | 8/1986 | Goldberg et al. |
| 4,605,964 A | 8/1986 | Chard |
| 4,631,586 A | 12/1986 | Gennetten et al. |
| 4,636,876 A | 1/1987 | Schwartz |
| 4,665,436 A | 5/1987 | Osborne et al. |
| 4,668,999 A | 5/1987 | De La Cierva, Sr. et al. |
| 4,679,079 A | 7/1987 | Catros et al. |
| 4,680,647 A | 7/1987 | Moriyama |
| 4,682,248 A | 7/1987 | Schwartz |
| 4,683,586 A | 7/1987 | Sakamoto et al. |
| 4,685,003 A | 8/1987 | Westland |
| 4,685,131 A | 8/1987 | Horne |
| 4,688,246 A | 8/1987 | Eilers et al. |
| 4,694,489 A | 9/1987 | Frederiksen |
| 4,694,490 A | 9/1987 | Harvey et al. |
| 4,695,883 A | 9/1987 | Chandler et al. |
| 4,698,664 A | 10/1987 | Nicholas et al. |
| 4,703,348 A | 10/1987 | Yuasa et al. |
| 4,703,355 A | 10/1987 | Cooper |
| 4,704,628 A | 11/1987 | Chen et al. |
| 4,704,629 A | 11/1987 | Vreeswijk et al. |
| 4,704,725 A | 11/1987 | Harvey et al. |
| 4,706,109 A | 11/1987 | Murray |
| 4,706,121 A | 11/1987 | Young |
| 4,709,418 A | 11/1987 | Fox et al. |
| 4,717,972 A | 1/1988 | Heitmann |
| 4,720,873 A * | 1/1988 | Goodman et al. .............. 725/32 |
| 4,724,491 A | 2/1988 | Lambert |
| 4,725,886 A | 2/1988 | Galumbeck et al. |
| 4,729,020 A | 3/1988 | Schaphorst et al. |
| 4,734,764 A | 3/1988 | Pocock et al. |
| 4,734,765 A | 3/1988 | Okada et al. |
| 4,739,510 A | 4/1988 | Jeffers et al. |
| 4,743,981 A | 5/1988 | Spencer et al. |
| 4,745,559 A | 5/1988 | Willis et al. |
| 4,748,619 A | 5/1988 | Vigarie et al. |
| 4,748,620 A | 5/1988 | Adelmann et al. |
| 4,751,578 A | 6/1988 | Reiter et al. |
| 4,751,630 A | 6/1988 | Kelley, Jr. et al. |
| 4,754,487 A | 6/1988 | Newmuis |
| 4,755,872 A | 7/1988 | Bestler et al. |
| 4,755,889 A * | 7/1988 | Schwartz ..................... 360/32 |
| 4,763,191 A | 8/1988 | Gordon et al. |
| 4,768,106 A | 8/1988 | Ito et al. |
| 4,769,833 A | 9/1988 | Farleigh et al. |
| 4,772,956 A | 9/1988 | Roche et al. |
| 4,774,574 A | 9/1988 | Daly et al. |
| 4,774,587 A | 9/1988 | Schmitt |
| 4,777,539 A | 10/1988 | Nomura et al. |
| 4,780,757 A | 10/1988 | Bryer et al. |
| 4,780,758 A | 10/1988 | Lin et al. |
| 4,782,397 A | 11/1988 | Kimoto |
| 4,785,349 A | 11/1988 | Keith et al. |
| 4,787,085 A | 11/1988 | Suto et al. |
| 4,789,863 A | 12/1988 | Bush |
| 4,792,849 A | 12/1988 | McCalley et al. |
| 4,796,087 A | 1/1989 | Guichard et al. |
| 4,802,005 A | 1/1989 | Kondo |
| 4,802,222 A | 1/1989 | Weaver |
| 4,803,643 A | 2/1989 | Hickey |
| 4,805,014 A | 2/1989 | Sahara et al. |
| 4,807,023 A | 2/1989 | Bestler et al. |
| 4,807,030 A | 2/1989 | Sacks |
| 4,816,901 A | 3/1989 | Music et al. |
| 4,816,905 A | 3/1989 | Tweedy et al. |
| 4,816,914 A | 3/1989 | Ericsson |
| 4,823,196 A | 4/1989 | Goddard |
| 4,823,386 A | 4/1989 | Dumbauld et al. |
| 4,827,338 A | 5/1989 | Gérard |
| 4,829,372 A | 5/1989 | McCalley et al. |
| 4,829,558 A | 5/1989 | Welsh |

| Patent | Date | Inventor |
|---|---|---|
| 4,831,440 A | 5/1989 | Borgers et al. |
| 4,833,710 A | 5/1989 | Hirashima |
| 4,839,733 A | 6/1989 | Karamon et al. |
| 4,847,677 A | 7/1989 | Music et al. |
| 4,847,699 A | 7/1989 | Freeman |
| 4,847,827 A | 7/1989 | Hayashi et al. |
| 4,847,829 A | 7/1989 | Tompkins et al. |
| 4,847,840 A | 7/1989 | Jinguji |
| 4,849,812 A | 7/1989 | Borgers et al. |
| 4,851,909 A | 7/1989 | Noske et al. |
| 4,851,931 A | 7/1989 | Parker et al. |
| 4,857,991 A | 8/1989 | Music et al. |
| 4,864,562 A | 9/1989 | Murakami et al. |
| 4,864,566 A | 9/1989 | Chauveau |
| 4,864,614 A | 9/1989 | Crowther |
| 4,866,770 A | 9/1989 | Seth-Smith et al. |
| 4,868,653 A | 9/1989 | Golin et al. |
| 4,868,866 A | 9/1989 | Williams, Jr. |
| 4,882,743 A | 11/1989 | Mahmoud |
| 4,887,308 A | 12/1989 | Dutton |
| 4,890,320 A | 12/1989 | Monslow et al. |
| 4,890,321 A | 12/1989 | Seth-Smith et al. |
| 4,894,789 A | 1/1990 | Yee |
| 4,897,717 A | 1/1990 | Hamilton et al. |
| 4,907,081 A | 3/1990 | Okamura et al. |
| 4,907,101 A | 3/1990 | Keesen et al. |
| 4,907,188 A | 3/1990 | Suzuki et al. |
| 4,914,508 A | 4/1990 | Music et al. |
| 4,914,527 A | 4/1990 | Asai et al. |
| 4,916,742 A | 4/1990 | Kolesnikov et al. |
| 4,918,523 A | 4/1990 | Simon et al. |
| 4,920,432 A | 4/1990 | Eggers et al. |
| 4,922,483 A | 5/1990 | Kobayashi |
| 4,922,537 A | 5/1990 | Frederiksen |
| 4,924,303 A | 5/1990 | Brandon et al. |
| 4,924,311 A | 5/1990 | Ohki et al. |
| 4,930,158 A | 5/1990 | Vogel |
| 4,930,160 A | 5/1990 | Vogel |
| 4,933,762 A | 6/1990 | Guichard et al. |
| 4,937,807 A | 6/1990 | Weitz et al. |
| 4,937,821 A | 6/1990 | Boulton |
| 4,942,466 A | 7/1990 | Sandbank et al. |
| 4,947,244 A | 8/1990 | Fenwick et al. |
| 4,949,169 A | 8/1990 | Lumelsky et al. |
| 4,949,170 A | 8/1990 | Yanagidaira et al. |
| 4,949,187 A | 8/1990 | Cohen |
| 4,953,196 A | 8/1990 | Ishikawa et al. |
| 4,961,109 A | 10/1990 | Tanaka |
| 4,963,967 A | 10/1990 | Orland et al. |
| 4,963,995 A | 10/1990 | Lang |
| 4,965,825 A | 10/1990 | Harvey et al. |
| 4,974,078 A | 11/1990 | Tsai |
| 4,975,771 A | 12/1990 | Kassatly |
| 4,975,896 A | 12/1990 | D'Agosto, III et al. |
| 4,985,784 A | 1/1991 | Tsuboi et al. |
| 4,994,913 A | 2/1991 | Maeshima |
| 4,995,078 A | 2/1991 | Monslow et al. |
| 4,995,080 A | 2/1991 | Bestler et al. |
| 4,999,705 A | 3/1991 | Puri |
| 5,001,551 A | 3/1991 | Otto |
| 5,006,936 A | 4/1991 | Hooks, Jr. |
| 5,010,399 A | 4/1991 | Goodman et al. |
| 5,010,499 A | 4/1991 | Yee |
| 5,012,334 A | 4/1991 | Etra |
| 5,012,352 A | 4/1991 | Yoshimura et al. |
| 5,014,125 A | 5/1991 | Pocock et al. |
| 5,014,267 A | 5/1991 | Tompkins et al. |
| 5,016,272 A | 5/1991 | Stubbs et al. |
| 5,021,879 A | 6/1991 | Vogel |
| 5,027,193 A | 6/1991 | Kani et al. |
| 5,027,400 A | 6/1991 | Baji et al. |
| 5,029,207 A | 7/1991 | Gammie |
| 5,032,927 A | 7/1991 | Watanabe et al. |
| 5,038,211 A | 8/1991 | Hallenbeck |
| 5,041,921 A | 8/1991 | Scheffler |
| 5,043,830 A | 8/1991 | Nobuhiro |
| 5,045,940 A | 9/1991 | Peters et al. |
| 5,049,993 A | 9/1991 | LeGall et al. |
| 5,051,822 A | 9/1991 | Rhoades |
| 5,055,939 A | 10/1991 | Karamon et al. |
| 5,057,927 A | 10/1991 | Hieda |
| 5,057,932 A | 10/1991 | Lang |
| 5,062,136 A | 10/1991 | Gattis et al. |
| 5,063,610 A | 11/1991 | Alwadish |
| 5,068,724 A | 11/1991 | Krause et al. |
| 5,068,726 A | 11/1991 | Kondo et al. |
| 5,071,582 A | 12/1991 | Conville et al. |
| 5,073,930 A | 12/1991 | Green et al. |
| 5,079,630 A | 1/1992 | Golin et al. |
| 5,091,782 A | 2/1992 | Krause et al. |
| 5,091,849 A | 2/1992 | Davis et al. |
| 5,091,936 A | 2/1992 | Katznelson et al. |
| 5,091,938 A | 2/1992 | Thompson et al. |
| 5,093,718 A | 3/1992 | Hoarty et al. |
| 5,093,720 A | 3/1992 | Krause et al. |
| 5,097,331 A | 3/1992 | Chen et al. |
| 5,099,319 A | 3/1992 | Esch et al. |
| 5,101,274 A | 3/1992 | Yoshimura et al. |
| 5,109,286 A | 4/1992 | West et al. |
| 5,109,414 A | 4/1992 | Harvey et al. |
| 5,113,243 A | 5/1992 | Fautier |
| 5,113,255 A | 5/1992 | Nagata et al. |
| 5,113,496 A | 5/1992 | McCalley et al. |
| 5,117,288 A | 5/1992 | Eisenhart et al. |
| 5,119,188 A | 6/1992 | McCalley et al. |
| 5,124,980 A | 6/1992 | Maki |
| 5,126,962 A | 6/1992 | Chiang |
| 5,128,775 A | 7/1992 | Suzuki et al. |
| 5,128,942 A | 7/1992 | Kojima |
| 5,129,036 A | 7/1992 | Dean et al. |
| 5,130,792 A | 7/1992 | Tindell et al. |
| 5,130,794 A | 7/1992 | Ritchey |
| 5,132,781 A | 7/1992 | Shimokoriyama et al. |
| 5,132,792 A | 7/1992 | Yonemitsu et al. |
| 5,132,992 A | 7/1992 | Yurt et al. |
| 5,133,079 A * | 7/1992 | Ballantyne et al. .......... 725/146 |
| 5,136,376 A | 8/1992 | Yagasaki et al. |
| 5,140,417 A | 8/1992 | Tanaka et al. |
| 5,140,473 A | 8/1992 | Murakami |
| 5,151,782 A | 9/1992 | Ferraro |
| 5,161,070 A | 11/1992 | Muramoto et al. |
| 5,163,120 A | 11/1992 | Childers et al. |
| 5,164,839 A | 11/1992 | Lang |
| 5,165,030 A | 11/1992 | Barker |
| 5,168,356 A | 12/1992 | Acampora et al. |
| 5,168,481 A | 12/1992 | Culbertson et al. |
| 5,172,413 A | 12/1992 | Bradley et al. |
| 5,175,631 A | 12/1992 | Juri et al. |
| 5,179,649 A | 1/1993 | Masuzaki et al. |
| 5,179,652 A | 1/1993 | Rozmanith et al. |
| 3,718,906 A | 2/1993 | Lightner |
| 5,191,410 A | 3/1993 | McCalley et al. |
| 5,191,573 A | 3/1993 | Hair |
| 5,195,092 A | 3/1993 | Wilson et al. |
| 5,195,184 A | 3/1993 | Peterson et al. |
| 5,198,802 A | 3/1993 | Bertram et al. |
| 5,200,822 A | 4/1993 | Bronfin et al. |
| 5,202,766 A | 4/1993 | Mehrgardt et al. |
| 5,206,722 A | 4/1993 | Kwan |
| 5,208,665 A | 5/1993 | McCalley et al. |
| 5,210,836 A | 5/1993 | Childers et al. |
| 5,214,792 A | 5/1993 | Alwadish |
| 5,218,454 A * | 6/1993 | Nagawasa et al. .............. 386/99 |
| 5,220,420 A | 6/1993 | Hoarty et al. |
| 5,231,492 A | 7/1993 | Dangi et al. |
| 5,231,494 A | 7/1993 | Wachob |

| | | | | | | |
|---|---|---|---|---|---|---|
| 5,233,437 | A | 8/1993 | Tachibana et al. | 5,758,012 | A | 5/1998 | Keesen |
| 5,233,654 | A | 8/1993 | Harvey et al. | 5,764,980 | A | 6/1998 | Davis et al. |
| 5,239,540 | A | 8/1993 | Rovira et al. | 5,774,172 | A | 6/1998 | Kapell et al. |
| 5,247,347 | A | 9/1993 | Litteral et al. | 5,781,228 | A | 7/1998 | Sposato |
| 5,247,575 | A | 9/1993 | Sprague et al. | 5,793,980 | A | 8/1998 | Glaser et al. |
| 5,249,164 | A | 9/1993 | Koz | 5,799,113 | A | 8/1998 | Lee |
| 5,253,053 | A * | 10/1993 | Chu et al. .............. 375/240.23 | 5,801,692 | A | 9/1998 | Muzio et al. |
| 5,253,275 | A | 10/1993 | Yurt et al. | 5,802,394 | A | 9/1998 | Baird et al. |
| 5,253,341 | A | 10/1993 | Rozmanith et al. | 5,809,204 | A | 9/1998 | Young et al. |
| 5,267,351 | A | 11/1993 | Reber et al. | 5,815,145 | A | 9/1998 | Matthews, III |
| 5,276,866 | A | 1/1994 | Paolini | 5,815,195 | A | 9/1998 | Tam |
| 5,289,288 | A | 2/1994 | Silverman et al. | 5,815,662 | A | 9/1998 | Ong |
| 5,307,160 | A | 4/1994 | Enari | 5,815,689 | A | 9/1998 | Shaw et al. |
| 5,319,453 | A | 6/1994 | Copriviza et al. | 5,818,972 | A | 10/1998 | Girod et al. |
| 5,321,831 | A | 6/1994 | Hirose | 5,826,110 | A | 10/1998 | Ozden et al. |
| 5,335,277 | A | 8/1994 | Harvey et al. | 5,832,309 | A | 11/1998 | Noe et al. |
| 5,339,412 | A | 8/1994 | Fueki | 5,835,495 | A | 11/1998 | Ferriere |
| 5,341,175 | A | 8/1994 | Koz | 5,835,843 | A | 11/1998 | Haddad |
| 5,341,474 | A | 8/1994 | Gelman et al. | 5,844,594 | A | 12/1998 | Ferguson |
| 5,347,308 | A | 9/1994 | Wai | 5,852,705 | A | 12/1998 | Hanko et al. |
| 5,347,632 | A | 9/1994 | Filepp et al. | 5,861,906 | A | 1/1999 | Dunn et al. |
| 5,351,075 | A | 9/1994 | Herz et al. | 5,887,243 | A | 3/1999 | Harvey et al. |
| 5,367,522 | A | 11/1994 | Otani | 5,956,716 | A | 9/1999 | Kenner et al. |
| 5,371,532 | A | 12/1994 | Gelman et al. | 5,995,705 | A | 11/1999 | Lang |
| 5,379,421 | A | 1/1995 | Palazzi, III et al. | 6,002,720 | A | 12/1999 | Yurt et al. |
| 5,381,347 | A | 1/1995 | Gery | 6,023,552 | A | 2/2000 | Kunihiro |
| 5,406,558 | A | 4/1995 | Rovira et al. | 6,055,244 | A | 4/2000 | Wall, Jr. et al. |
| 5,406,627 | A | 4/1995 | Thompson et al. | 6,084,730 | A | 7/2000 | Ikeda et al. |
| 5,410,343 | A | 4/1995 | Coddington et al. | 6,085,252 | A | 7/2000 | Zhu et al. |
| 5,414,804 | A | 5/1995 | McWaid | 6,144,702 | A | 11/2000 | Yurt et al. |
| 5,418,654 | A | 5/1995 | Scheffler | 6,201,536 | B1 | 3/2001 | Hendricks et al. |
| 5,421,031 | A | 5/1995 | De Bey | 6,249,309 | B1 | 6/2001 | Shibata et al. |
| 5,455,570 | A | 10/1995 | Cook et al. | 6,314,575 | B1 | 11/2001 | Billock et al. |
| 5,473,362 | A | 12/1995 | Fitzgerald et al. | 6,498,895 | B2 | 12/2002 | Young et al. |
| 5,479,266 | A * | 12/1995 | Young et al. .................. 386/83 | | | | |
| 5,502,503 | A | 3/1996 | Koz | | | | |
| 5,517,257 | A | 5/1996 | Dunn et al. | | | | |
| 5,539,452 | A | 7/1996 | Bush et al. | | | | |
| 5,539,896 | A | 7/1996 | Lisle | | | | |
| 5,550,578 | A | 8/1996 | Hoarty et al. | | | | |
| 5,550,863 | A | 8/1996 | Yurt et al. | | | | |
| 5,566,301 | A | 10/1996 | Koz et al. | | | | |
| 5,570,296 | A | 10/1996 | Heyl et al. | | | | |
| 5,581,297 | A | 12/1996 | Koz et al. | | | | |
| 5,583,937 | A | 12/1996 | Ullrich et al. | | | | |
| 5,592,233 | A | 1/1997 | Koz | | | | |
| 5,594,730 | A | 1/1997 | Koz et al. | | | | |
| 5,600,368 | A | 2/1997 | Matthews, III | | | | |
| 5,600,573 | A | 2/1997 | Hendricks et al. | | | | |
| 5,606,719 | A | 2/1997 | Nichols et al. | | | | |
| 5,630,094 | A | 5/1997 | Hayek et al. | | | | |
| 5,640,673 | A | 6/1997 | Tanabe | | | | |
| 5,644,355 | A | 7/1997 | Koz et al. | | | | |
| 5,648,824 | A | 7/1997 | Dunn et al. | | | | |
| 5,654,748 | A | 8/1997 | Matthews, III | | | | |
| 5,655,091 | A | 8/1997 | Drako et al. | | | | |
| 5,659,877 | A | 8/1997 | Enomoto et al. | | | | |
| 5,675,575 | A | 10/1997 | Wall, Jr. et al. | | | | |
| 5,675,734 | A | 10/1997 | Hair | | | | |
| 5,687,331 | A | 11/1997 | Volk et al. | | | | |
| 5,701,511 | A | 12/1997 | Smith | | | | |
| 5,701,582 | A | 12/1997 | DeBey et al. | | | | |
| 5,721,829 | A | 2/1998 | Dunn et al. | | | | |
| 5,721,950 | A | 2/1998 | Tobagi et al. | | | | |
| 5,724,543 | A | 3/1998 | Ozden et al. | | | | |
| 5,732,239 | A | 3/1998 | Tobagi et al. | | | | |
| 5,734,119 | A | 3/1998 | France et al. | | | | |
| 5,734,925 | A | 3/1998 | Tobagi et al. | | | | |
| 5,734,961 | A | 3/1998 | Castille | | | | |
| 5,737,495 | A | 4/1998 | Adams et al. | | | | |
| 5,742,773 | A | 4/1998 | Blomfield-Brown et al. | | | | |
| 5,751,282 | A | 5/1998 | Girard et al. | | | | |
| 5,754,940 | A | 5/1998 | Smith et al. | | | | |

FOREIGN PATENT DOCUMENTS

| | | |
|---|---|---|
| EP | 0 333 466 A1 | 9/1989 |
| EP | 0 338 812 A2 | 10/1989 |
| EP | 0 355 697 A2 | 2/1990 |
| EP | 0 355 697 B1 | 3/1995 |
| EP | 0 698 999 A2 | 2/1996 |
| EP | 1 367 828 A1 | 12/2003 |
| GB | 2 208 986 A | 4/1989 |
| GB | 2 215 555 A | 9/1989 |
| JP | 58-142673 A | 8/1983 |
| JP | 63-090274 A | 4/1988 |
| JP | 63-308488 A | 12/1988 |
| JP | 1-303866 A | 12/1989 |
| JP | 2-054646 A | 2/1990 |
| JP | 2-108337 A | 4/1990 |
| JP | 2-180492 A | 7/1990 |
| JP | 2-188082 A | 7/1990 |
| WO | WO 84/00863 A1 | 3/1984 |
| WO | WO 89/04576 A1 | 5/1989 |
| WO | WO 89/12370 A1 | 12/1989 |
| WO | WO 91/03112 A1 | 3/1991 |
| WO | WO 91/14317 A1 | 9/1991 |
| WO | WO 83/02208 A1 | 6/1993 |

OTHER PUBLICATIONS

Acacia Media Technologies Corporation, "Plaintiff Acacia Media Technologies Corporation's Post-Hearing Reply Brief Re Motion for Reconsideration and Clarification of the Jul. 12, 2004 Markman Order Re the Terms 'Transmission System,' 'Transmission System At a First Location,' 'Reception System At a Second Location,' 'In Data Communication With', 'Remote Locations,' and 'Transceiver'", USDC—N.D. Cal.—Case No. 05 CV 01114 JW MDL No. 1665 dated Sep. 28, 2005 (19 pgs.).

*Acacia Media Technologies Corporation v. New Destiny Internet Group, et al.*, "Memorandum of Law and Fact in Support of Reconsideration of the Court's Construction of the Term 'Remote Locations'", USDC—N.D. Cal.—Case No. 05 CV 01114 JW (HRL) MDL No. 1665, Document 51 filed Jul. 28, 2005, dated Jul. 29, 2005 (29 pgs.).

Acacia Media Technologies Corporation, "Declaration of Andrew Lippman in Support of Defendant Directv Group, Inc.'s Motion for Reconsideration of the Court's Construction of the Term 'Transceiver'", USDC—N.D. Cal.—Case No. 05 CV 01114 JW (HRL) MDL No. 1665, Document 55, filed Jul. 29, 2005 dated Jul. 28, 2005 (11 pgs.).

Acacia Media Technologies Corporation, "Defendant Directv Group, Inc.'s Notice of Motion and Motion for Reconsideration of the Court's Construction of the Term 'Transceiver'; Memorandum of Points and Authorities in Support Thereof", USDC—N.D. Cal.—Case No. 05 CV 01114 JW (HRL) MDL No. 1665, Document 53 filed Jul. 29, 2005, dated Jul. 29, 2005 (12 pgs.).

*Acacia Media Technologies Corporation v. New Destiny Internet Group, et al.*, USDC—C.D. Cal. (Southern)—Case No. SA CV 02-1040-JW(MLGx); Consolidated Cases: SA CV 02-1048-JW(MLGx); SA CV 02-1063-JW(MLGx); SA CV 02-1165-JW(MLGx); SA CV 03-0217-JW(MLGx); SA CV 03-0218-JW(MLGx); SA CV 03-0219-JW(MLGx); SA CV 03-0259-JW(MLGx); SA CV 03-0271-JW(MLGx); and SA CV 03-0308-JW(MLGx); Related Cases: SA CV 03-1801-JW(MLGx); SA CV 03-1803-JW(MLGx); SA CV 03-1804-JW(MLGx); SA CV 03-1805-JW(MLGx); SA CV 03-1807-JW(MLGx), "Markman Order" dated Jul. 12, 2004, (40 pgs.).

*Acacia Media Technologies Corporation v. New Destiny Internet Group, et al.*, "Opposition to Acacia's Motion for Reconsideration and Clarification of the Jul. 12, 2004 Markman Order", USDC—N.D. Cal.—Case No. 05 CV 01114 JW(HRL) MDL No. 1665, Document 68 filed Aug. 25, 2005, dated Aug. 25, 2005 (22 pgs.).

Acacia Media Technologies Corporation, "Declaration of Andrew Lippman", USDC—N.D. Cal.—Case No. 05 CV 01114 JW (HRL) MDL No. 1665, Document 73 dated/filed Aug. 25, 2005, (27 pgs.).

Acacia Media Technologies Corporation, "Echostar's Opposition to Acacia's Motion for Reconsideration and Clarification of the Jul. 12, 2004 Markman Order", USDC—N.D. Cal.—Case No. 05 CV 01114 JW, Document 77 dated/filed Aug. 25, 2005, (20 pgs.).

Acacia Media Technologies Corporation, "Opposition to Acacia's Motion for Reconsideration and Clarification of the Jul. 12, 2004 Markman Order", USDC—N.D. Cal.—Case No. 05 CV 01114 JW, Document 79 dated/filed Aug. 25, 2005, (25 pgs.).

Acacia Media Technologies Corporation, "Defendant Directv Group, Inc.'s Post-Hearing Brief in Support of Reconsideration of the Court's Construction of the Term 'Transceiver'", USDC—N.D. Cal.—Case No. 05 CV 01114 JW (HRL) MDL No. 1665, Document 99 dated/filed Sep. 28, 2005, (9 pgs.).

Acacia Media Technologies Corporation, "Echostar's Post-Hearing Brief Regarding Acacia's Motion for Reconsideration and Clarification of the Jul. 12, 2004 Markman Order", USDC—N.D. Cal.—Case No. 05 CV 01114 JW, Document 102 dated/filed Sep. 28, 2005, (12 pgs.).

*Acacia Media Technologies Corporation v. New Destiny Internet Group, et al.*, "Reply Memorandum of Points and Authorities in Support of Reconsideration of the Court's Construction of the Term 'Remote Locations.'", USDC—N.D. Cal.—Case No. 05 CV 01114 JW (HRL) MDL No. 1665, Document 113 dated/filed Sep. 28, 2005, (19 pgs.).

Acacia Media Technologies Corporation, "Defendant Comcast Cable Communications LLC's Post-Hearing Brief", USDC—N.D. Cal.—Case No. 05 CV 01114 JW, Document 114 dated/filed Sep. 28, 2005, (16 pgs.).

Acacia Media Technologies Corporation Patent Litigation, "The Proceedings Were Held Before the Honorable United States District Judge James Ware", USDC—N.D. Cal.—C-05-01114-JW, vol. 1, pp. 1-216, Sep. 8, 2005 (90 pgs.).

Acacia Media Technologies Corporation Patent Litigation, "The Proceedings Were Held Before the Honorable United States District Judge James Ware", USDC—N.D. Cal.—C-05-01114-JW, vol. 2, pp. 217-428, Sep. 9, 2005 (89 pgs.).

*Acacia Media Technologies Corporation v. New Destiny Internet Group, et al.*, "Further Claim Construction Order; Order Finding Claims Terms Indefinite and Claims Invalid'", USDC—N.D. Cal.—Case No. 05 CV 01114 JW, Document 119 dated/filed Dec. 7, 2005, (19 pgs.).

Acacia Media Technologies Corporation (Applicant), Deutsche Telekom AG (Opposer), Application No. 99 201 346.6-2223/Patent No. 933892, "Communication of a Notice of Opposition", dated Jul. 26, 2004 (13 pgs.).

Acacia Media Technologies Corporation (Applicant), Deutsche Telekom AG (Opposer), Application No. 99 201 346.6-2223/Patent No. 933892, "Facts and Statement of Grounds" (English Translation of Notice of Opposition dated Jull 26, 2004 (7 pgs.).

Acacia Media Technologies Corporation (Applicant), Deutsche Telekom AG (Opposer), Application No. 99 201 346.6-2223/Patent No. 933892, "Response to the Communication Dated Aug. 20, 2004 Regarding the Filing of a Notice of Opposition", dated Nov. 4, 2004 (17 pgs.).

Acacia Media Technologies Corporation, "Brief Communication", European Application No. 99 201 346.6-2223/Patent No. 933892, dated Mar. 31, 2005 (8 pgs.).

Acacia Media Technologies Corporation (Applicant), Deutsche Telekom AG (Opposer), Application No. 99 201 346.6-2223/Patent No. 933892, Comments on the Statement by the Proprietor dated Apr. 11, 2004, dated Mar. 16, 2005 (7 pgs.).

Acacia Media Technologies Corporation, "Brief Communication", European Application No. 99 201 346.6-2223/Patent No. 933892, dated Apr. 8, 2005 (3 pgs.).

Acacia Media Technologies Corporation (Applicant), Deutsche Telekom AG (Opposer), European Patent No. 933892, filed Jan. 3, 1992., Letter from Patent Attorney Dipl.-Ing. Dietmar Gornott dated Mar. 21, 2005, (1 pgs.).

Acacia Media Technologies Corporation, "Brief Communication", European Application No. 99 201 346.6-2223/Patent No. 933892, dated Apr. 26, 2005 (10 pgs.).

Acacia Media Technologies Corporation (Applicant), Deutsche Telekom AG (Opposer), European Patent No. 933892, filed Jan. 3, 1992. "Response to the Letters Dated Mar. 16 and Mar. 21, 2005 of the Opponent", dated Jun. 17, 2005 (12 pgs.).

Acacia Media Technologies Corporation, "Summons to Attend Oral Proceedings Pursuant to Rule 71(1) EPC", European Application No. 99 201 346.63-2223/Patent No. 933892, dated Oct. 5, 2005 (10 pgs.).

Acacia Media Technologies Corporation, "Decision Revoking the European Patent (Article 102(1), (3) EPC)", European Application No. 99 201 346.6-2223/Patent No. 933892, dated Mar. 27, 2006 (16 pgs.).

Acacia Media Technologies Corporation, "Provision of a Copy of the Minutes in Accordance With Rule 76(4) EPC", European Application No. 99 201 346.6-2223/Patent No. 933892, dated Mar. 27, 2006 (26 pgs.).

Acacia Media Technologies Corporation (Applicant), Deutsche Telekom AG (Opposer), European Patent No. 933892, filed Jan. 3, 1992. "Appeal", dated May 22, 2006 (2 pgs.).

Acacia Media Technologies Corporation, European Search Report for European Application No. 03090208.4-2202, filed Jul. 9, 2003, entitled "Method and System for Recording and Playing Back Audiovisual Information", dated Oct. 17, 2003 (3 pgs.).

Acacia Media Technologies Corporation, "Communication Pursuant to Article 96(2) EPC" for European Application No. 03090208.4-2223, filed Jul. 9, 2003, entitled "Method and System for Recording and Playing Back Audiovisual Information", dated Jun. 14, 2004 (4 pgs.).

Acacia Media Technologies Corporation, "Response to Communication Dated Mar. 9, 2004" for European Application No. 03090208.4-2223, filed Jul. 9, 2003, entitled "Method and System for Recording and Playing Back Audiovisual Information", dated Jun. 14, 2004 (41 pgs.).

Acacia Media Technologies Corporation, "Summons to Attend Oral Proceedings Pursuant to Rule 71(1) EPC" for European Application No. 03090208.4-2223, filed Jul. 9, 2003, entitled "Method and System for Recording and Playing Back Audiovisual Information", dated Nov. 11, 2004 (4 pgs.).

Acacia Media Technologies Corporation, "Submission and Amendments Made in Preparation of the Oral Proceedings on Apr. 21, 2005" for European Application No. 03090208.4-2223, filed Jul. 9, 2003, entitled "Method and System for Recording and Playing Back Audiovisual Information", dated Mar. 21, 2005 (65 pgs.).
Acacia Media Technologies Corporation, "Summons to Attend Oral Proceedings Pursuant to Rule 71(1) EPC" for European Application No. 03090208.4-2223, filed Jul. 9, 2003, entitled "Method and System for Recording and Playing Back Audiovisual Information", dated Aug. 11, 2005 (6 pgs.).
Acacia Media Technologies Corporation, "In Response to the Summons to Attend Oral Proceedings Dated Aug. 11, 2005 It Is Requested to Change the Date of the Oral Proceedings" for European Application No. 03090208.4-2223, filed Jul. 9, 2003, entitled "Method and System for Recording and Playing Back Audiovisual Information", dated Aug. 16, 2005 (2 pgs.).
Acacia Media Technologies Corporation, "Submission and Amendments Made in Preparation of the Oral Proceedings on Dec. 5, 2005" for European Application No. 03090208.4-2223, filed Jul. 9, 2003, entitled "Method and System for Recording and Playing Back Audiovisual Information", dated Mar. 2, 2006 (40 pgs.).
Acacia Media Technologies Corporation, "Provision of a Copy of the Minutes in Accordance With Rule 76(4) EPC" for European Application No. 03090208.4-2223, filed Jul. 9, 2003, entitled "Method and System for Recording and Playing Back Audiovisual Information", dated Mar. 2, 2006 (7 pgs.).
Acacia Media Technologies Corporation, "Decision to Grant a European Patent Pursuant to Article 97(2) EPC" for European Application No. 03090208.4-2223, filed Jul. 9, 2003, entitled "Method and System for Recording and Playing Back Audiovisual Information", dated Mar. 2, 2006 (1 pg.).
Office Action for U.S. Appl. No. 10/279,664, filed Oct. 23, 2002, entitled "Audio and Video Transmission and Receiving System", inventor Paul Yurt, et al., Office Action mailed Jan. 12, 2006 (17 pgs.).
"Transmission Control Protocol" Darpa Internet Program, Protocol Specification, Information Sciences Institute, University of Southern California, Marina del Rey, California, Sep. 1981 (89 pgs.).
Mourad, "Some Issues in the Implementation of Multimedia Communication Systems", Sep. 30-Oct. 2, 1990 (pp. 1, 4-13).
*Acacia Media Technologies Corporation v. Interactive Gallery, Inc.*; "Acacia's Jun. Monthly Status Report;" Case No. SA CV-02-1025 AHS (MLGx); United States District Court, Central District of California Southern Division; filed Jul. 3, 2003; 13 pages.
*Acacia Media Technologies Corporation v. National A-1 Advertising, Inc.* Case No. SA CV-03-1807 JW (MLGx); Defendant's Answer and Counterclaims, and Acacia's objections to the use of the "Sarnoff Report" during claim construction.
*Acacia Media Technologies Corporation v. New Destiny Internet Group, Inc.*; "Acacia's January Status Report;" Case No. SA CV-02-1040 JW (MLGx); United States District Court, Central District of California Southern Division; filed Jan. 12, 2004; 8 pages.
*Acacia Media Technologies Corporation v. New Destiny Internet Group, Inc.*; "Acacia's September Monthly Status Report" Case No. SA CV-02-1040 AHS (MLGx); United States District Court, Central District of California Southern Division; filed Sep. 23, 2003; 9 pages.
*Acacia Media Technologies Corporation v. New Destiny Internet Group, et al.*; "Fourth Claim Construction Order;'" USDC—N.D. Cal.—Case No. 05-cv-01114-JW, Document 220; dated/filed Mar. 2, 2007; 29 pages.
*Acacia Media Technologies Corporation v. New Destiny Internet Group, et al.*; "Order Re: Motions for Reconsideration of Claim Construction Order; Fifth Claim Construction Order;'" USDC—N. D. Cal.—Case No. 05-cv-01114-JW, Document 259; dated/filed Oct. 19, 2007; 19 pages.
*Acacia Media Technologies Corporation v. New Destiny Internet Group, et al.*; "Third Claim Construction Order;'" USDC—N.D. Cal.—Case No. 05-cv-01114-JW, Document 216; dated/filed Dec. 14, 2006; 38 pages.
*Acacia Media Technologies Corporation v. New Frontier Media and Interactive Gallery, Inc.*; "Acacia's Monthly Status Report;" Case No. SA CV-02-1025 AHS (MLGx); United States District Court, Central District of California Southern Division; filed May 27, 2003; 12 pages.
Acacia Media Technologies Corporation, "Brief Communication;" European Application No. 03090118.5—1241/Patent No. 1335601; dated Oct. 20, 2009; 2 pages.

Acacia Media Technologies Corporation, "Brief Communication;" European Application No. 03090119.3-1241/Patent No. 1335602; dated Oct. 22, 2009; 2 pages.
Acacia Media Technologies Corporation, "Closure of the Appeal Proceedings, Withdrawal of the Appeal/Application/Opposition by the Sole Appellant" Appeal No. T0858/06. 3503; European Application No. 99201346.6-2223/Patent No. 0933892; dated Mar. 23, 2007; 2 pages.
Acacia Media Technologies Corporation, "Communication of a Notice of Opposition;" European Application No. 03090208.4-2223/ Patent No. 1367828; dated Jan. 30, 2007; 21 pages.
Acacia Media Technologies Corporation, "Decision Revoking the European Patent (Article 102(1) EPC) European Patent No. 1367828 is revoked;" European Application No. 03090208.4-2223/Patent No. 1367828; dated Jul. 12, 2007; 1 page.
Acacia Media Technologies Corporation, "Decision to Refuse a European Patent Application (Art. 97(2) EPC);" European Application No. 03090183.9-1241; dated Oct. 27, 2009; 2 pages.
Acacia Media Technologies Corporation, "Declaration of David S. Benyacar in Support of Round 3 Defendants' Motions for Summary Judgment of Invalidity Under 35 U.S.C § 112 of the '992, '863 and '702 Patents;" USDC—N.D. Cal.—Case No. 05-cv-01114-JW, Document 293; dated/filed Jul. 11, 2008; 3 pages; Exhibit A, 10 pages; Exhibit B, 7 pages.
Acacia Media Technologies Corporation, "Declaration of Matthew I. Kreeger in Support of the Satellite Defendants' Motion for Summary Judgment of Invalidity of the '992, '863, and '720 Patents;'" USDC—N.D. Cal.—Case No. 05-cv-01114-JW, Document 298; dated/filed Jul. 11, 2008; 4 pages; Exhibit A, 10 pages; Exhibit B, 16 pages; Exhibit C, 7 pages; Exhibit D, 41 pages; Exhibit E, 20 pages; Exhibit F, 39 pages; Exhibit G, 30 pages; Exhibit H, 20 pages; Exhibit I, 14 pages; Exhibit J, 14 pages; Exhibit K, 7 pages; Exhibit L, 5 pages; Exhibit M, 27 pages; Exhibit N, 13 pages; Exhibit O, 7 pages; Exhibit P, 10 pages.
Acacia Media Technologies Corporation, "A Letter of the Opponent dated Dec. 15, 2006;" Appeal No. T0858/06-3503; European Application No. 99201346.6-2223/ Patent No. 0933892; dated Dec. 22, 2006; 14 pages.
Acacia Media Technologies Corporation; "Order Granting Defendants' Motions for Summary Judgment;" USDC—N.D. Cal.—Case No. 05 CV 01114 JW; Document 350; dated/filed Sep. 25, 2009; 11 pages.
Acacia Media Technologies Corporation; "Reply Declaration of David S. Benyacar in Support of Round 3 Defendants' Motion for Summary Judgment of Invalidity Under 35 U.S.C. § 112 of the '992, '863 and '720 Patents;'" USDC—N.D. Cal.—Case No. 05-cv-01114-JW, Document 335; dated/filed Apr. 3, 2009; 2 pages; Exhibit A, 11 pages; Exhibit, 7 pages.
Acacia Media Technologies Corporation; "Reply in Support of the Satellite Defendants' Motion for Summary Judgment of Invalidity of the '992, '863, and '720 Patents;'" USDC—N.D. Cal.—Case No. 05-cv-01114-JW, MDL No. 1665, Document 332; dated/filed Apr. 3, 2009; 20 pages.
Acacia Media Technologies Corporation; "Round 3 Defendants' Notice of Motions and Motions for Summary Judgment of Invalidity Under 35 U.S.0 § 112 of the '992, '863 and '702 Patents;" USDC—N. D. Cal.—Case No. 05-cv-01114-JW; Document 292; dated/filed Jul. 11,2008; 70 pages.
Acacia Media Technologies Corporation; "Round 3 Defendants' Reply Memorandum in Support of Their Motions for Summary Judgment of Invalidity Under 35 U.S.0 § 112 of the '992, '863 and '702 Patents;" USDC—N.D. Cal.—Case No. 05-cv-01114-JW, Document 334; dated/filed Apr. 3,2009; 159 pages.
Acacia Media Technologies Corporation; "The Satellite Defendants' Notice of Motion and Motion for Summary Judgment of Invalidity of the '992, '863, and '720 Patents;'" USDC—N.D. Cal.—Case No. 05-cv-01114-JW MDL No. 1665, Document 297; dated/filed Jul. 11, 2008; 29 pages.
Acacia Media Technologies Corporation; "Sixth Claim Construction Order;'" USDC—N.D. Cal.—Case No. 05-cv-01114-JW, Document 266; dated/filed Feb. 13, 2008; 13 pages.

Acacia Media Technologies Corporation; "Summons to Attend Oral Proceedings Pursuant to Rule 115(1) EPC;" European Application No. 03090117.7-1241/Patent No. 1339236; dated Jul. 17, 2009; 6 pages.

Acacia Media Technologies Corporation; "Summons to Attend Oral Proceedings Pursuant to Rule 115(1) EPC;" European Application No. 03090118.5-1241/Patent No. 1335601; dated Jul. 17, 2009; 7 pages.

Acacia Media Technologies Corporation; "Summons to Attend Oral Proceedings Pursuant to Rule 115(1) EPC;" European Application No. 03090119.3-1241/Patent No. 1335602; dated Jul. 17, 2009; 7 pages.

Acacia Media Technologies Corporation; "Summons to Attend Oral Proceedings Pursuant to Rule 115(1) EPC;" European Application No. 03090183.9-1241/Patent No. 1359759; dated Jul. 17, 2009; 7 pages.

Acacia Media Technologies Corporation; "Termination of Opposition Proceedings of Patent No. 99201346.6-2223/ 0933892 With Revocation of the Patent;" dated Mar. 28, 2007; 2 pages.

Addeo, et al.; "Personal Multi-Media Multi-Point Communications Services for Broadband Networks;" IEEE Globecom; Nov. 1988; pp. 53-57.

Ades, et al.; "Protocols for Real Time Voice Communication on a Packet Local Network;" IEEE International Conference on Communications '86; Toronto, Canada; Jun. 22-25, 1986; cover page and pp. 525-530.

Adie; "A Survey of Distributed Multimedia Research, Standards and Products;" Edinburgh University Computing Service, Edinburgh, Great Britain; RARE Project OBR(92)046v2, First Edition; Jan. 25, 1993; cover page and pp. 1-151.

Afek, et al.; "The Power of Multimedia: Combining Point-to-Point and Multiaccess Networks (Extended Summary);" Proceedings of the Seventh Annual ACM Symposium on Principles of Distributed Computing; 1988; pp. 90-104.

Aguilar, et al.; "Architecture for a Multimedia Teleconferencing System;" Proceedings of the ACM SIGCOMM Conference on Communications Architectures & Protocols; 1986; pp. 126-136.

Aharonian, Greg; "Greg Ahoranian on the Acacia Patents;" Chilling Effects Clearinghouse; http://www.chillingeffects.org/ecom/resource.egi?ResourceID=72&print=yes; Bustpatents.com email newsletter; Feb. 6, 2002; 4 pages.

Aihara, Ken-Ichi; "Universal Data Compression Scheme for Enhancing Multi-Media Communications;" IEEE International Conference on Communications '86, Conference Record vol. 3 of 3; Jun. 1986; cover page and pp. 1873-1877.

Akgun, et al.; "The Development of Cable Data Communications Standards;" IEEE Journal on Selected Areas in Communications; vol. SAC-3, No. 2; Mar. 1985; cover page and pp. 273-285.

Albanese, et al.; "Bellcore Metrocore Network—A Test-Bed for Metropolitan Area Network Research;" IEEE Global Telecommunications Conference & Exhibition; Hollywood, Florida; Nov. 28-Dec. 1, 1988; cover page and pp. 1229-1234.

Allen, et al.; "Customer-Controlled Video Switching for Teleconferencing;" IEEE Global Communications Conference; 1986; pp. 907-914.

Amendment filed in U.S. Appl. No. 09/651,115, filed Aug. 30, 2000; amendment dated Apr. 26, 2005; 26 pages.

Amendment filed in U.S Appl. No. 10/291,326, filed Nov. 8, 2002; amendment dated Apr. 26, 2005; 24 pages.

Amendment filed in U.S. Appl. No. 10/292,304, filed Nov. 11, 2002; amendment dated May 9, 2005; 22 pages.

Anderson, David P.; "A Software Architecture for Network Communication;" 8th International Conference on Distributed Computing Systems; Jun. 13-17, 1988; pp. 376-383.

Anderson, David P.; "Meta-Scheduling for Distributed Continuous Media;" Computer Science Division, EECS Department, University of California; Berkeley, California; Technical Report CSD-90-599; Oct. 4, 1990; pp. 1-32.

Anderson, David P.; "Metascheduling for Continuous Media;" ACM Transaction on Computer Systems, vol. 11, No. 3; Aug. 1993; pp. 226-252.

Anderson, et al.; "A File System for Continuous Media;" Computer Science Division, EECS Department, University of California; Berkeley, California; Nov. 1991; Technical Report No. 91/646; pp. 1-26.

Anderson, et al.; "A Framework for Multimedia Communication in a General-Purpose Distributed System;" Computer Science Division (EECS) University of California; Berkeley, California; Report No. UCB/CSD 89/498; Mar. 31, 1989; 2 cover pages and pp. 1-15.

Anderson, David; "A Software Architecture for Network Communication;" Computer Science Division (EECS) University of California; Berkeley, California; Technical Report No. CSD-87-386; Nov. 30, 1987; cover page and pp. 1-15.

Anderson, et al.; "A System for Computer Music Performance;" ACM Transactions on Computer Systems; vol. 8, No. 1; 56-82.

Anderson, et al.; "Integrated Digital Continuous Media: A Framework Based on Mach, X11, and TCP/IP;" University of California, Berkeley; Computer Science Division (EECS); Technical Report No. CSD-90-566; Mar. 22, 1990; cover page and pp. 1-22.

Anderson, et al.; "Real-Time Disk Storage and Retrieval of Digital Audio/Video Data;" Computer Science Division, EECS Department, University of California at Berkeley; Technical Report No. CSD-91-646; Aug. 8, 1991; cover page and pp. 1-26.

Anderson, et al.; "Resource Management for Digital Audio and Video;" IEEE Workshop on Real-Time Operating Systems and Software; Jan. 30, 1990; pp. 99-103.

Anderson, et al.; "SRP: A Resource Reservation Protocol for Guaranteed-Performance Communication in the Internet" Feb. 1990; cover page and pp. 1-26.

Anderson, et al.; "Support for Continuous Media in the Dash System;" Computer Science Division, Department of Electrical Engineering and Computer Science, University of California; Berkeley, California; Technical Report No. CSD-89-537; Oct. 16, 1989; 3 cover pages and pp. 1-29.

Anderson, D., et al.; "Support for Continuous Media in the Dash System;" 10th International Conference on Distributed Computing Systems; May 1990; pp. 54-61.

Anderson, Milton M.; "Video Services on Copper;" IEEE International Conference on Communications; Conference Record vol. 1; Jun. 23-26, 1991; pp. 0302-0306.

Andreatos, A.; "Packet Video on Integrated Services Networks: General Considerations—An Introduction;" Information Technology for Organizational Systems Concepts for Increased Competitiveness; 1988; cover page And pp. 508-513.

Angus, Jeff; "Users Get 2 Packages for Animated Graphics;" Info World; vol. 9, Issue 27; Jul. 6, 1987; cover page and p. 18, plus magnified article on separate page.

Appeal Brief excerpt in Reexamination Control No. 90/005,742; Reexamination filed Jun. 9, 2000 entitled "Remote Query Communication System;" dated Aug. 27, 2003; cover page and p. 42.

Arfman, et al.; "Project Athena: Supporting Distributed Computing at MIT;" IBM Systems Journal; vol. 31, No. 3; 1992; 2 cover pages and pp. 550-563.

Armbrüster, Heinrich; "Applications of Future Broad-Band Services in the Office and Home;" IEEE Journal on Selected Areas in Communications, vol. SAC-4, No. 4; Jul. 1986; pp. 429-437.

Arons, et al.; "A Voice and Audio Server for Multimedia Workstations;" Speech Tech '89; Voice Input/Output Applications Conference and Exhibition; New York City; May 2-4, 1989; cover page and pp. 86-89.

Arons, et al.; "The VOX Audio Server;" 2nd IEEE Comsoc International Multimedia Communications Workshop; Multimedia '89; Apr. 20-23, 1989; 23 pages.

Artieri et al.; "A Chip Set Core for Image Compression;" IEEE Transaction on Consumer Electronics, vol. 36, No. 3; Aug. 1990; pp. 395-402.

Asatanti, et al.; "Design and Architecture of the High-Speed Digital Data Transmission System in NTT;" IEEE Journal on Selected Areas in Communications; vol. SAC-3, No. 2; Mar. 1985; cover page and pp. 292-299.

Atari Video Digitizer; "Video Streaming System Circa 1984;" http://www.popflix.com/acacia/early_streamer.html; printed Apr. 7, 2003; 1 page.

Baccelli, et al.; "Analysis of Update Response Times in a Distributed Data Base Maintained by the Conservative Time Stamps Ordering Algorithm;" Proceedings of the 9th International Symposium on Computer Performance Modeling, Measurement and Evaluation; 1983; pp. 415-436.

Bagenal, P.W., et al.; "Customer Management and the Eurocypher Conditional Access System at British Satellite Broadcasting;" Proceedings of the International Broadcasting Convention; Sep. 21-25, 1990; pp. 270-277.

Bailey, Charles W.; "Intelligent Multimedia Computer Systems: Emerging Information Resources in the Network Environment" Reprint of Library Hi Tech 8, No. 1; 1990; 18 pages.

Ball et al.; "Videotex Networks;" IEEE Computer; Dec. 1980; cover page and pp. 8-14.

Balmes, et al.; "Fiber to the Home: The Technology Behind Heathrow;" Telesis; 1989; vol. 16, No. 2; cover page and pp. 31-41.

Barnsley, et al.; "A Better Way to Compress Images;" BYTE, vol. 13, No. 1; Jan. 1988; pp. 215-218 and 220-223.

Bassiouni, et al.; "Efficient Coding for Integrated Information Systems and Multimedia Databases;" IEEE Compsac 89, The Thirteenth Annual International Computer Software & Applications Conference; Sep. 1989; cover page and pp. 308-315.

Bellisio, et al.; "Television Coding for Broadband ISDN;" IEEE Global Communications Conference; 1986; pp. 894-900.

Berners-Lee, Tim; "Information Management: A Proposal;" TBL-900620 Hypertext proposal; Mar. 1989; May 1990; pp. 1-21.

Berners-Lee, Tim; "Information Management: A Proposal;" The original proposal of the WWW, HTMLized; http://www.w3.org/History/1989/proposal.html; Mar. 1989/May 1990, printed Jan. 9, 2003; 14 pages.

Berra, et al.; "Architecture for Distributed Multimedia Database Systems;" Computer Communications, vol. 13, No. 4; May 1990; cover page and pp. 217-231.

Bharath-Kumar, et al.; "Analysis of a Resequnecing Problem in Communication Networks;" Proceedings of IEEE INFOCOM '83; IEEE Computer Society; Apr. 1983; cover page and pp. 303-306 and 308-310.

Blair et al.; "Incorporating Multimedia Into Distributed Open Systems;" UNIX Distributed Open Systems in Perspective; Proceedings of the Spring 1991 EurOpen Conference; May 20-24, 1991; Tromsø, Norway; cover page and pp. 99-112.

Blazewicz, J., et al.; "Time-Stamp Approach to Store and Forward Deadlock Prevention;" IEEE Transactions on Communications, vol. COM-35, No. 5; May 1987; pp. 490-495.

Bourne, John, et al.; "Heathrow—Experience and Evolution;" IEEE International Conference on Communications; 1990; pp. 1091-1095.

Bown, et al.; "Telidon: A New Approach to Videotex System Design;" IEEE Transactions on Consumer Electronics, vol. CE-25, No. 3; Jul. 1979; cover page and pp. 256-266.

Bratton, et al.; "ISO/IEC JTC1/SC2/WG11 Systems Coded Representation of Picture and Audio Information;" International Organization for Standardization; MPEG90/248, Rev. 1; dated Sep. 14, 1990; 46 pages.

Brawn, G.; "Gumby Meets Godzilla;" Amiga World; Jun. 1989; IDGGI/I Publication; cover page and pp. 34-36, 38, 40, and 42.

Brownstein, Charles N.; "Two-Way Cable Television Applied to Non-Entertainment Services: The National Science Foundation Experiments;" Experiences with Pilot Projects in North America, Japan, and Europe; Proceedings of a Symposium held in Munich; Apr. 27-29, 1977; 2 cover pages and pp. 17-24.

Bulfer, et al.; "A Trial of a National Pay-Per-View Ordering and Billing System;" NCTA Technical Papers; 1986; 2 cover page and pp. 134-139.

Bulick, Stephen; "Future Prospects for Network-Based Multimedia Information Retrieval;" The Electronic Library, vol. 8, No. 2; Apr. 1990; pp. 88-99.

Bulick, et al.; "Broadband Information Services: Concepts and Prototypes;" IEEE/IEICE Global Telecommunications Conference, Conference Record vol. 3 of 3; Nov. 15-18, 1987; cover page and pp. 1982-1989.

Bulick, et al.; "The U.S. West Advanced Technologies Prototype Multimedia Communication System;" IEEE Global Telecommunications Conference & Exhibition; Dallas, Texas; Nov. 27-30, 1989; cover page and pp. 1221-1226.

Business Wire; "Bell Atlantic Demonstrates Historic Breakthrough: Video on Demand Over Existing Telephone Network; All Major Movie Studios Cooperate with Trial;" Business Wire, Inc.; Jun. 14, 1993; 5 pages.

Bussey, Howard E.; "Experimental Approaches to Video Services and Technologies;" IEEE Global Communications Conference; 1986; pp. 901-906.

Butscher, et al.; "BERKOM—A B-ISDN Pilot Project" The Second ISDN Europe Conference and Exhibition 'ISDN Europe 88'; IGI Europe; Jun. 27-Jul. 1, 1988; cover page and pp. 59-64.

Byte; Excerpts; Apr. 1989; McGraw-Hill Publication; cover page and pp. 4 and 256.

Byte; Excerpts; Aug. 1989; McGraw-Hill Publication; cover page and pp. 12 and 38.

Cable Television Information Center; "The Uses of Cable Communications;" Washington, D.C.; 1973; cover page and pp. 31-36 and 38.

Cabrera, et al.; "Exploiting Multiple I/O Streams to Provide High Data-Rates;" Proceedings of the Summer 1991 Usenix Conference; Nashville, Tennessee; Jun. 10-14, 1991; cover page and pp. 31-48.

Callahan, Jr., Edward J.; "The Design, Implementation and Operation of Bidirectional Wideband CATV Netorks for Two-Way Video Audio and Data Services;" Two-Way Cable Television: Experiences with Pilot Projects in North America, Japan, and Europe; Chapter 6; 1985; pp. 75-82.

Callais, et al.; "The Subscriber Response System;" 20th Annual NCTA Convention, Official Transcript, National Cable Television Association; Washington, D.C.; Jul. 6-9, 1971; cover page and pp. 28-48.

Calnan, Roger S.; "ISLAND: A Distributed Multimedia System;" IEEE/IEICE Global Telecommunications Conference, Globecom '87, Tokyo Conference Proceedings, vol. 2 of 3; 1987; cover page and pp. 744-748.

Campbell, Larry J.; "The Use of Computers in CATV Two-Way Communications Systems;" A Survey of Technical Requirements for Broadband Cable Teleservices, vol. 6, OT Report 73-13; Jul. 1973; 6 cover pages and pp. 1-32, plus 1 page.

Campbell, Graham M., et al.; "Dig-Music: An on Demand Digital Musical Selection System Utilizing CATV Facilities;" IEEE Transactions on Consumer Electronics, vol. CE-28, No. 3; Aug. 1982; cover page and pp. xviii-xxv.

Carr, M.D.; "New Video Coding Standard for the 1990s;" Electronics & Communication Engineering Journal; Jun. 1990; pp. 119-124.

Carr, et al.; "Motion Video Coding in CCII SGXV—The Video Multiplex and Transmission Coding;" IEEE Globecom; Nov. 1988; pp. 1005-1010.

Casner, Stephen, et al.; "N-Way Conferencing with Packet Video;" Reprinted from Proceedings of the Third International Workshop on Packet Video; Mar. 22-23, 1990; Morristown, New Jersey; cover page and pp. 1-6.

"CATV" supervised by H. Myyagawa, the Society of Electronics and Communications Engineers of Japan; Ohm-sha; 1986; 28 pages.

CCITT SGXV; "Description of Ref. Model 8 (RM8);" Specialist Group on Coding for Visual Telephony; Document # 525, revision 8; Jun. 1989; cover page, and pp. 2 and 39-42.

CCITT; "Video Codec for Audiovisual Services at p x 64kbit/s;" The International Telegraph and Telephone Consultative Committee; Line Transmission on Non-Telephone Signals; Recommendation H.261; Geneva; Dec. 1990; 2 cover pages and pp. 1-27.

CCITT; "Draft Revision of Recommendation H.261: Video Codec for Audiovisual Services at p x 64kbit/s;" Image Processing: Image Communication 2, vol. 2, No. 2; Aug. 1990; pp. 221-239.

CED Magazine: 50 Years of Cable Technology, The 1980s; http://www.cedmagazine.com/retro/eighties.html; Cahners Business Information; Jun. 1998; 4 pages.

Chiariglione, et al.; "Press Release—Status report of ISO MPEG;" International Organization for Standardization, ISO/IEC JTC1/SC2/WG11 N0015 MPEG 90/263, Coding of Moving Pictures and Associated Audio; Sep. 1990; 2 pages.

Chiariglione, Leonardo.; "Twelfth WG11 Meeting Report" International Organization for Standardization, ISO/IEC JTC1/SC2/WG11 N0029 MPEG 90/271, Coding of Moving Pictures and Associated Audio; Oct. 1990; 33 pages.

Childs, Geoff; "United Kingdom Videotex Service and The European Unified Videotex Standard;" IEEE Journal on Selected Areas in Communications, vol. SAC-1, No. 2; Feb. 1983; pp. 245-249.

Chitnis, et al.; "Videotex Services: Network and Terminal Alternatives;" IEEE Transactions on Consumer Electronics, vol. CE-25, No. 3; Jul. 1979; cover page and pp. 269-277.

Chow, et al.; "Achieving Multimedia Communications on a Heterogeneous Network;" IEEE Journal on Selected Areas in Communications, vol. 8, No. 3; Apr. 1990; cover page and pp. 348-359.

Chowdhury, Shyamal; "On Message Resequencing in Computer Networks;" Eighth Annual International Phoenix Conference on Computers and Communications, 1989 Conference Proceedings; Mar. 1989; pp. 231-235.

Christodoulakis et al.; "Multimedia Document Presentation, Information Extraction, and Document Formation in MINOS: A Model and A System;" ACM Transactions on Office Information Systems, vol. 4, No. 4; Oct. 1986; pp. 345-383.

Claims 1-10 filed on Mar. 19, 2003 for European Application No. 03090074.0-1241; 5 pages.

Claims 1-91 filed on Apr. 23, 2003 for European Application No. 03090117.7-1241; 16 pages.

Claims 1-118 filed on Apr. 23, 2003 for European Application No. 03090118.5-1241; 18 pages.

Claims 1-82 filed on Jun. 18, 2003 for European Application No. 03090183.9-1241; 13 pages.

Claims 1-104 filed on Jun. 20, 2003 for European Application No. 03090185.4-1241; 16 pages.

Claims 1-54 filed on Apr. 23, 2003 for European Application No. 03090119.3-1241; 11 pages.

Claims 1-95 filed on Jul. 9, 2003 for European Application No. 03090208.4-2202; 19 pages.

Clark, et al.; "Architectural Considerations for a New Generation of Protocols;" SIGCOMM '90 Symposium, Communications Architectures & Protocols; Computer Communications Review, vol. 20, No. 4; Sep. 1990; 2 cover pages and pp. 200-208.

Clarke et al.; "Network Cards for the Pandora Multimedia System;" Olivetti Research Limited, ORL Techincal Report 94-5; 14 pages.

Cohen, Danny, et al.; "A Network Voice Protocol NVP-II;" USC/ISI, ISI/RR-81-90; Apr. 1, 1981; 4 cover pages and pp. 1-71.

Cohen, Danny; "Issues in Transnet Packetized Voice Communication;" Fifth Data Communications Symposium; Sep. 27-29, 1977; cover page and pp. 6-10-6-13.

Cohen, Danny; "Specifications for the Network Voice Protocol (NVP) and Appendix 1 and 2;" NSC Note 68; NWG/RFC 741 ; Jan. 1976; 4 cover pages and pp. 1-30.

Cole, Randy; "PVP—A Packet Video Protocol;" Information Sciences Institute, University of California; Aug. 11, 1981; pp. 1-14.

Commentary: "ISDN Concept of Next Generation;" Nikkei Electronics, No. 438; Jan. 11, 1988; pp. 121-137.

Cook, A.R.J., et al.; "Low-Cost Digital Passive Optical Networks;" IEEE International Conference on Communications; 1990; pp. 0659-0662.

Cooper, J. Carl; "Video-to-Audio Synchrony Monitoring and Correction;" SMPTE Journal; Sep. 1988; pp. 695-698.

Coulson, et al.; "Extensions to ANSA for Multimedia Computing;" Reprinted from Computer Networks and ISDN Systems, vol. 25; pp. 305-323; 1992; pp. 1-23.

Coutrot, F., et al.; "A Single Conditional Access System for Satellite-Cable and Terrestrial TV;" IEEE Transactions on Consumer Electronics; Aug. 1989; vol. 35, No. 3; pp. 464-468.

Cox, J., et al.; "Images on the Internet: Enhanced User Access;" Database, vol. 17, No. 4; Aug. 1994; pp. 18-22 and 24-26.

Creutz, et al.; "An Approach Towards Information Systems with Very Large Numbers of Subscribers;" Workshop on Computer Architecture for Non-Numeric Processing, SIGIR, vol. XV, No. 2, SIGMOD, vol. X, No. 4; Mar. 11-14, 1980; Pacific Grove, California; cover page and p. 126-127.

Cringely, Robert X.; "Bill to Linus: You Own Me. Did Bill Gates Invent Open Source Software? No, But He'll Take Credit for It, Anyway;" I Cringely, The Pulpit; Nov. 22, 2001; file://C:\Documents%20and%20Settings\d1r\Local%20Settings\Temporary%20_Internet%20...; May 1, 2003; 5 pages.

Crutchfield, B.; "HDTV Delivery to the Consumer;" IEEE Transactions on Broadcasting; vol. BC-33, No. 4; Dec. 1987; cover page and pp. 184-187.

Cutts, D.; "A Complete System for Controlled Access Television;" Proceedings of the International Broadcasting Convention; Sep. 21-25, 1990; pp. 266-269.

Davies, et al.; "Experiences of Handling Multimedia in Distributed Open Systems;" Symposium on Experiences with Distributed and Multiprocessor Systems; Newport Beach, California; Mar. 26-27, 1992; cover page and pp. 173-190.

Davies, et al.; "Technological Perspective on Multimedia Computing;" Computer Communications, vol. 14, No. 5; Butterworth-Heinemann Ltd.; Jun. 1991; cover page and pp. 260-272.

DeBosio, et al.; "Wide-Band Interactive Services Experiment (WISE): A First Test of Future Video Services;" IEEE Journal on Selected Areas in Communications; Nov. 1985; vol. SAC-3, No. 6; pp. 835-841.

Declaration of Anthony I. Rozmanith in Reexamination Control No. 90/005,742; Reexamination filed Jun. 9, 2000 entitled "Remote Query Communication System;" dated Jan. 8, 2002; 3 pages with Exhibits A-D, F, and G, 27 pages.

Declaration of Egon Stephen Fabian in Reexamination Control No. 90/005,742; Reexamination filed Jun. 9, 2000 entitled "Remote Query Communication System;" dated Jan. 11, 2002; 3 pages with Exhibits A-D, F, and G, 27 pages.

DeFrancesco, et al.; Digital Processing of TV Signals: System Overview of a New IC Solution; IEEE Transactions on Consumer Electronics; vol. 34, No. 1; Feb. 1988; pp. 246-252.

DeMaria, Rusel; "Presentation Graphics Now Within GRASP;" PC Week; vol. 4, No. 23; Jun. 1987; cover page and p. 92.

Dolev, et al.; "Bounded Concurrent Time-Stamp Systems are Constructible;" Proceedings of the Twenty-First Annual ACM Symposium on Theory of Computing; 1989; pp. 454-466.

Domann, G.; "A B-ISDN System Concept and the BERKOM-Testnetwork;" Information Technology for Organizational Systems; Proceedings of the First European Conference on Information Technology for Organizational Systems—EURINFO '88; Athens, Greece; May 16-20, 1988; cover page and pp. 466-472.

Domann, et al.; "A Modular Broadband ISDN Concept" ISSLS 86, the International Symposium on Subscriber Loops and Services; Sep. 29-Oct. 3, 1986; Tokyo, Japan; 3 cover pages and pp. 181-186.

Domann, et al.; "B-ISDN Field Trial Concept" ISDN Europe 86, First Pan European Conference on ISDN; Nov. 5-7, 1986; Switzerland; 3 cover pages and pp. 138-140.

Domann, G.; "BERKOM Test Network and BISDN/CATV Concept" Electrical Communication, vol. 62, No. 3/4; 1988; cover page and pp. 325-332.

Dorros, I.; "Telephone Nets Go Digital;" IEEE Spectrum; Apr. 1983; cover page and pp. 48-53.

Dorros, I.; "The Picturephone System: The Network;" The Bell System Technical Journal, vol. 50, No. 2; Feb. 1971; 2 cover pages and pp. 221-233.

Dourish; "Godard: A Flexible Architecture for Audio/Video Services in a Media Space;" Rank Xerox EuroPARC; Cambridge, UK; Jun. 1991; 10 pages.

Drapeau et al.; "MAEstro—A Distributed Multimedia Authoring Environment;" USENIX—Summer '91; Nashville, TN; pp. 315-328.

Dubois; "The Sampling and Reconstruction of Time-Varying Imagery with Application in Video Systems;" Proceedings of the IEEE, vol. 73, No. 4; Apr. 1985; cover page and pp. 502-522.

Dupire, et al.; "L'Installation D'Abonne Du Reseau Multiservices De Biarritz;" ISSLS 84, The Sixth International Symposium on Subscribers Loops and Services; Oct. 1-5, 1984; cover page and pp. 99-106.

Eargle, John M.; "On the Processing of Two- and Three-Channel Program Material for Four-Channel Playback;" Journal of the Audio Engineering Society; Apr. 1971; vol. 19, No. 4; pp. 262-266.

Eddy, A.; "Database Delphi;" ST-Log; Oct. 1988; Issue 24; cover page and pp. 5 and 88-90.

Edmond et al.; "The Butterfly Satellite IMP for the Wideband Packet Satellite Network;" ACM, SIGCOMM '86 Symposium, Communications Architectures & Protocols; Stowe, Vermont; Aug. 5-7, 1986; 2 cover pages and pp. 194-203.

Eigen, Daryl J.; "Narrowband and Broadband ISDN CPE Directions;" IEEE Communications Magazine; Apr. 1990; pp. 39-46.
Einstein, J.; "Making Moving Pictures;" PC Magazine; Sep. 27, 1988; pp. 241-249.
El-Toweissy et al.; "The Mean Value Approach to Performance Evaluation of Time-Stamp Ordering Algorithms;" Lecture Notes in Computer Science, Advances in Computing and Information—ICCI '91, International Conference on Computing and Information; Ottawa, Canada; May 27-29, 1991; cover page and pp. 276-287.
Ellis et al.; "INDAX: An Operational Interactive Cabletext System;" IEEE Journal on Selected Areas in Communications, vol. SAC-1, No. 2; Feb. 1983; pp. 285-294.
Engineer, Carl P.; "Can PON go Broadband?" Telephony; Jan. 14, 1991; pp. 30, 32, and 35.
European Search Report for European Application No. 99201346.6-2216; filed Jan. 3, 1992; Search Report completed Jun. 22, 1999 and mailed Jan. 7, 1999; 3 pages.
European Search Report for European Application No. 03090074.0-1241; filed Jan. 3, 1992; Search Report completed Aug. 29, 2003 and mailed Sep. 9, 2003; 3 pages.
European Search Report for European Application No. 03090117.7-1241; filed Jan. 3, 1992; Search Report completed Aug. 28, 2003 and mailed Sep. 9, 2003; 5 pages.
European Search Report for European Application No. 03090118.5-1241; filed Jan. 3, 1992; Search Report completed Aug. 28, 2003 and mailed Sep. 9, 2003; 5 pages.
European Search Report for European Application No. 03090183.9-1241; filed Jan. 3, 1992; Search Report completed Aug. 28, 2003 and mailed Sep. 9, 2003; 2 pages.
European Search Report for European Application No. 03090185.4-1241; filed Jan. 3, 1992; Search Report completed Aug. 28, 2003 and mailed Sep. 9, 2003; 5 pages.
European Search Report for European Application No. 03090119.3-1241; filed Jan. 3, 1992; Search Report completed Aug. 28, 2003 and mailed Sep. 10, 2003; 5 pages.
European Search Report for European Application No. 03090208.4-2202; filed Jan. 3, 1992; Search Report completed Oct. 9, 2003 and mailed Oct. 17, 2003; 3 pages.
Fantel, Hans; "Digital Video: Hype vs. Reality;" Discover; Dec. 1988; pp. 28-29.
Faulkner, David W., et al.; "Optical Networks for Local Loop Applications;" Journal of Lightware Technology, vol. 7, No. 11; Nov. 1989; pp. 1741-1751.
Feiner, et al.; "An Experimental System for Creating and Presenting Interactive Graphical Documents;" ACM Transactions on Graphics, vol. 1, No. 1; Jan. 1982; pp. 59-77.
Ferrari et al.; "A Scheme for Real-Time Channel Establishment in Wide-Area Networks;" IEEE Journal on Selected Areas in Communication, vol. 8, No. 3; Apr. 1990; pp. 368-379.
First International Workshop on Network and Operating System Support for Digital Audio and Video, TR-90-062, ICSI; Berkeley, California; Nov. 8-9, 1990; Including: 3 cover pages; Anderson, D., et al., "Design and Implementation of a Continuous Media I/O Server," 5 pages; Auzimor, et al., "An Analysis of Multimedia Restitution and its Architectural Impact," 6 pages; Bates, et al., "Touring Machine: A Video Telecommunications Software Testbed," 6 pages; Blair, et al., "Distributed Systems Support for Heterogeneous, Multimedia Environments," 7 pages; Blakowski, G., "Supporting the Distributed Processing of Multimedia Information in an Object-Oriented, Heterogeneous Environment," 5 pages; Crutcher, et al., "Connection Management for an Integrated-Services Network and its Application to the Multi-Media Communications of a Distributed Team," 6 pages; Herrtwich, Ralf Guido, "The DASH Resource Model Revisited or Pessimism Considered Harmful," 5 pages; Jeffay, et al., "Designing a Workstation-Based Conferencing System Using the Real-Time Producer/Consumer Paradigm," 5 pages; Katseff, et al., "An Overview of the Liason Network Multimedia Workstation," 5 pages; Kurose, et al., "Scheduling Policies for Supporting Real-Time Traffic in Wide-Area Computer Networks," 5 pages; Momtahan, et al., "PX Connection Architecture," 5 pages; Pasquale, et al., "System Support for Multimedia Applications," 5 pages; Pehrson, et al., "MultiG: A Swedish Research Program on Multimedia Applications in Gigabit Networks," 5 pages; Sansom, et al., "The Impact of Broadband Integrated Services on the Structure of Sytems and Application Software," 3 pages; Seo, K., "Terrestrial Wideband Network Support for Conferencing," 4 pages; Sreenan, C., "Synchronized Retrieval of Multi-Media Data," 3 pages; Steinmetz, et al., "Compound Multimedia Objects—Integration into Network and Operating System," 6 pages; Tennenhouse, David L., "The Viewstation Research Program on Distributed Video Systems," 6 pages; Tokuda, et al., "The Impact of Priority Inversion on Continuous Media Applications," 5 pages; Topolcic, C., "ST II," 5 pages; Verma, D., et al., "Guaranteeing Delay Jitter Bounds in Packet-Switching Networks," 5 pages; Weiss, Karl-Heinz, "Formal Specification and Continuous Media," 4 pages; and Wybranietz, et al., "Support for Multi-Media Communication in Future Private Networks," 5 pages; 119 pages collectively.
Flinchbaugh, G.D., et al.; "Network Capabilities in Support of Multimedia Applications;" IEEE Globecom; Dec. 1990; pp. 322-326.
Forbis, Steve; "Reinventing the VCR;" Video; Sep. 1989; pp. 70-73 and 142-143.
Forgie, James W.; "Speech Transmission in Packet-Switched Store-and-Forward Networks;" AFIPS Conference Proceedings, 1975 National Computer Conference; May 19-22, 1975; cover page and pp. 137-142.
Fox; "Advances in Interactive Digital Multimedia Systems;" IEEE Computer; Oct. 1991; cover page and pp. 9-21.
Fox; "Standards and the Emergence of Digital Multimedia Systems;" Communications of the ACM; Apr. 1991; cover page and pp. 27-29.
Fox, E.; "The Coming Revolution in Interactive Digital Video;" Communications of the ACM; Jul. 1989; vol. 32, No. 7; pp. 794-801.
Freed; "MIME Speaks Out" LAN Magazine, vol. 7, No. 7; Jul. 1992; cover page and pp. 67 and 70-74.
Frenkel; "The Next Generation of Interactive Technologies;" Communications of the ACM, vol. 32, No. 7; Jul. 1989; pp. 872-881.
Friedman, D.; "Sizzling Sounds;" *Amiga World*; Oct. 1989; IDGG/I Publication; cover pages (2) and pp. 48-56.
Fujikawa et al.; "Multimedia Presentation System 'Harmony' with Temporal and Active Media;" USENIX—Summer '91; Nashville, TN; pp. 75-94.
Gabriel; "Dial a Program—An HF Remote Selection Cable Television System;" Proceedings of the IEEE, vol. 58, No. 7; Jul. 1970; cover page and pp. 1016-1023.
Gaggioni, et al.; "Digital Video Transmission and Coding for the Broadband ISDN;" IEEE Transactions on Consumer Electronics; vol. 34, No. 1; Feb. 1988; cover page and pp. 16-35.
Gagnon, D.; "Interactive Television: State of the Industry;" Arlen Communications Inc.; May 1990; pp. 1-49 and 51-81.
Garault, et al.; "A Digital MAC Decoder for the Display of a 16/9 Aspect Ratio Picture on a Conventional TV Receiver;" IEEE Transactions on Consumer Electronics; vol. 34, No. 1; Feb. 1988; cover page and pp. 137-146.
Gardiner, Paul; "The UK D-MAC/Packet Standard for DBS;" IEEE Transactions on Consumer Electronics; vol. 34, No. 1; Feb. 1988; cover page and pp. 128-136.
Garrett, et al.; Intermedia: Issues, Strategies, and Tactics in the Design of a Hypermedia Document System; Proceedings of the 1986 ACM Conference on Computer-Supported Cooperative Work; 1986; pp. 163-174.
Geier, et al.; "Measurement of TV Digital Sound NICAM-728;" News from Rohde and Schwarz; vol. 29, No. 127; 1989/IV; pp. 40-41.
Gelman, A.D., et al.; "A Store-and-Forward Architecture for Video-on-Demand Service;" IEEE International Conference on Communications; 1991; pp. 0842-0846.
Gelman, A., et al.; "Analysis of Resource Sharing in Information Providing Services;" Proceedings of the IEEE Global Telecommunications Conference, Presented at Globecom '90; Dec. 1990; pp. 312-316.
Georganas, et al.; "Guest Editorial Multimedia Communications;" vol. 8, No. 3; Apr. 1990; cover page and pp. 322-324.
Gibbs et al.; "Muse: A Multimedia Filing System;" IEEE Software; Mar. 1987; pp. 4-15.
Gifford et al.; "The Cedar File System;" Communications of the ACM, vol. 31, No. 3; Mar. 1988; pp. 288-298.
Gifford; "Polychannel Systems for Mass Digital Communication;" Communications of the ACM, vol. 33, No. 2; Feb. 1990; cover page and pp. 141-151.

Gillmor, S.; "The Business;" *Amazing Computing*; 1989; vol. 4, No. 5; cover page and pp. 4 and 54-58.

Ginyama; "NTT's Video Response System in the Broadband ISDN Experiment" IEEE International Conference on Communications '86, Conference Record vol. 1 of 3; Toronto, Canada; Jun. 22-25, 1986; 2 cover pages and pp. 361-365.

Glass, L. Brett; "Digital Video Interactive;" Byte; May 1989; McGraw-Hill Publication; cover page and pp. 4 and 283-289.

Glenn, et al.; "High Definition Television Compatible Transmission System;" IEEE Transactions on Broadcasting; vol. BC-33, No. 4; Dec. 1987; cover page and pp. 107-115.

Glossary; "A-Law to Z-Transform;" pp. G-1-G-14.

Godfrey, et al.; "Class Simulation of Real Time, Highly Compressed Video Transmission Through an Interference Limited Environment;" Winter Simulation Conference Proceedings; Published by IEEE; 1989; pp. 1065-1075.

Goldberg et al.; "A Prototype Multimedia Radiology Communication System;" Multimedia '89 Conference; Ottawa, Ontario, Canada; 6 pages.

Govindan, Ramesh, et al.; "Scheduling and IPC Mechanisms for Continuous Media;" Operating Systems Review, 13th ACM Symposium on Operating Systems Principles; Oct. 1991; vol. 25, No. 5; pp. 68-80.

Graves, Alan F.; "The Heathrow Broadband Access System;" IEEE Global Communications Conference; 1989; 1675-1679.

Gray et al.; "A Multiservice System Using Fiber Optic Loops;" GTE Laboratories Incorporated; Waltham, Massachusetts; pp. 119-124.

Greaves et al.; "Cambridge HSLAN Protocol Review;" Presented at IFIP WG6.1 Workshop, IBM Ruschlikon; May 1989; 11 pages.

Greiner, B.; "Make Your Own Demo Software Package;" Computing Canada; Apr. 1989; pp. 24 and 32.

Haber et al.; "How to Time-Stamp a Digital Document" Advances in Cryptology—CRYPTO '90 Proceedings; Germany; 1991; 2 cover pages and pp. 437-455.

Hagen, J.; "Not Just a Paint Job;" Amiga World; Jul. 1989; IDGG/I Publication; cover page and pp. 4 and 49-54.

Hagen, J.; "Page-Flipping Animation;" Amiga World; Jun. 1989; IDGG/I Publication; cover page and pp. 50-51.

Handler; "Networking—Bit by Bit" Videotex—Key to the Information Revolution; cover page and pp. 477-487.

Hane, Paula; "New Directions in Databases;" Database, vol. 17, No. 1; Aug. 1994; pp. 19-26.

Hara; "Conceptual Design of a Switched Television-Distribution System Using Optical-Fiber Waveguides;" IEEE Transactions on Cable Television, vol. CATV-2, No. 3; Jul. 1977; cover page and pp. 120-130.

Hardt-Kornacki et al.; "Optimization Model for the Delivery of Interactive Multimedia Documents;" IEEE, Globecom '91; 1991; pp. 0669-0673.

Hartman, Richard; "Compressed Video Transmission Becoming Hot New DOD Requirement;" Defense Electronics; May 1985; pp. 95, 97-98, 103-104, and 106.

Haskell, Barry G., et al.; "Comparison of Discrete Cosine Transform and Vector Quantization of Medical Imagery;" SPIE, vol. 626 Medicine XIV/PACS IV; 1986; pp. 399-408.

Hata et al.; "Present Situation and Future Trends of Visual Communication Systems;" Oct. 1987; pp. 58-62 and 64.

Hausdorf, Von Reiner; "Anti-Kopierschutz-Schaltung für R-DAT;" Funkschau, No. 18; Aug. 1989; pp. 175-176.

Hayward et al.; "A Broadband ISDN Local Access System Using Emerging-Technology Components;" IEEE International Switching Symposium 1987, Proceedings; Phoenix, Arizona; Mar. 15-20, 1987; vol. 3 of 4; cover page and pp. 0597-0601.

Hedger; "Telesoftware: Home Computing via Broadcast Teletext" IEEE Transactions on Consumer Electronics, vol. CE-25, No. 3; Jul. 1979; cover page and pp. 279-287.

Heijden, J. van der; "DIVAC: A Dutch Integrated Services Glass Fibre Experimentation System and Demonstration Set-Up;" IEEE International Conference on Communications; ICC '84; Links for the Future: Science, Systems & Services for Communications; May 14-17, 1984; vol. 3; pp. 1145-1149.

Henry, E. William; "Advanced Television Systems;" IEEE Transactions on Broadcasting; vol. BC-33, No. 4; Dec. 1987; cover page and pp. 90-92.

Herman et al.; "The Modular Integrated Communications Environment (MICE): A System for Prototyping and Evaluating Communications Services;" IEEE International Switching Symposium 1987, Proceedings; Phoenix, Arizona; Mar. 15-20, 1987; vol. 2 of 4; cover page and pp. 0442-0447.

Herrtwich; "Audio and Video in Distributed Computer Systems: Why and How?" International Computer Science Institute, TR-90-026; Berkeley, California; Jul. 2, 1990; 2 cover pages and pp. 1-13.

Herrtwich; "Time Capsules: An Abstraction for Access to Continuous-Media Data;" International Computer Science Institute; Berkeley, California; IEEE; 1990; pp. 11-20.

Hidaka, et al.; "Subjective Assessment of Redundancy-Reduced Moving Images for Interactive Application: Test Methodology and Report;" Signal Processing: Image Communication; vol. 2, No. 2; Aug. 1990; pp. 201-219.

Hightower, Neale C.; "Integrated Voice, Data, and Video in the Local Loop;" IEEE Global Communications Conference; 1986; pp. 0915-0919.

Hioki, et al.; "Hi-Vision Optical Video Disc;" IEEE Transactions on Consumer Electronics; Feb. 1988; vol. 34, No. 1; pp. 72-77, plus 1 page.

Hiramatsu, A.; "A Self-Learning Control of ATM Service Quality Using Neural Network;" Trans. Inst. Electron. Inf. Commun. Eng. B-1; vol. J72 B-1, No. 7; Jul. 1989; cover page and pp. 564-573.

Hirrel, Michael; "Making HDTV Viable Via Direct Broadcast Satellite;" Broadcasting; Oct. 1988; p. 26.

Hodge, et al.; "Video on Demand: Architecture, Systems, and Applications;" SMPTE Journal; Sep. 1993; pp. 791-803.

Hodges, et al.; "A Construction Set for Multimedia Applications;" IEEE Software; Jan. 1989; cover page and pp. 37-43.

Homsy, et al.; "Implementation Issues for a Network Continuous-Media I/O Server;" Computer Science Division, EECS Department, University of California; Berkeley, California; Technical Report No. CSD-90-597; Sep. 19, 1990; pp. 1-21.

Horne, J.; "The Squeeze Play;" Amiga World; May 1989; IDGG/I Publication; cover pages and pp. 4 and 41-46.

Hopper; "Pandora—A Multi-Media Experimental System;" Impromptu Seminar, NE43-312A; Oct. 5, 1989; 14 pages.

Hopper, A.; "Pandora—An Experimental System for Multimedia Applications;" Operating Systems Review; vol. 24, No. 2; Apr. 1990; cover page and pp. 19-34.

Hopper, A., et al.; "The Cambridge Fast Ring Networking System;" IEEE Transactions on Computers; vol. 37, No. 10; Oct. 1988; pp. 1214-1223.

Hopper; "Design and Use of High-Speed Networks in Multimedia Applications;" Proceedings of 3rd IFIP Conference on High Speed Networking, ORL-91-2; Berlin; Mar. 1991; cover page and pp. 1-14.

Housel et al.; "SNA Distribution Services;" IBM Systems Journal, vol. 22, No. 4; 1983; cover page and pp. 319-343.

Howard; "An Overview of the Andrew File System;" Proceedings of the Winter 1988 USENIX Conference, USENIX Association; Dallas, Texas; Feb. 11-12, 1988; cover page and pp. 23-26.

Hyde, P.A.; "The Conditional Access System;" IEEE Colloquium on UK Direct Broadcast Satellite; Jan. 1989; pp. 8/1-8/4.

IEEE Journal on Selected Areas in Communications; vol. SAC-5, No. 7; Aug. 1987; cover page.

Imai et al.; "Network Architecture Expansion for INS—DCNA Multi-Media Communication Protocols;" Japan Telecommunications Review; Oct. 1982; pp. 345-351.

Iredale, Richard; "High Definition NTSC Broadcast Protocol;" IEEE Transactions on Broadcasting; vol. BC-33, No. 4; Dec. 1987; cover page and pp. 161-169.

Irven et al.; "Multi-Media Information Services: A Laboratory Study;" IEEE Communications Magazine, vol. 26, No. 6; Jun. 1988; cover page and pp. 27-33 and 36-44.

Isayama et al.; "Voice Storage Services;" JTR; Oct. 1986; pp. 271-280.

Ishiguro, Tatsuo, et al.; "Television Bandwidth Compression Transmission by Motion-Compensated Interframe Coding;" IEEE Communications Magazine; Nov. 1982; pp. 24-26 and 28-30.

Itu; "Operating Rules for International Phototelegraph Calls to Multiple Destinations;" International Telecommunication Union; Operations and Quality of Service Telegraph Services; ITU-T Recommendation F.108; Nov. 1988; 2 cover pages and pp. 1-4.

Itu; "Visual Telephone Systems;" International Telecommunication Union; Line Transmission of Non-Telephone Signals; ITU-T Recommendation H.100; Nov. 1988; 2 cover pages and pp. 1-7.

Itu; "Hypothetical Reference Connections for Videoconferencing Using Primary Digital Group Transmission;" International Telecommunication Union; Line Transmission of Non-Telephone Signals; ITU-T Recommendation H.110; Nov. 1988; 2 cover pages and pp. 1-6.

Itu; "A Multipoint International VideoConference System;" International Telecommunication Union; Line Transmission of Non-Telephone Systems; ITU-T Recommendation H.140; Nov. 1988; 2 cover pages and pp. 1-7.

Jain, et al.; "Displacement Measurement and Its Application in Interframe Image Coding;" IEEE, Transactions on Communications, vol. COM-29, No. 12; Dec. 1981; cover page and pp. 1799-1808.

Jain, et al.; "Image Data Compression: A Review;" Proceedings of the IEEE, vol. 69, No. 3; Mar. 1981; cover page and pp. 349-389.

Jalali, et al.; "A Component Codec and Line Multiplexer;" IEEE Transactions on Consumer Electronics; vol. 34, No. 1; Feb. 1988; cover page and pp. 156-165.

Jardetzky; "Network File Server Design for Continuous Media;" Darwin College, University of Cambridge; Aug. 1992; 113 pages.

Johnson, C.E., Jr.; "High-Density Magnetic Recording: A Driving Force for HDTV?" Eighth International Conference on Video, Audio, and Data Recording; Apr. 24-26, 1990; pp. 50-53.

Johnston, et al.; "Distributed Scientific Video Movie Making;" Proceedings of the 1988 ACM/IEEE Conference on Supercomputing; 1988; pp. 156-162.

Johnston, J.; "MPEG—Audio Draft, Description as of Dec. 10, 1990-ISO/IEC JTC1/SC2/WG11;" COMPCON; Feb. 1991; pp. 336-337.

Jones, A., et al.; "Handling Audio and Video Streams in a Distributed Environment;" Technical Report 93-4; Olivetti Research Limited; 1993; 13 pages.

Joseph, et al.; "Shared Access Packet Transmission System for Compressed Digital Video;" Jun. 1989; IEEE Journal on Selected Areas in Communication; vol. 7, No. 5.; Jun. 1989; pp. 815-825.

Judice, Charles N.; "Communications in 2001—The Third Age of Video;" Radio Electronics; vol. 58, No. 5; May 1987; cover page and pp. 102-105.

Judice, C.N.; "Entertainment Video-on-Demand at T1 Transmission Speeds (1.5 Mb/s);" Proceedings of the SPIE vol. 1001, Pt. 1; Visual Communications and Image Processing; 1988; pp. 396-397.

Judice; "Interactive VCRs? Movies on Demand? They're Coming—Soon!" Radio Electronics, vol. 58, No. 5; May 1987; cover page and pp. 102-105.

Judice, et al.; "Telematic Services and Terminals: Are We Ready?" IEEE Communications Magazine; Jul. 1987; vol. 25, No. 7; pp. 19-29.

Judice, C.N., et al.; "Video on Demand: A Wideband Service or Myth?" IEEE International Conference on Communications; 1986; pp. 1735-1739.

Juliussen, E.; "Personal Computers in 1990;" Reprinted from Creative Computing; vol. 10, No. 11; Nov. 1984; p. 258; http://www.atarimagazines.com/creative/v10n11/258_Personal_computers_in_199.php; 4 pages.

Jurgen, Ronald K.; "High-Definition Television Update;" IEEE Spectrum; Apr. 1988; pp. 56-62.

Jurgen; "Two-Way Applications for Cable Television Systems in the '70s;" IEEE Spectrum; Nov. 1971; cover page and pp. 39-54.

Kaiba, et al.; "Broadband Subscriber Network Configuration in Japan;" The Sixth International Symposium on Subscribers Loops and Services; ISSLS 84; Oct. 1-5, 1984; cover page and pp. 1-5.

Kamae, et al.; "Interactive Techniques for Producing and Encoding Color Graphics;" Real-Time/Parallel Computing Image Analysis; Plenum Press, New York and London; cover page and pp. 267-278.

Kamel, et al.; "PX: Supporting Voice in Workstations;" Computer; Aug. 1990; cover page and pp. 73-80.

Kameyama, et al.; "A Proposal of Multimedia Document Architecture and Video Document Architecture;" IEEE International Conference on Communications; 1991; pp. 0511-0515.

Kameyama, et al.; "Extended Document Architecture for Maps;" IEEE Global Telecommunications Conference & Exhibition; Dallas, Texas; Nov. 27-30, 1989; cover page and pp. 0975-0979.

Kanno, et al.; "Fiber Optic Digital Video Signals Transport for Broadband Subscriber Network;" IEEE; 1988; pp. 0222-0229.

Kappagantula, et al.; "Motion Compensated Interframe Image Prediction;" IEEE Transactions on Communications, vol. COM-33, No. 9; Sep. 1985; pp. 1011-1015.

Karlsson, et al.; "Packet Video and Its Integration Into the Network Architecture;" IEEE Journal on Selected Areas in Communications; Jun. 1989; vol. 7, No. 5; pp. 739-751.

Karmouch, et al.; "A Multimedia Medical Communications System;" IEEE Journal on Selected Areas in Communications, vol. 8, No. 3; Apr. 1990; cover page and pp. 325-339.

Karshmer, et al.; "Computer Networking on Cable TV Plants;" IEEE Network; Nov. 1992; cover page and pp. 32-40.

Karshmer, et al.; "TVNet: An Image and Data Delivery System Using Cable T.V. Facilities;" Computer Networks and ISDN Systems; vol. 15, No. 2; 1988; cover page and pp. 135-151.

Katagiri, et al.; "A Digital Video Telephone Subscriber Set With 64 Kbit/s Transmission Rate;" ISSLS 80, The International Symposium on Subscriber Loops and Services; Sep. 15-19, 1980; cover page and pp. 167-171.

Katseff, et al.; "Experiences with the Liaison Network Multimedia Workstation;" Usenix Association, SEDMS II Symposium on Experiences with Distributed and Multiprocessor Systems; Atlanta, GA; Mar. 21-22, 1991; 2 cover pages and pp. 341-347.

Katz, R.; "Pay-Per-View Music Videos: Will Viewers Ante Up to Play Them?" Channels—The Business of Communications; Jan. 1989; cover page and p. 16.

Katz, Richard; "Video Jukebox Finds Harmony in Low-Power;" Channels—The Business of Communications; Oct. 1989; cover page and p. 10.

Kerr, G.W.; "On-Demand Interactive Video on the British Telecom Switched-Star Cable-Television Network;" British Telecommunications Engineering, vol. 6; Apr. 1987; pp. 17-22.

Kim et al.; "A Self-Routing Multistage Switching Network for Broadband ISDN;" IEEE Journal on Selected Areas in Communications, vol. 8, No. 3; Apr. 1990; pp. 459-465.

Kimura, et al.; "A High-Definition Satellite Television Broadcast System—'Muse';" Journal of the Institution of Electronic and Radio Engineers; Oct. 1985; vol. 55, No. 10; cover page and pp. 353-356.

King; "Pandora: An Experiment in Distributed Multimedia;" ORL 92-5, Proceedings of Eurographics '92, Olivetti Research Limited; Sep. 1992; 13 pages.

Kishimoto, et al.; "Bit-Rate Reduction in the Transmission of High-Definition Television Signals;" SMPTE Journal; Feb. 1987, vol. 96, No. 2; pp. 191-197.

Kobayashi, Naoki, et al.; "Multimedia Document Structure for Dialog Communication Service;" IEEE International Conference on Communications; 1991; pp. 526-531.

Kobayashi; "Video Response System—VRS—;" Japan Telecommunications Review; Apr. 1978; pp. 115-123.

Komiya, Takashi, et al.; "An Approach to the Multifunction Graphic Terminal for the ISDN Environment" Communications for the Information Age; Conference Record, GLOBECOM '88, IEEE Global Telecommunications Conference and Exhibition; vol. 1; Nov. 28-Dec. 1, 1988; 0032-0036.

Komiya, Takashi, et al.; "An Approach to the Multifunction Graphic Terminal for the ISDN Environment" IEEE Network Magazine; vol. 3, No. 5; Sep. 1989; pp. 37-43.

Komoto, et al.; "NHK Studies of PCM Sound Transmission for Television Satellite Broadcasting;" NHK Technical Monograph; Nov. 1987, No. 37; 4 cover pages and pp. 3-11, 14-32.

Kunkel, G.; "Vista Opens New Spectrum of 16 Million Colors at 1K Resolution;" PC Magazine; Oct. 27, 1987; vol. 6, No. 18; cover page and p. 34.

Kurachi; "Present Trends in High-Speed and Broad-Band Communications Services in Japan;" IEEE Journal on Selected Areas in Communications; vol. SAC-4, No. 4; Jul. 1986; cover page and pp. 438-443.

Lake, et al.; "A Network Environment for Studying Multimedia Network Architecture and Control;" IEEE Global Telecommunications Conference & Exhibition; Dallas, Texas; Conference Record, vol. 2 of 3; Nov. 27-30, 1989; cover page and pp. 1232-1236.

Larsson, et al.; "User Demand and Implementation of New Services in ISDN;" The Sixth International Symposium on Subscribers Loops and Services, ISSLS 84; Oct. 1-5, 1984; cover page and pp. 23-27.

Lazar; "An Architecture for Real-Time Control of Broadband Networks;" IEEE Global Telecommunications Conference, Globecom '91; Phoenix, Arizona; Conference Record, vol. 1 of 3; Dec. 2-5, 1991; cover page and pp. 0289-0295.

Lazar, et al.; "MAGNET: Columbia's Integrated Network Testbed;" IEEE Journal on Selected Areas in Communications, vol. SAC-3, No. 6; Nov. 1985; cover page and pp. 859-871.

Lazar, et al.; "MAGNET II: A Metropolitan Area Network Based on Asynchronous Time Sharing;" IEEE Journal on Selected Areas in Communications, vol. 8, No. 5; Oct. 1990; pp. 1582-1594.

Lazar, et al.; "Packetized Video on MAGNET;" Optical Engineering, vol. 26, No. 7; Jul. 1987; pp. 596-602.

Lazar, et al.; "Real-Time Traffic Measurements on MAGNET II;" IEEE Journal on Selected Areas in Communications, vol. 8, No. 3; Apr. 1990; pp. 467-483.

Le Coquil, et al.; "Videocommunication Networks and Extension to Low-Density Area;" ISSLS 86, The International Symposium on Subscriber Loops and Services; Tokyo, Japan; Sep. 29-Oct. 3, 1986; 2 cover pages and pp. 18-23.

Lederman, S.; "Video-on-Demand—A Traffic Model and GOS Technique;" IEEE Global Communications Conference; 1986; pp. 0676-0683.

Lee, et al.; "A Video Codec Transmitter;" IEEE Transactions on Broadcasting; Jun. 1981; vol. BC-27, No. 2; pp. 29-38.

Lee; "Nonblocking Copy Networks for Multicast Packet Switching;" IEEE Journal on Selected Areas in Communications, vol. 6, No. 9; Dec. 1988; pp. 1455-1467.

LeGall, Didier; "MPEG: A Video Compression Standard for Multimedia Applications;" Communications of the ACM, vol. 34, No. 4; Apr. 1991; pp. 46-58.

LeGall, D.; "The MPEG Video Compression Standard;" COMPCON; Feb. 1991; pp. 334-335.

Leopold, P.; "MIDI by Modem: The Future is Now;" AES 5th International Conference; May 1987; 2 cover pages And pp. 122-126.

Leung, et al.; "A Set of Operating System Mechanisms to Support Multi-Media Applications;" At&T Bell Laboratories; Naperville, Illinois; pp. 71-76.

Leung, et al.; "A Software Architecture for Workstations Supporting Multimedia Conferencing in Packet Switching Networks;" IEEE Journal on Selected Areas in Communications; vol. 8, No. 3; Apr. 1990; cover page and pp. 380-390.

Levene, Martin L.; "Progress in the Development of a High Data Rate, High Capacity Optical Disk Buffer;" SPIE vol. 1078, Optical Data Storage Topical Meeting; Jan. 1989; pp. 105-111.

Lin, Yih-Kang Maurice, et al.; "Passive Optical Subscriber Loops with Multiaccess;" Journal of Lightwave Technology, vol. 7, No. 11; Nov. 1989; pp. 1769-1777.

Liou, Ming; "Overview of the px64 kbit/s Video Coding Standard;" Communications of the ACM, vol. 34, No. 4; Apr. 1991; cover page and pp. 60-63.

Liou; "Visual Telephony as an ISDN Application;" IEEE Communications Magazine; Feb. 1990; pp. 30-38.

Lippman, et al.; "Coding Image Sequences for Interactive Retrieval;" Communications of the ACM, vol. 32, No. 7; Jul. 1989; cover page and pp. 852-860.

Lippman; "Feature Sets for Interactive Images;" Communications of the ACM, vol. 34, No. 4; Apr. 1991; 2 cover pages and pp. 93-102.

Lippman, et al.; "News and Movies in the 50 Megabit Living Room;" IEEE Globecom; Nov. 1987; pp. 1976-1981.

Little, et al.; "Multimedia Object Models for Synchronization and Databases;" IEEE, Sixth International Conference on Data Engineering; 1990; cover page and pp. 20-27.

Little, et al.; "Network Considerations for Distributed Multimedia Object Composition and Communication;" IEEE Network Magazine of Computer Communications, vol. 4, No. 6; Nov. 1990; cover page and pp. 32-40 and 45-49.

Little, et al.; "Spatio-Temporal Composition of Distributed Multimedia Objects for Value-Added Networks;" Computer; Oct. 1991; cover page and pp. 42-50.

Little, T., et al.; "Synchronization and Storage Models for Multimedia Objects;" IEEE Journal on Selected Areas in Communication; Apr. 1990; vol. 8, No. 3; pp. 413-427.

Liu, et al.; "A Working Research Prototype of an ISDN Central Office;" IEEE Journal on Selected Areas in Communications, vol. SAC-4, No. 8; Nov. 1986; cover page and pp. 1241-1250.

Loeffler, Christoph, et al.; "Practical Fast 1-D DCT Algorithms with 11 Multiplications;" International Conference on Acoustics, Speech, and Signal Processing, ICASSP-89; vol. 2; May 23-26, 1989; pp. 988-991.

Lohse, K; "Integrated Broadband Communication for Europe;" NET; vol. 43, No. 9; Sep. 1989; cover page and pp. 396-398.

Lucas, Keith, et al.; "HDB-MAC A New Proposal for High Definition TV Transmission; "IEEE Transactions on Broadcasting; vol. BC-33, No. 4; Dec. 1987; cover page and pp. 170-183.

Lundgren, et al.; "Applications of Video on Fiber Cable;" IEEE Communications Magazine, vol. 24, No. 5; May 1986; pp. 33-49.

Lundgren, C.W., et al.; "Single Mode Fiber Transport and Coaxial Distribution of Video on Demand;" IEEE Global Communications Conference; 1986; pp. 889-893.

Machrone, B.; "Awards for Technical Excellence: and the Winners Are . . . ;" PC Magazine; Jan. 12, 1988; vol. 7, No. 1; cover page and pp. 175-180, 182, and 184.

MacInnis, A.; "MPEG Systems Committee Draft, ISO/IEC JTC1/SC2/WG11;" COMPCON; Feb. 1991; pp. 338-339.

Mackay, et al.; "Virtual Video Editing in Interactive Multimedia Applications;" Communications of the ACM, vol. 32, No. 7; Jul. 1989; cover page and pp. 802-810.

Magara, et al.; "Advanced Video Response System—Phrase III—;" Japan Telecommunications Review; Jul. 1981; pp. 243-249.

Margara, et al.; "Enhanced Video Response System;" IEEE; 1981; pp. 24.4.1-24.4.5.

Magel, Mark; "JPEG, MPEG and Px64: Setting the Pace for Multimedia;" AV Video, vol. 13, No. 3; Mar. 1991; cover page and pp. 134-137.

Maeno, Kazutoshi, et al.; "Distributed Desktop Conferencing System (MERMAID) Based on Group Communication Architecture;" IEEE International Conference on Communications; 1991; 520-525.

Marti, et al.; "The Antiope Videotex System;" IEEE Transactions on Consumer Electronics, vol. CE-25, No. 3; Jul. 1979; cover page and pp. 327-333.

Marti; "Towards Text Communication Services;" IEEE Journal on Selected Areas in Communications, vol. SAC-1, No. 2; Feb. 1983; pp. 250-253.

Mason, A.G.; "Conditional Access for Broadcasting;" Proceedings of the International Broadcasting Convention; Sep. 23-27, 1988; pp. 328-332.

Maxemchuk; "An Experimental Speech Storage and Editing Facility;" The Bell System Technical Journal, vol. 59, No. 8; Oct. 1980; cover page and pp. 1383-1395.

Maxemchuk, et al.; "Voice and Data on a CATV Network;" IEEE Journal on Selected Areas in Communications; vol. SAC-3, No. 2; Mar. 1985; pp. 300-311.

McAuley; "Protocol Design for High Speed Networks;" A Dissertation Submitted for the Degree of Doctor of Philosophy, Fitzwilliam College, University of Cambridge; Sep. 1989; 104 pages.

McDevitt, F. Ray, et al.; "Switched vs. Broadcast Video for Fiber-To-The Home System;" IEEE International Communications Conference; 1990; pp. 1109-1119.

McGarty, et al.; "Cable-Based Metro Area Networks;" IEEE Journal on Selected Areas in Communications, vol. SAC-1, No. 5; Nov. 1983; cover page and pp. 816-831.

McGarty, et al.; "CATV for Computer Communications Networks;" IEEE Computer Society Proceedings Computer Networks, Compcon 82, IEEE Catalog No. 82CH1796-2; Sep. 20-23, 1982; cover page and pp. 309-312.

McGarty, et al.; "Hybrid Cable and Telephone Computer Communications;" IEEE Computer Society, Proceedings Delivering Computer Power to End Users, Compcon 83 Fall, IEEE Catalog No. 83CH 1923-2; Sep. 25-29, 1983; cover page and pp. 494-498.

McKay; "A Systems Engineering Approach to Multimedia Communication System Design;" IEEE International Conference on Communications '86, ICC '86, Conference Record vol. 2 of 3; Toronto, Canada; Jun. 22-25, 1986; cover page and pp. 943-948.

McKusick, et al.; "A Fast File System for UNIX;" ACM Transactions on Computer Systems, vol. 2, No. 3; Aug. 1984; pp. 181-197.

McNamara, et al.; "MetroNet: An Overview of a CATV Regional Data Network;" pp. 22-31.

McQuillan, John M.; "Multimedia Networking: An Applications Portfolio;" Data Communications; Sep. 1992; cover page and pp. 85-88, 90, 92-94.

Mera, et al.; "Multimedia Communication Terminal for Broadband Network;" Conference Record: IEEE/IECE Global Telecommunications Conference, Presented at GLOBECOM '87, Nov. 15-18, 1987; vol. 2; pp. 718-722, plus 1 page.

Meyer; "Videotex as a Marketing Problem;" IEEE Journal on Selected Areas in Communications, vol. SAC-1, No. 2; Feb. 1983; pp. 306-308.

Miller, Ralph; "Integrated Services Digital Network (ISDN): Telecommunications in the Future;" Online; vol. 11, No. 2; Mar. 1987; pp. 27-38.

Millington; "Looking for Bypass? Two-Way Cable Can!" Telephone Engineer & Management; May 1, 1983; pp. 53-54.

Molyneaux, M.; "The Animation Stand: Groundwork;" ST-Log; Mar. 1989; No. 29; cover pages (2) and pp. 16-21.

Morreale et al.; "Metropolitan-Area Networks;" IEEE Spectrum; May 1990; pp. 40-43.

Morris, Sandra, K.; "DVI Multimedia Applications and Products;" CD-ROM Professional; Nov. 1991; pp. 33-36.

Mostafa, Javed; "Digital Image Representation and Access;" Annual Review of Information Science and Technology; ASIS, vol. 29; 1994; cover page and pp. 91-135.

Mourad, Magda M.; "Object Representation for Multimedia Document Interchage;" IEEE International Communications Conference; 1991; pp. 0532-0539.

MPEG Video Committee Draft; "Coding of Moving Pictures and Associated Audio;" ISO-IEC JTC1/SC2/WG11, MPEG 90/176 Rev. 2; Dec. 18, 1990; cover page and pp. 1-56.

Murakami; "Overall View of Interactive Visual Information System;" Japan Telecommunications Review; Apr. 1980; pp. 88-97.

Murano, Kazuo; "Technologies Towards Broadband ISDN;" IEEE Communications Magazine; Apr. 1990; pp. 66-70.

Murata, et al.; "Analysis of a Discrete-Time Single-Server Queue with Bursty Inputs for Traffic Control in ATM Networks;" IEEE Journal on Selected Areas in Communications, vol. 8, No. 3; Apr. 1990; pp. 447-458.

Musmann, et al.; "Advances in Picture Coding;" Proceedings of the IEEE, vol. 73, No. 4; Apr. 1985; cover page and pp. 523-548.

Nagata, et al.; "Moving Picture Coding System for Digital Storage Media Using Hybrid Coding;" Signal Processing: Image Communication , vol. 2, No. 2; Aug. 1990; pp. 109-116.

Nakajima, et al.; "Advanced CAPTAIN System and an Approach to Commercial Service;" IEEE Journal on Selected Areas in Communications, vol. SAC-1, No. 2; Feb. 1983; pp. 278-284.

Nakajima; "Enhanced Video Response System—VRS Phase II—;" Japan Telecommunications Review, Quarterly, vol. 22, No. 3, Serial No. 79; Jul. 1979; cover page and pp. 209-217.

Nakajima; "Recent Trends in the Development of Facsimile and Visual Communication System in NTT;" JTR; Jul. 1983; pp. 156-165.

Nakajimo, et al.; "Multimedia/Realtime Extensions for the Mach Operating System;" Human Interface Laboratory, Fujitsu Laboratories, Ltd., USENIX; Nashville, TN; Summer '91; pp. 183-198.

Nakano, et al.; "Network Control Method and Human-Machine Interface Design for ISDN Multimedia Terminal;" IEEE Journal on Selected Areas in Communications, vol. 8, No. 3; Apr. 1990; cover page and pp. 360-367.

Nakao, T., et al.; "Color-Still Videophone Terminal for ISDN;" Digest of Technical Papers: International Conference on Consumer Electronics, Presented at IEEE International Conference on Consumer Electronics; Jun. 6-9, 1989; pp. 24-25, plus 1 page.

Natarajan et al.; "Transport of Wideband Data and Video Services Over a Single Mode Fiber at 1.3 Micron Wavelength;" IEEE International Conference on Communications '86, ICC '86, Toronto, Canada, Conference Record, vol. 2 of 3; Jun. 22-25, 1986; cover page and pp. 793-796.

Naylor, et al.; "Stream Traffic Communication in Packet Switched Networks: Destination Buffering Considerations;" IEEE Transactions on Communications, vol. COM-30, No. 12; Dec. 1982; cover page and pp. 2527-2534.

Nelson, M.; "LZW Data Compression;" *Dr. Dobb's Journal*; Oct. 1989; No. 156; cover page and pp. 4, 29, 32, 34, and 36.

Nelson, Theodor H.; "Xanalogical Structure, Needed Now More Than Ever: Parallel Documents, Deep Links to Content, Deep Versioning, and Deep Re-Use;" ACM Computing Surveys; vol. 31, Issue 4; Dec. 1999; 36 pages.

Netravali, et al.; "Picture Coding: A Review;" Proceedings of the IEEE, vol. 68, No. 3; Mar. 1980; cover page and pp. 366-406.

Netravali, et al.; "Digital Pictures Representation and Compression;" Plenum Press; New York; 1988; 7 pages.

Newman; "Fast Packet Switching for Integrated Services;" Wolfson College, University of Cambridge; Dec. 1988; 158 pages.

NeXT Computer System Brochure for Model N1000; 1989; 26 pages.

Nicolaou; "An Architecture for Real-Time Multimedia Communication System;" IEEE Journal on Selected Areas in Communications, vol. 8, No. 3; Apr. 1990; cover page and pp. 391-400.

Ninke, William H.; "Guest Editorial Interactive Picture Information Systems Where From? Where to?" IEEE Journal on Selected Areas in Communications, vol. SAC-1, No. 2; Feb. 1983; pp. 237-244.

Nonaka; "Super Captain Video Information System;" NTT Review, vol. 3, No. 5; Sep. 1991; cover page and pp. 55-58.

O'Brien, et al.; "A Perspective on the Development of Videotex in North America;" IEEE Journal on Selected Areas in Communications, vol. SAC-1, No. 2, Feb. 1983; pp. 260-266.

Office Action for U.S. Appl. No. 10/291,326, filed Nov. 8, 2002; mailed Aug. 5, 2004; 13 pages.

Office Action for U.S. Appl. No. 09/651,115, filed Aug. 30, 2000; mailed Dec. 24, 2003; 6 pages.

Office Action for U.S. Appl. No. 10/292,304; filed Nov. 11, 2002; mailed Jun. 18, 2004; 12 pages.

Office Action for U.S. Appl. No. 10/274,223, filed Oct. 17, 2002; mailed Jul. 8, 2004; 19 pages.

Office Action for U.S. Appl. No. 09/651,115, filed Aug. 30, 2000; mailed Jul. 30, 2004; 6 pages.

Office Action for U.S. Appl. No. 10/291,326, filed Nov. 8, 2002; mailed Mar. 9, 2004; 13 pages.

Office Action for U.S. Appl. No. 10/273,967, filed Oct. 17, 2002; mailed Mar. 10, 2004; 20 pages.

Office Action for U.S. Patent Application No. 10/291,345, filed Nov. 8, 2002; mailed Mar. 11, 2004; 8 pages.

Office Action for U.S. Appl. No. 10/279,664, filed Oct. 23, 2002; mailed May 20, 2004; 18 pages.

Office Action for U.S. Appl. No. 10/279,384, filed Oct. 23, 2002; mailed Oct. 5, 2004; 17 pages.

Oguet, et al.; "RAVI, A Proposed Standard for the Interchange of Audio/Visual Interactive Applications;" IEEE Journal on Selected Areas in Communications, vol. 8, No. 3; Apr. 1990; pp. 428-436.

Ohnishi, et al.; "Optical Subscriber Loop System for Local Area Application;" Review of the Electrical Communication Laboratories, vol. 32, No. 4; 1984; pp. 571-585.

Ohrenstein, Ernie; "Supercomputers Seek High Throughput and Expandable Storage;" Computer Technology Review; IEEE Spectrum; May 1990; pp. 33-43.

Ohtsuka, Y., et al.; "Digital Bit-Rate Reduction System of HDTV;" Proceedings of the IEEE International Symposium on Circuits and Systems; 1990; vol. 3; pp. 1903-1906, plus 1 page.

Overholt, et al.; "Integrated Real-Time Video with Sun Workstations;" USENIX, Nashville, TN; Summer '91; p. 351.

Pace; "3.4.3 Video Terminals, 5.2 the Road to Broadband, 5.3 Implementation Challenges;" PACE 89, vol. 2; Chapter 3, pp. 31-32 and Chapter 5, pp. 2-3.

Paik, Woo; "DigiCipher—All Digital, Channel Compatible, HDTV Broadcast System;" IEEE Transactions on Broadcasting; vol. 36, No. 4; pp. 245-254.

Palaniappan, et al.; "InternetExpress: An Inter-Desktop Multimedia Data-Transfer Service;" IEEE, Computer; Oct. 1991; pp. 58-67.

Park, et al.; "A Variable Rate Strategy for Retrieving Audio Data from Secondary Storage;" International Conference on Multimedia Information Systems '91; 1991; pp. 135-146.

Parkes, et al.; "Towards 'Interactive Video': A Video-Based Intelligent Tutoring Environment" Intelligent Tutoring Systems: At the Crossroad of Artificial Intelligence and Education; Chapter 3; cover page and pp. 56-82.

Pasieka, et al.; "Distributed Multimedia: How Can the Necessary Data Rates be Supported?" USENIX, Proceedings of the Summer 1991 Usenix Conference; Nashville, TN; Jun. 10-14, 1991; 2 cover pages and pp. 169-182.

Pasquale, et al.; "Network and Operating System Support for Multimedia Applications;" Computer Systems Laboratory, Department of Computer Science and Engineering; La Jolla, California; Techincal Report CS91-186; Mar. 1991; 16 pages.

Pasquale, et al.; "Operating System and Window System Research for Distributed Multi-Media Applications: A Status Report" UCSD Technical Report CS90-176, Computer Systems Laboratory, Department of Computer Science and Engineering; La Jolla, California; Jul. 24, 1990; 16 pages.

Pate; "Trends in Multimedia Applications and the Network Models to Support Them;" Globecom '90, IEEE Global Telecommunications Conference & Exhibition; San Diego, California; Conference Record, vol. 1 of 3; Dec. 2-5, 1990; cover page and pp. 0317-0321.

Patterson, et al.; "Rendezvous: An Architecture for Synchronous Multi-User Applications;" CSCW '90 Proceedings; Oct. 1990; pp. 317-328.

Pau, L.F.; "A Picture and Text Query and Archiving System;" Pattern Recognition Letters; vol. 4, No. 6; Dec. 1986; pp. 477-480.

Pazarci, M., et al.; "A Matched-Resolution Wide Aspect-Ratio HDTV System;" IEEE Transactions on Consumer Electronics; vol. 34, No. 1; Feb. 1988; cover page and pp. 54-60.

Peha, J., et al.; "Evaluating Scheduling Algorithms for Traffic with Heterogeneous Performance Objectives;" IEEE Globecom; Dec. 1990; pp. 21-27.

Pehrson, et al.; "The MultiG Research Programme—Distributed Multimedia Applications on Gigabit Networks;" ACM, Interchi '93; Apr. 24-29, 1993; pp. 246-247.

Peterson, et al.; "An Overview of Digital Image Bandwidth Compression;" Journal of Data & Computer Communications; Winter 1990; pp. 39-49.

Peyret, P., et al.; "Smart Cards Provide Very High Security and Flexibility in Subscribers Management" IEEE Transactions on Consumer Electronics; Aug. 1990; vol. 36, No. 3; pp. 744-752.

Pfeffer; "Multimedia '89 Chairman's Message;" 2nd IEEE COMSOC International Multimedia Communications Workshop; Montebello, Quebec, Canada; Apr. 20-23, 1989; 7 pages.

Pfeifer, et al.; "Real-Time Data Transmission on the ARPAnet" Network Working Group, Request for Comments: 508 (RFC 508); May 1973; pp. 1-10.

Poggio, et al.; "CCWS: A Computer-Based, Multimedia Information System;" Computer IEEE; Oct. 1985; cover page and pp. 92-103.

Polese, et al.; "Residential Subscriber System in a Broadband ISDN Environment;" Electrical Communication; vol. 60, No. 1; 1986; pp. 23-32.

Polilli; "Coming to Networks Near You;" Software Magazine; Sep. 1992; cover page and pp. 40-44.

Poole, Ian; "Nicam Stereo TV;" Practical Electronics; vol. 27, No. 1; Jan. 1991; pp. 24-26.

Postel, et al.; "An Experimental Multimedia Mail System;" ACM Transactions on Office Information Systems; vol. 6, No. 1; Jan. 1988; cover page and pp. 63-81.

Postel, J. (editor); Internet Control Message Protocol, RFC #792; DARPA Internet Program Protocol Specification; Sep. 1981; pp. 1-21.

Postel, Jon (editor); Transmission Control Protocol, RFC #793; DARPA Internet Program; Protocol Specification; Defense Advanced Research Projects Agency; Sep. 1981; 4 cover pages and pp. 1-85.

PR Newswire; "Bell Atlantic Demonstrates Historic Breakthrough: Video on Demand Over Existing Telephone Network;" PR Newswire Association, Inc.; Jun. 14, 1993; 7 pages.

Pratt, et al.; Table of Contents of "Image Transmission Techniques;" Image Processing Institute; University of Southern California; Academic Press, Inc.; 1979; cover pages (2) and pp. vii-ix.

"Prior Art" identified at popflix.com; http://www.popflix.com/acacia; 3 pages.

Quarmby, et al.; "Metropolitan Area Networks in British Telecom;" ISSLS 86; The International Symposium on Subscriber Loops and Services; Tokyo, Japan; Sep. 29-Oct. 3, 1986; cover pages (2) and pp. 24-28.

Quarterman, et al.; "Notable Computer Networks;" Communications of the ACM; vol. 29, No. 10; Oct. 1986; cover page and pp. 932-971.

Quinnell, Richard A.; "Image Compression Part 1;" EDN-Special Report; Jan. 21, 1993; pp. 62-68 and 70-71.

Quinnell, Richard A.; "Image Compression Part 2;" EDN-Design Feature; Mar. 4, 1993; pp. 120-126.

"R1070: Testing Pay-Per-View in Europe;" Race '89; Annex A; p. 115.

Rangan, et al.; "A Testbed for Managing Digital Video and Audio Storage;" USENIX; Nashville, TN; Summer '91; pp. 199-208.

Rangan, et al.; "Designing File Systems for Digital Video and Audio;" ACM SIGOPS Operating Systems Review; vol. 25, Issue 5; Oct. 1991; pp. 81-94.

Raskin, Robin; "Animation: The Message is in the Motion;" PC Week; vol. 6, No. 19; May 1989; cover page and pp. 98-99.

Ratliff, P.A.; "Bit-Rate Reduction for High-Quality Digital Television Transmission;" International Broadcasting Convention, Wembley Conference Center, London, UK; Sep. 25-29, 1978; 2 cover pages and pp. 37- 41.

Raven, J.G.; "High Definition MAC: The Compatible Route to HDTV;" IEEE Transactions on Consumer Electronics; vol. 34, No. 1; Feb. 1988; cover page and pp. 61-63.

"Redundancy Reduction Techniques for Coding of Video Signals in Multimedia Services;" COST211ter; http://www.dip.ee.bilkent.edu.tr/cost211.html; printed Mar. 17, 2003; 2 pages.

Reed, et al.; "A Cost Analysis of a Fiber Upgrade for a Coaxial Cable Network to Support On-Demand Video;" Fiber Networking and Telecommunications; SPIE; vol. 1179; Proceedings Sep. 5-8, 1989; cover pages (2) and pp. 484-495.

Reynolds, et al.; "The DARPA Experimental Multimedia Mail System;" Computer IEEE; Oct. 1985; cover page and pp. 82-89.

Rice, et al.; "An Experimental Television Recording and Playback System Using Photographic Discs;" Journal of the SMPTE, vol. 79; Nov. 1970; pp. 997-1002.

Richard, C.J.; "Video Signal Compression Techniques (Techniques de Compression du Signal Video);" vol. 18, No. 2; Jun. 1986; pp. 385-405.

Ritchie; "Multi-Service Cable-Television Distribution Systems;" British Telecommunications Engineering; vol. 1; Jan. 1983; cover page and pp. 205-210.

Ritchie, W.K.; "The British Telecom Switched-Star Cable TV Network;" Br Telecom Technol J, vol. 2, No. 4; Sep. 1984; pp. 5-17.

Roth, et al.; "A Network Sound System for UNIX;" ICMC '85 Proceedings; Aug. 19-22, 1985; cover pages (2) and pp. 61-67.

Rubenstein, William Bradley; "Data Management of Musical Information;" Dissertation Submitted in Partial Satisfaction of the Requirements for the Degree of Doctor of Philosophy in Computer Science in the Graduate Division of the University of California, Berkeley; Jun. 1987; 229 pages.

Ruschitzka, Manfred, et al.; "Sibyl: A Relational Database System With Remote-Access Capabilities;" Proceedings of the National Computer Conference; Jul. 9-12, 1984; 2 cover pages and pp. 537, and 539- 545.

Rzeszewski, T.S.; "Video Coding for EQTV Distribution with a Rate of Approximately 135 Mb/s;" IEEE Transactions on Consumer Electronics; vol. 34, No. 1; Feb. 1988; cover page and pp. 147-155.

Rzeszewski, T.S., et al.; "Compatible High Definition Television Broadcast Systems;" IEEE Transactions on Broadcasting; vol. BC-33, No. 4; Dec. 1987; cover page and pp. 97-106.

Saadawi, et al.; "Distributed Switching for Data Transmission Over Two-Way CATV;" IEEE Journal on Selected Areas in Communications; vol. SAC-3, No. 2; Mar. 1985; cover page and pp. 323-329.

Sakai, Y.; "Burst Multiplexing Method of Multimedia Signals by Communication Terminal;" Electronics and Communications in Japan, Part 1; Feb. 1990; vol. 73, No. 2; pp. 53-63, plus 1 page.

Sakata; "Development and Evaluation of an In-House Multimedia Desktop Conference System;" IEEE Journal on Selected Areas in Communications; vol. 8, No. 3; Apr. 1990; pp. 340-347.

Sandberg, et al.; "Design and Implementation of the Sun Network Filesystem;" Sun Microsystems, Inc.; 1995; pp. 119-130.

Sandburg; "E-Data Backs Off Patent Claims;" The Recorder; Apr. 2, 1999.

"Santa Clara Meeting Attendance List" Annex 1; Santa Clara, CA, USA; Sep. 10-14, 1990; 3 pages.

Sarnoff Report; Apr. 17, 1992; cover letter, 8 pages.

Satyanarayana; "A Survey of Distributed File Systems;" Department of Computer Science; Carnegie Mellon University; Feb. 1989; 2 cover pages and pp. 1-26.

Satyanarayana; "Coda: A Highly Available File System for a Distributed Workstation Environment" IEEE Computer Society; Proceedings of the Second Workshop on Workstation Operating Systems (WWOS-II); Sep. 27-29, 1989; cover page and pp. 114-117.

Saunders, P.; "Audio Master II;" *Amazing Computing*; 1989; vol. 4, No. 5; cover page and pp. 4 and 24-29.

Sawada, K.; "Coding and Transmission of High-Definition Television—Technology Trends in Japan-;" Supercomm ICC '90 Conference Record—International Conference on Communications; 1990; vol. 3; pp. 886-892, plus 1 page.

Schatz; "Telesophy: A System for Manipulating the Knowledge of a Community;" IEEE; Globecom Tokyo; Nov. 15-18, 1987; cover page and pp. 30.4.1-30.4.6.

Scheifler, et al.; "The X Window System;" ACM Transactions on Graphics; vol. 5, No. 2; Apr. 1986; pp. 79-109.

Scherr, I.; "Pepperoni and Paperwork;" Byte; Dec. 1989; McGraw-Hill Publication; cover page and pp. 12 and 309-310, 312-314, and 316.

Schmandt, et al.; "An Audio and Telephone Server for Multi-Media Workstations;" IEEE Computer Society; 2nd IEEE Conference on Computer Workstations; Santa Clara; Mar. 7-10, 1988; cover page and pp. 150-159.

Schmandt, C., et al.; "Getting the Word (Desktop Audio);" Unix Review; Oct. 1989; vol. 7, No. 10; pp. 54-62.

Schmandt, C., et al.; "Phonetool: Integrating Telephones and Workstations;" IEEE; Nov. 1989; pp. 970-974.

Schmidt, et al.; "Adaptive A Flexible and Adaptive Transport System Architecture to Support Lightweight Protocols for Multimedia Applications on High-Performance Networks;" Proceedings of the First International Symposium on High Performance Distributed Computing; Sep. 1992; 14 pages.

Schmidt, Robert, et al.; "An Experimental Time-Compression System for Satellite Television Transmission;" Proceedings of the IEEE; vol. 73, No. 4; Apr. 1985; pp. 789-794.

Schooler; "A Distributed Architecture for Multimedia Conference Control;" ISI Research Report, ISI/RR-91-289; Nov. 1991; cover pages (2) and pp. 1-18.

Schooler, et al.; "Multimedia Conferencing: Has it Come of Age?" 151 Reprint Series, ISI/RS-91-286; reprinted from the Proceedings 24th Hawaii International Conference on System Sciences; vol. 3; Jan. 1991; pp. 707-716; Aug. 1991; cover page and pp. 1-10.

Schooler, et al.; "A Packet-Switched Multimedia Conferencing System;" Reprinted from ACM SIGOIS Bulletin; vol. 1, No. 1; pp. 12-22; Jan. 1989; cover page and pp. 1-11.

Schulze, A.; "The Tasks for Synchronizing Subscribers Connections in Digital Information Networks;" Nachirichtentech, Elektron; vol. 39, No. 8; 1989; English Abstract and pp. 291-293.

Schulzrinne, et al.; "RTP: A Transport Protocol for Real-Time Applications;" Standards Tract; www.IETF.ORG/rfc/rfc/889.txt?; Jan. 1996; pp. 1-75.

Schürmann, et al.; "Distributed Multimedia Information Handling and Processing;" IEEE Network Magazine; vol. 4, No. 6; Nov. 1990; cover page and pp. 23-31.

Sciarappa; "SOMIW—A Multimedia Workstation with Real Time Capabilities in a Public Network (ISDN);" IEEE Global Telecommunications Conference; Conference Record; vol. 1 of 3; Houston, TX; Dec. 1-4, 1986; cover page and pp. 0479-0483.

Scott, A., et al.; "Communications Support for Multimedia Workstations;" IEEE Conference on Telecommunications; Mar. 1991; pp. 67-72.

Seguin, et al.; "Interactive Services in French Videocommunciation Networks;" IEEE Globecom '87; Nov. 1987; pp. 2000-2004.

Seo, Karen; "Terrestrial Wideband Network Support for Conferencing;" BBN Systems and Technologies, A Division of Bolt Baranek and Newman Inc.; undated; 4 pages.

Shepard, D., et al.; "Extending OSI to Support Synchronization Required by Multimedia Applications;" Computer Communications; Aug. 1990; vol. 13, No. 7; pp. 399-406.

Shepard, et al.; "Protocol Support for Distributed Multimedia Applications;" Presented at Second International Workshop on Network and Operating System Support for Digital Audio and Video; IBM ENC; Heidelberg, Germany; Nov. 18-19, 1991. Also published in Computer Communications; vol. 15, No. 6; Jul./Aug. 1992; 13 pages.

Shimizu, H., et al.; "Packet Communication Protocol for Image Services on a High-Speed Multimedia LAN;" IEEE Journal on Selected Areas in Communications; Jun. 1989; vol. 7, No. 5; pp. 782-788, plus 1 page.

Shishikui, Y., et al.; "Digital Transmission of HDTV—Vector Quantization Coding;" International Broadcasting Convention; Sep. 1990; pp. 398-402, plus 1 page.

Shoji, et al.; "Great Progress in New Visual Communication Systems;" NTT Review; vol. 1, No. 3; Sep. 1989; cover page and pp. 49-56.

Sincoskie, W.D.; "System Architecture for a Large Scale Video on Demand Service;" Computer Networks and ISDN Systems, vol. 22; Sep. 1991; pp. 155-162.

Sincoskie, W.D.; "Video on Demand: Is it Feasible?" IEEE, Communications: Connecting the Future, Globecom '90; vol. 1; Dec. 1990; pp. 0201-0205.

Sirazi, et al.; "Comparative Study of Hybrid-IPPV Implementations;" 34th Annual Convention/Exposition & Programming Conference; Las Vegas, Nevada; NCTA Cable 85 Technical Papers; 1985; cover pages (2) and pp. 27-33.

Smith; "Pilot Two-Way CATV Systems;" IEEE Transactions on Communications; vol. COM-23, No. 1; Jan. 1975; cover page and pp. 111-120.

Sorce, James, et al.; "Designing a Broadband Residential Entertainment Service: A Case Study;" 13th International Symposium Human Factors in Telecommunications, Torino, Italy; Sep. 10-14, 1990; pp. 141-148.

Spears; "Broadband ISDN -Service Visions and Technological Realities;" International Journal of Digital and Analog Cabled Systems; vol. 1, Issue No. 1; Jan.-Mar. 1988; cover page and pp. 3-18.

Spears; "Broadband ISDN Switching Capabilities From a Services Perspective;" IEEE Journal on Selected Areas in Communications; vol. SAC-5, No. 8; Oct. 1987; pp. 1222-1230.

Srinivasan, et al.; "Predictive Coding Based on Efficient Motion Estimation;" IEEE Transactions on Communications; vol. COM-33, No. 8; Aug. 8, 1985; cover page and pp. 888-896.

Srinivasan, Sundar; "A Brief History of Compression;" http://www.pha.jhu.edu/~sundar/intermediate/history.html; 2002; 3 pages.

Sriskanthan, N.; "Videotex (Teletext/Teleview) Research at NTU;" 2 pages.

Stallings, William; "Data and Computer Communications;" 1985; 3 cover pages, pages vii-xiv, and pp. 1-594.

Stauffer, Michael, et al.; "Image Compression with VLSI;" Telephony; Jan. 1988; pp. 26-27, and 30.

Steinberg, et al.; "The Multimedia File System;" International Computer Music Conference; Nov. 2-3, 1989; pp. 307-311.

Steinmetz, R.; "Synchronization Properties in Multimedia Systems;" IEEE Journal on Selected Areas in Communication; Apr. 1990; vol. 8, No. 3; pp. 401-412.

Stetten; "A Study of the Technical and Economic Considerations Attendant on the Home Delivery of Instruction and Other Socially Related Services Via Interactive Cable TV;" Interactive Television; The Mitre Corporation, M72-2000; vol. VIII; Program Overview; May 1974; cover pages (6) and pp. 3-8.

Stetten; "Toward a Market Success for CAI—An Overview of the TICCIT Program;" The Mitre Corporation; M72-73; Jun. 1972; cover pages (6) and pp. 48-59.

Stewart, Rob; "Acacia Technologies Licenses Digital Media Transmission Technology to LodgeNet, Industry-Leader for Hotel Video-On-Demand;" http://biz.yahoo.com/bw/030513/135630_1.html; May 13, 2003; 2 pages.

Stott; "Design Technique for Multiplexing Asynchronous Digital Video and Audio Signals;" IEEE Transactions on Communications; vol. COM-26, No. 5; May 1978; pp. 601-610.

Strickland, W.; "And for Special Effects, The Nominees Are . . . ;" Amiga World; Feb. 1989; cover pages (2) and pp. 33-34, 36, 38, and 40.

Strickland, W.; "Photon Video: Cel Animator;" Amiga World; Mar. 1989; IDGGI/I Publication; cover pages (2) and pp. 84-85.

Sugimoto, et al.; "Videotex: Advancing to Higher Bandwidth;" IEEE Communications Magazine; vol. 26, No. 2; Feb. 1988; cover page and pp. 22-30.

Sventek; "An Architecture Supporting Multi-Media Integration;" IEEE Computer Society Office Automation Symposium; National Bureau of Standards; Gaithersburg, MD; Apr. 27-29, 1987; cover page and pp. 46-56.

Swinehart, et al.; "Adding Voice to an Office Computer Network;" IEEE Global Telecommunications Conference; Conference Record vol. 1 of 3; San Diego, California; Nov. 28-Dec. 1, 1983; cover page and pp. 392-398.

Swinehart; "System Support Requirements for Multi-Media Workstations;" Reprinted from Proceedings of the SpeechTech '88 Conference; pp. 82-83; Apr. 1988; cover page and pp. 1-3.

Swinehart; "Telephone Management in the Etherphone System;" Xerox Corporation; Reprinted from Proceedings of the IEEE/IEICE Global Telecommunications Conference; pp. 1176-1180; Nov. 1987; cover page and pp. 1-5.

Szabo, et al.; "Design Considerations for JPEG Video and Synchronized Audio in a Unix Workstation Environment" USENIX; Nashville, TN; Summer 1991; pp. 353-368.

Takagi, S.; "HDTV Telecommunication Via Optical Fiber Cable;" Proceedings of the 1st World Electronic Media Symposium; Oct. 1989; pp. 529-533, plus 1 page.

Takahashi; "Toward the Implementation of INS in EXPO '85;" JTR; Apr. 1984; pp. 68-75 and 77-78.

Takegahara, et al.; "Sound Transmission for HDTV Using Baseband Multiplexing Into MUSE Video Signal;" IEEE Transactions on Broadcasting; Dec. 1987; vol. BC-33, No. 4; cover page and pp. 188-196.

"Takeoff of New CATV;" CATV Study Documentation Center; Telecom; 1986; 29 pages.

Tanenbaum, Table of Contents; "Computer Networks;" Prentice-Hall, Inc.; Englewood Cliffs, New Jersey; 1981; 8 pages.

Tang, et al.; "Why Do Users Like Video? Studies of Multimedia-Supported Collaboration;" Sun Microsystems Laboratories, Inc.; SMLITR-92-5; Dec. 1992; 31 pages.

Tazelaar, J.; "Sound and Image Processing;" Byte; Dec. 1989; McGraw-Hill Publication; cover page and pp. 12 and 240.

Terry, et al.; "Managing Stored Voice in the Etherphone System;" ACM Transactions on Computer Systems; vol. 6, No. 1; Feb. 1988; pp. 3-27.

Thiel, D.; "Sound and the Amiga;" Byte; Oct. 1986; vol. 11, No. 10; McGraw-Hill Publication; cover page and pp. 4 and 139-142.

Thomas, et al.; "Diamond: A Multimedia Message System Built on a Distributed Architecture;" Computer; Dec. 1985; cover page and pp. 65-78.

Thompson, T., et al.; "The NeXT Computer;" Byte; Nov. 1988; McGraw-Hill Publication; cover page and pp. 4, 158, 160-162, 164-166, 168, 170-172, and 174-175.

Thompson, T., et al.; "Sizing Up the Cube;" Byte; Jan. 1990; McGraw-Hill Publication; cover page and pp. 12 and 169-176.

Thompson, Gordon B.; "Visual Literacy and the Time-Varying Icon;" IEEE Journal on Selected Areas in Communications; vol. SAC-1, No. 2; Feb. 1983; pp. 304-305.

Topolcic, C.; "Experimental Internet Stream Protocol, Version 2 (ST-II);" Network Working Group; RFC1190; Oct. 1990; pp. 1-16 and 143-146.

Toth, Arpad G., et al.; "ATV Multiport Receiver an Overview of the EIA ATV Technical Subcommittee Work;" EIA Digital ATV Workshop; Nov. 6-7, 1989; 18 pages.

Toth, Arpad G.; "HDTV and Fiber Optic Communications—An Opinion;" Philip Laboratories, EIA Digital ATV Workshop; Nov. 1989; pp. 1-11.

Toth, Arpad, et al.; "Hierarchical Evolution of High Definition Television;" IEEE Transactions on Broadcasting; vol. BC-33, No. 4; Dec. 1987; cover page and pp. 124-129.

Tritton, J.A.; "Interactive Home Systems (INS)—An Overview;" IEEE Transactions on Consumer Electronics; Aug. 1988; vol. 34, No. 3; pp. 694-699.

Trygve.Com>JournalWeblogDiaryWhatsis; http://www.trygve.com/blog_2002_12.html; Dec. 2002; 15 pages.

Umemura, et al.; "Real-Time Transmission and Software Decompression of Digital Video in a Workstation;" International Computer Science Institute; TR-91-004; Jan. 1991; 2 cover pages and pp. 1-9.

The Urban Institute; "The Uses of Cable Communications;" Cable Television Information Center; Washington D.C.; cover page and pp. 31-36 and 38.

USC/Information Sciences Institute; "1977 Annual Technical Report;" Defense Advanced Research Projects Agency; ARPA Order No. 2223, ISI/SR-77-8; Jul. 1976-Jun. 1977; cover page and pp. 49-50.

USC/Information Sciences Institute; "1978 Annual Technical Report;" Defense Advanced Research Projects Agency; ARPA Order No. 2223, ISI/SR-79-14; Jul. 1977-Sep. 1978; cover page and pp. 54-55.

Vaitzblit, Lev; "The Design and Implementation of a High-Bandwidth File Service for Continuous Media;" Department of Electrical Engineering and Computer Science in Partial Fulfillment of the Requirements for the Degree of Master of Science at the Massachusetts Institute of Technology; Sep. 1991; pp. 1-95.

Vecchietti, G., et al.; "ATM Network and VBR Video Source: Data Structure and Statistical Analysis of an Implemented Hybrid DCT Broadcast Video Encounter;" Globecom'91; IEEE; 1991; pp. 34-39.

Veith; "Talk-Back TV: Two-Way Cable Television;" Tab Books, First Edition; Oct. 1976; cover pages (3) and pp. 30-33 and 48-51.

Verbiest, et al.; "The Impact of the ATM Concept on Video Coding;" IEEE Journal on Selected Areas in Communications; Dec. 1988; vol. 6, No. 9; pp. 1623-1632.

"Video Hardware;" AC's Guide to the Commodore Amiga; Fall 1989; IDGGI/ Publication; cover page and pp. 4 and 129.

Volk; "The Reston, Virginia, Test of the Mitre Corporation's Interactive Television System;" The Mitre Corporation; MTP-352; May 1971; 6 cover pages and pp. 1-18.

Von Vignau; "Bildschirmtext and the CEPT Videotex System;" IEEE Journal on Selected Areas in Communications; vol. SAC-1, No. 2; Feb. 1983; pp. 254-259.

Wada, Masahiro; "Selective Recovery of Video Packet Loss Using Error Concealment" IEEE Journal on Selected Areas in Communications, vol. 7, No. 5; Jun. 1989; pp. 807-814.

Wagner, Stuart, et al.; "Evolutionary Architectures and Techniques for Video Distribution on Fiber;" Dec. 1989; IEEE Communications Magazine; pp. 17-25.

Walker, Gerald M.; "Special Report: Cable's Path to the Wired City is Tangled;" Electronics; May 8, 1972; cover page and pp. 91-99.

Wallace, L.; "Digitizing Dilemma;" Amiga World; Sep. 1989; cover page and pp. 4, and 34-38.

Wallace, L.; "Net Results;" Amiga World; May 1989; cover page and pp. 4 and 30-38.

Want, et al.; "The LAN as an Integrated Communications Environment;" Proceedings of Networks 89; Birmingham, England; Jun. 1989; 11 pages.

Want; "Reliable Management of Voice in a Distributed System;" University of Cambridge Computer Laboratory; Technical Report No. 141; Jul. 1988; 139 pages.

Watkinson, J.R.; "Variable-Speed Video Playback;" Electronics & Wireless World, No. 1850; May 1984; cover page and pp. 55-58.

Watkinson, John; "The Art of Digital Video;" 1990; 2 cover pages, pp. v-xiv, and pp. 1-580.

Way, W., et al.; "Simultaneous Distribution of Multichannel Analog and Digital Video Channels to Multiple Terminals Using High-Density WDM and a Broad-Band In-Line Erbium-Doped Fiber Amplifier;" IEEE Photonics Technology Letters; vol. 2, No. 9; Sep. 1990; pp. 665-668.

Wedam, Werner F.; "Future Trends in Television;" IEEE Transactions on Consumer Electronics; vol. 34, No. 2; May 1988; pp. 279-284.

Weinstein, Clifford J., et al.; "Experience with Speech Communication in Packet Networks;" Reprinted from IEEE Journal on Selected Areas in Communications; vol. SAC-1, No. 6; pp. 963-980; Dec. 1983; pp. 19-36.

Weinstein; "ISDN Multimedia Services;" ISDN Systems Architecture, Technology, and Applications; Chapter 8; Prentice-Hall, Inc.; Englewood Cliffs, New Jersey; 1990; cover pages (2) and pp. 262-304.

Weinstein, Stephen B.; "Personalized Services on the Intelligent, Wideband Network;" Zurich Seminar; 1986; pp. 13-18.

Wernik; "Architecture and Technology Considerations for Multimedia Broadband Communications;" IEEE Global Telecommunications Conference & Exhibition; Hollywood, Florida; Conference Record; vol. 2 of 3; Nov. 28-Dec. 1, 1988; cover page and pp. 0663-0667.

Wetherington; "The Story of PLP;" IEEE Journal on Selected Areas in Communications; vol. SAC-1, No. 2; Feb. 1983; pp. 267-277.

White, L.; "The Video Desk;" *Amazing Computing*; 1989; vol. 4, No. 7; cover page and pp. 4 and 29-30.

Wilkens, et al.; "Interactive Broad-Band Dialogue Systems in the Integrated Services Digital Network (ISDN);" IEEE Journal on Selected Areas in Communications; vol. SAC-1, No. 2; Feb. 1983; pp. 295-303.

Wilkinson, J.H.; "Coding Techniques for the Digital Video Tape Recorder;" Fernseh- und Kinotechnische Gessellschaft e.V., 11. Jahrestagung der FKTG (Eleventh Annual Conference of the FKTG); May 1984; cover page and pp. 3-7 and 109-117.

Willard, David; "Mitrix: A Sophisticated Digital Cable Communications System;" Proceedings of the National Telecommunications Conference; Nov. 1973; pp. 38E-1 through 38E-5.

Williams, et al.; "Distributed Multimedia Computing: An Assessment of the State of the Art;" Information Services & Use; Elsevier Science Publishers; B.V., Netherlands; 1991; cover page and pp. 265-281.

Wilson, I., et al.; "Experiments in Digital Video for Workstations;" Technical Report ORL-89-2; Olivetti Research Limited; Cambridge, England; Mar. 1989; pp. 1-14.

Wilson, Ron; "Inmos Takes on Image Compression with Discrete Cosine Transform Processor;" Computer Design, vol. 28, No. 15; Aug. 1, 1989; 2 pages.

Wolfinger, et al.; "A Continuous Media Data Transport Service and Protocol for Real-Time Communication in High Speed Networks;" Proceedings of the Second International Workshop on Network and Operating System Support for Digital Audio and Video; Springer-Verlag; Heidelberg, Germany; Nov. 1991; 12 pages.

Wong; "Broadcast Delivery;" Proceedings of the IEEE; vol. 76, No. 12; Dec. 1988; pp. 1566-1577.

Wong, et al.; "Analysis of Broadcast Delivery in Videotex Systems;" Proceedings of the IEEE Global Telecommunications Conference; Nov. 1984; pp. 933-938.

Wong, et al.; "Analysis of Broadcast Delivery in a Videotex System;" IEEE Transactions on Computers, vol. C-34, No. 9; Sep. 1985; pp. 863-866.

Wong, et al.; "MCPIC: A Video Coding Algorithm for Transmission and Storage Applications;" IEEE Communications Magazine; Nov. 1990; cover page and pp. 24-32.

Wood, et al.; "State of the BBS Nation;" Byte; Jan. 1990; McGraw-Hill Publication; cover page and pp. 12 and 298-304.

Woodford; letter to Alan P. Block re Acacia Media Technologies Corp. USDC-C.D. Cal. (Southern)—Case No. 02-CV-1063 dated Nov. 19, 2003; 2 pages.

Woodruff, et al.; "Multimedia Traffic Management Principles for Guaranteed ATM Network Performance;" IEEE Journal on Selected Areas in Communications; vol. 8, No. 3; Apr. 1990; pp. 437-446.

Wray, Stuart; "The Interface to Pandora's Box;" Olivetti Research Limited; Version 2.00; Feb. 25, 1994; 50 pages.

Wright, Ernie; "Behold the Robot Juggling Silver Spheres;" Amiga Juggler Animation; http://mywebpages.comcast.net/erniew/juggler.html; Feb. 1, 2001; 7 pages.

Wright, David J.; "A Characterization of Telecommunication Services in the 1990's;" INFOCOM '89; Proceedings of the Eighth Annual Joint Conference on the IEEE Computer and Communications Societies. Technology Emerging or Converging; Apr., 1989; pp. 624-631.

Yamagata, J., et al.; "Development of Fiber-Optic Broadband Interactive Distribution Network;" ISSLS 86; The International Symposium on Subscriber Loops and Services; Sep. 29-Oct. 3, 1986; cover page and pp. 199-204.

Yamaguchi, et al.; "Experimental ISDN System with Multimedia Storage and Intelligent Service Control Capabilities;" ISSLS 88; The International Symposium on Subscriber Loops and Services, Proceedings; IEEE; Boston, Mass.; Sep. 11-16, 1988; cover pages (2) and pp. 0123-0127.

Yamaguchi, et al.; "64 kb/s Integrated Visual Telecommunication System;" Second International Conference on Image Processing and its Applications; Jun. 24-26, 1986; cover page and pp. 200-203.

Yang, et al.; "VLSI Architecture Design of A Versatile Variable Length Decoding Chip for Real-Time Video Codecs;" IEEE Region 10 Conference on Computer and Communication Systems; Sep. 1990; 551-554.

Yankelovich, et al.; "Intermedia: The Concept and the Construction of a Seamless Information Environment" IEEE Computer; Jan. 1988; pp. 81-96.

Yankelovich, et al.; "Reading and Writing the Electronic Book;" MIT Press in Technical Communication Series; Hypermedia and Literary Studies; 1991; pp. 53-79.

Yankelovich, Nicole; "From Electronic Books to Electronic Libraries: Revisiting 'Reading and Writing the Electronic Book';" MIT Press in Technical Communication Series; Hypermedia and Literary Studies; 1991; pp. 133-141.

Yashima, Y., et al.; "100Mbits/s HDTV Transmission Using a High Efficiency Codec;" Signal Processing of HDTV, II. Proceedings of the Third International Workshop on HDTV; 1990; pp. 579-581 and 584-586, plus 1 page.

Yasuda, et al.; "1.544-Mbits/s Transmission of TV Signals by Interframe Coding System;" IEEE Transactions on Communications; vol. COM-24, No. 10; Oct. 1976; cover page and pp. 1175-1180.

Yavelow, C.; "Digital Sampling on the Apple Macintosh;" Byte; Jun. 1986; vol. 11, No. 6; McGraw-Hill Publication; cover page and pp. 4, 171-172, 176, 178, 180, and 182-183.

Yencharis, Leonard R.; "Video Compression Chips Now: More Hope or Less Hype?" Advanced Imaging, vol. 7, No. 3; Mar. 1992; cover page and pp. 62-65.

Yokoi; "New Video Response System (VRS)—The Starting of 'Medical VRS'—;" JTR; Oct. 1986; pp. 264-270.

Yokoi, et al.; "Natural Images of Useful Information Come Alive for You with the Video Response System;" MECOM 87 Conference Programme & Proceedings; Jan. 13-15, 1987; cover page and pp. 1-11.

Yu, et al.; "Efficient Placement of Audio Data on Optical Disks for Real-Time Applications;" Communications of the ACM; vol. 32, No. 7; Jul. 1989; cover page and pp. 862-871.

Yum, et al.; "Resequencing of Messages in Communication Networks;" IEEE Transactions on Communications, vol. COM-34, No. 2; Feb. 1986; pp. 143-149.

Zdepski, et al.; "Prioritized Packet Transport of VBR CCITT H.261 Format Compressed Video on CSMA/CD LAN;" Presented at Third International Workshop on Packet Video; Morristown, NJ; Mar. 22-23, 1990; 6 pages.

"ZDF Schriftenreihe Heft 24;" Oct. 1980; 2 cover pages and pp. 54-59.

Zellweger; "Active Paths Through Multimedia Documents;" Xerox Corporation; Cambridge University Press, 1988; Xerox PARC, CSL-89-2; May 1989; cover page and pp. 1-16.

Zellweger, et al.; "An Overview of the Etherphone System and its Applications;" Proceedings of the Second IEEE Conference on Computer Workstations; 1988; pp. 160-168.

* cited by examiner

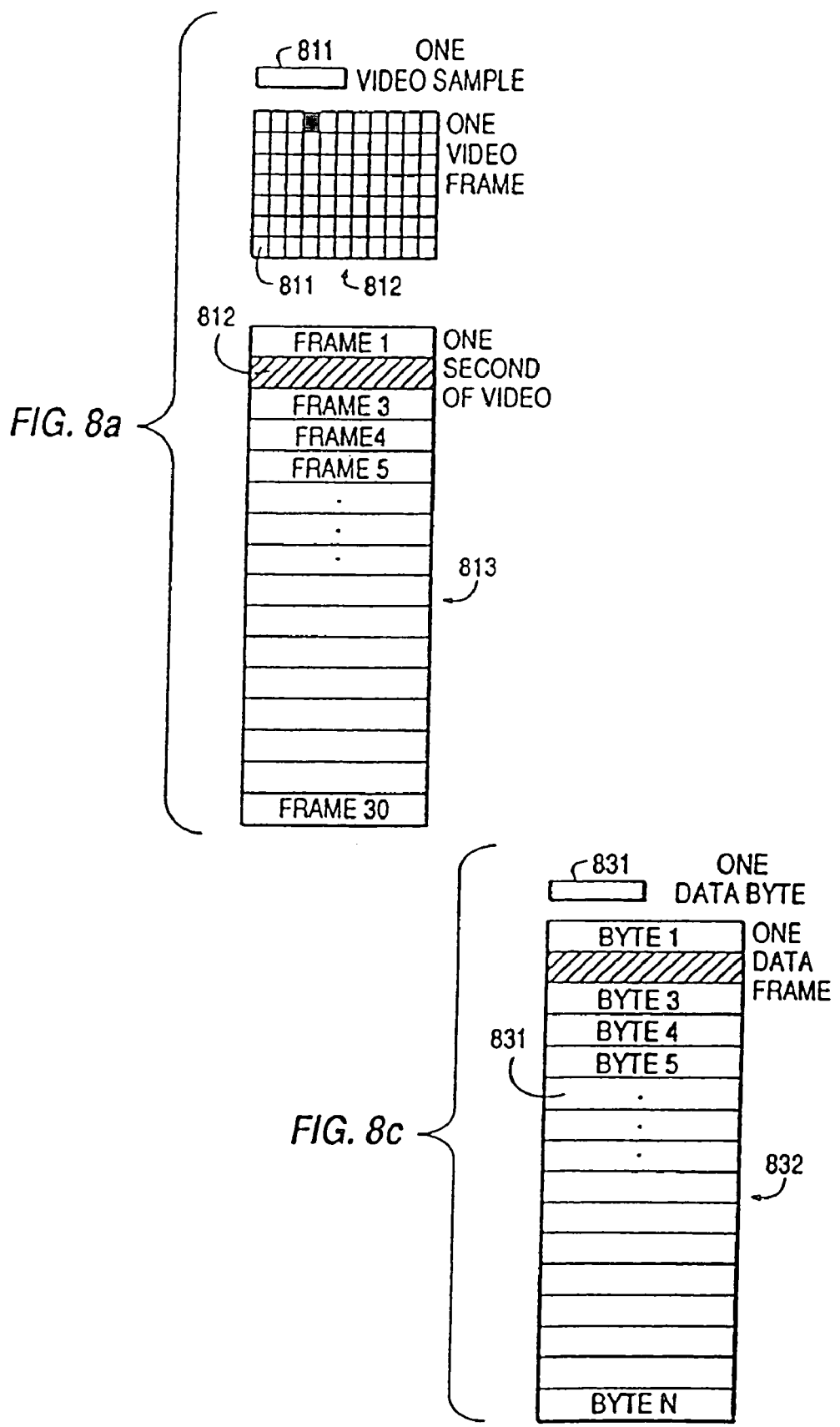

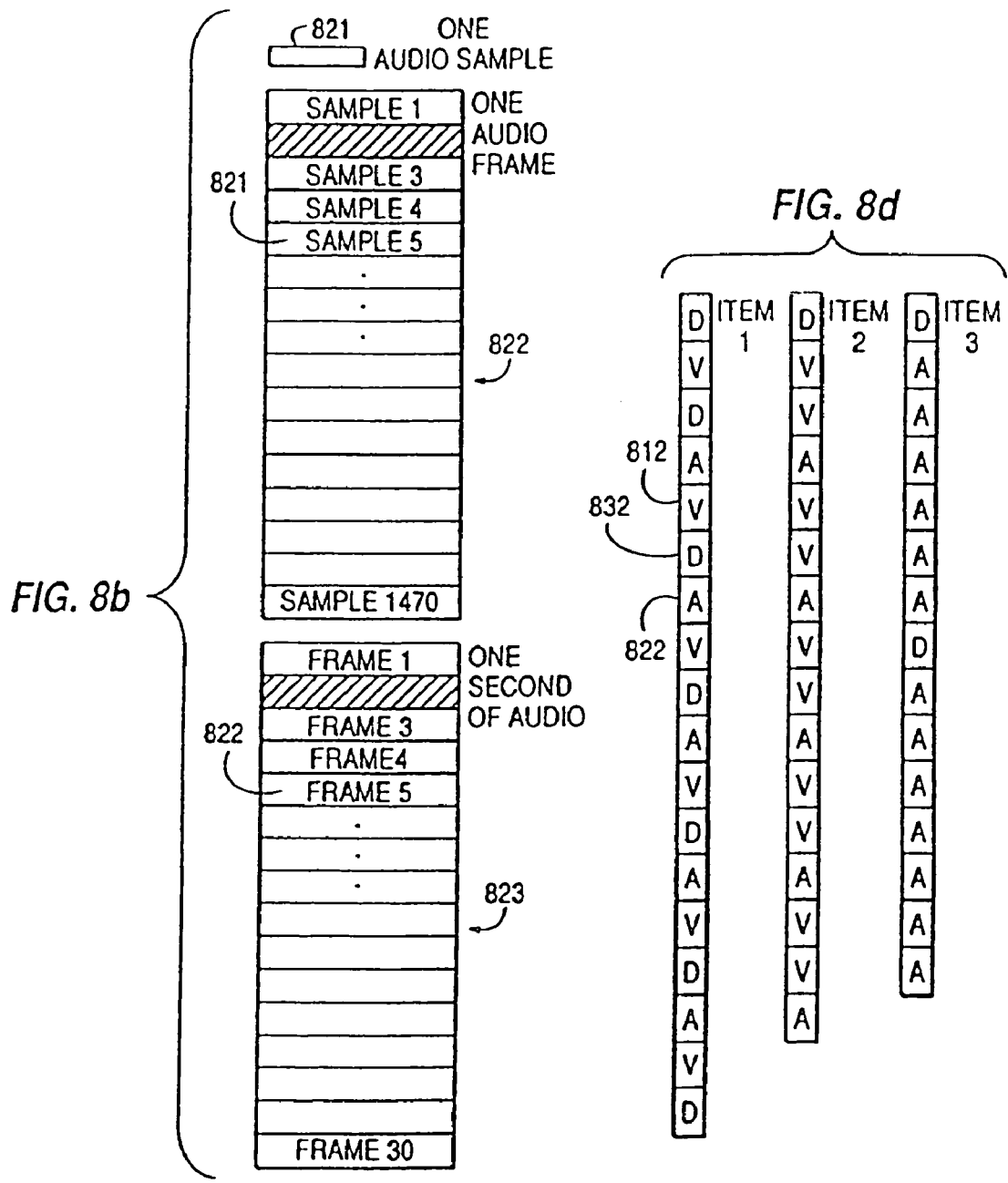

AUDIO AND VIDEO TRANSMISSION AND RECEIVING SYSTEM

CROSS-REFERENCE TO RELATED APPLICATIONS

This application is a continuation application of U.S. patent application Ser. No. 10/274,242, filed Oct. 17, 2002 now abandoned which is a continuation application of U.S. patent application Ser. No. 09/651,115, filed Aug. 30, 2000 now abandoned which is a continuation application of U.S. patent application Ser. No. 09/120,452, filed Jul. 23, 1998, now U.S. Pat. No. 6,144,702, which is a division of U.S. application Ser. No. 08/630,590, filed Apr. 10, 1996, now U.S. Pat. No. 6,002,720, which is a continuation of application Ser. No. 08/133,982, filed Oct. 8, 1993, now U.S. Pat. No. 5,550,863, which is a continuation of application Ser. No. 07/862,508, filed Apr. 2, 1992, now U.S. Pat. No. 5,253,275, which is a continuation of application Ser. No. 07/637,562, filed Jan. 7, 1991, now U.S. Pat. No. 5,132,992, all of which are hereby incorporated by reference as if set forth in full herein.

BACKGROUND OF THE INVENTION

The present invention relates generally to an audio and video transmission and receiving system, and more specifically to such a system in which the user controls the access and the playback operations of selected material.

At the present time, only a video cassette recorder (VCR) or a laser disk player (LDP) allow a viewer to enjoy control over selection of particular audio/video material. Using either a VCR or an LDP requires the viewer to obtain a video tape either by rental or by purchase. Remote accessing of the material has not yet been integrated into an efficient system.

Several designs have been developed which provide the viewer with more convenient means of accessing material. One such design is disclosed in U.S. Pat. No. 4,506,387, issued to Walter. The Walter patent discloses a fully dedicated, multi-conductor, optical cable system that is wired to the viewer's premises. While the system affords the viewer some control over accessing the material, it requires that a location designated by the viewer be wired with a dedicated cable. The Walter system further requires the viewer be at that location for both ordering and viewing the audio/video material.

U.S. Pat. No. 4,890,320, issued to Monslow, describes a system which broadcasts viewer selected material to a viewer at a prescribed time. This system is limited in that it requires multiple viewers in multiple locations to view the audio/video material at the time it is broadcast, rather than allowing each viewer to choose his or her own viewing time. The system disclosed in Monslow also does not allow for the stop, pause, and multiple viewing functions of existing VCR technology.

U.S. Pat. No. 4,590,516, issued to Abraham, discloses a system that uses a dedicated signal path, rather than multiple common carriers, to transmit audio/video programming. The receiver has no storage capability. The system provides for only display functions, which limits viewing to the time at which the material is ordered. Like Monslow, the Abraham system does not allow for the stop, pause, and multiple viewing functions of existing VCR technology.

U.S. Pat. No. 4,963,995, issued to Lang, discloses an audio/video transceiver with the capability of editing and/or copying from one video tape to another using only a single tape deck. Lang does not disclose a system with one or more libraries wherein a plurality of system subscribers may access information stored in the film and tape library or libraries, and play back the selected information at a time and place selected by the subscriber.

It is therefore an object of the present invention to provide a user with the capability of accessing audio/video material by integrating both accessing and playback controls into a system that can use multiple existing communications channels.

It is a further object of the present invention to provide a picture and sound transmission system which allows the user to remotely select audio/video material from any location that has either telephone service or a computer.

A still further object of the present invention is to provide a picture and sound transmission system wherein the selected audio/video material is sent over any one of several existing communication channels in a fraction of real time to any location chosen by the user that has a specified receiver.

Another object of the present invention is to provide a picture an sound transmission system wherein the user may play back the selected audio/video material at any time selected by the user and retain a copy of the audio/video material for multiple playbacks in the future.

Another object of the present invention is to provide a picture and sound transmission system wherein the information requested by the user may be sent as only audio information, only video information, or as a combination of audio and video information.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects in accordance with the purposes of the present invention, as embodied and described herein, the transmission and receiving system for providing information to remote locations comprises source material library means prior to identification and compression; identification encoding means for retrieving the information for the items from the source material library means and for assigning a unique identification code to the retrieved information; conversion means, coupled to identification encoding means, for placing the retrieved information into a predetermined format as formatted data; ordering means, coupled to the conversion means, for placing the formatted data into a sequence of addressable data blocks; compression means, coupled to the ordering means, for compressing the formatted and sequenced data; compressed data storing means, coupled to the compression means, for storing as a file the compressed sequenced data received from the compression means with the unique identification code assigned by the identification encoding means; and transmitter means, coupled to the compressed data storing means, for sending at least a portion of a specific file to a specific one of the remote locations.

The present invention further comprises a distribution method responsive to requests identifying information to be sent from a transmission system to a remote location, the method comprising the steps of storing audio and video information in a compressed data form; requesting transmission, by a user, of at least a part of the stored compressed information to the remote location; sending at least a portion of the stored compressed information to the remote location; receiving the sent information at the remote location; buffering the processed information at the remote location; and playing back the buffered information in real time at a time requested by the user.

Additionally, the present invention comprises a receiving system responsive to a user input identifying a choice of an item stored in a source material library to be played back to the subscriber at a location remote from the source material library, the item containing information to be sent from a transmitter to the receiving system, and wherein the receiving system comprises transceiver means for automatically receiving the requested information from the transmitter as compressed formatted data blocks; receiver format conversion means, coupled to the transceiver means, for converting the compressed formatted data blocks into a format suitable for storage and processing resulting in playback in real time; storage means, coupled to the receiver format conversion means, for holding the compressed formatted data; decompressing means, coupled to the receiver format conversion means, for decompressing the compressed formatted information; and output data conversion means, coupled to the decompressing means, for playing back the decompressed information in real time at a time specified by the user.

BRIEF DESCRIPTION OF THE DRAWINGS

The accompanying drawings, which are incorporated in and constitute a part of the specification, illustrate the presently preferred apparatus and method of the invention and, together with the general description given above and the detailed description of the preferred embodiment given below serve to explain the principles of the invention. In the drawings:

FIGS. 8*a*-8*e* are block diagrams of preferred implementations of data structures and data blocking for items in the audio and video distribution system of the present invention.

DESCRIPTION OF THE PREFERRED EMBODIMENTS

FIGS. 1*a*-1*g* are high level block diagrams showing different configurations of the transmission and receiving system of the present invention. FIGS. 1*a*, 1*b*, 1*d*, 1*e*, 1*f*, and 1*g* each show transmission system 100, described in more detail below with respect to FIGS. 2*a* and 2*b*. A user of the transmission and receiving system of the present invention preferably accesses transmission system 100 by calling a phone number or by typing commands into a computer. The user then chooses audio and/or video material from a list of available items which he or she wants to listen to and/or watch.

Figure 1A:
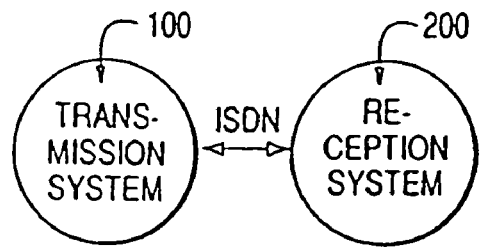
FIGS. 1*a*-1*g* are high level block diagrams showing different configurations of the transmission and receiving system of the present invention.
Figure 1B:
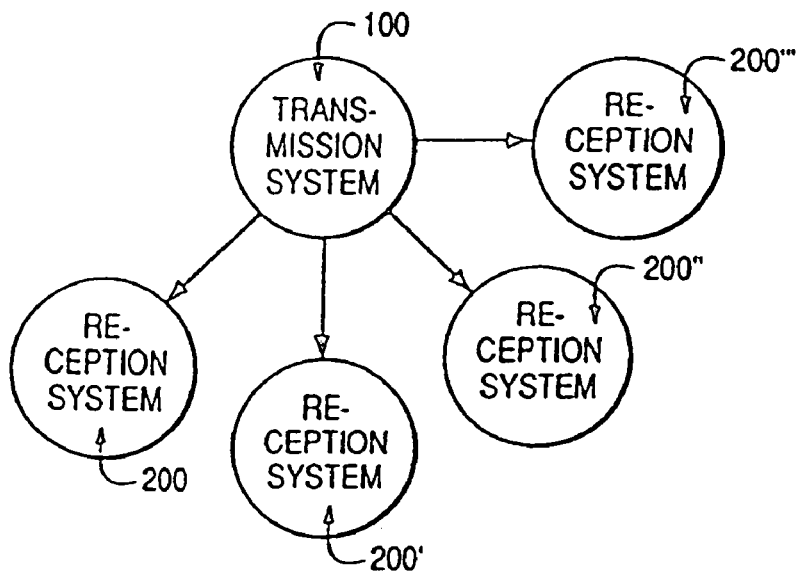

As shown in FIG. 1*a*, the transmission and receiving system may preferably comprise a peer to peer configuration where one transmission system 100 communicates with one reception system 200. As shown in FIG. 1*b*, the transmission and receiving system of the present invention may alternatively comprise a plurality of reception systems 200, 200', 200", and 200''', which are each associated with a single transmission system 100.

Figure 1D:
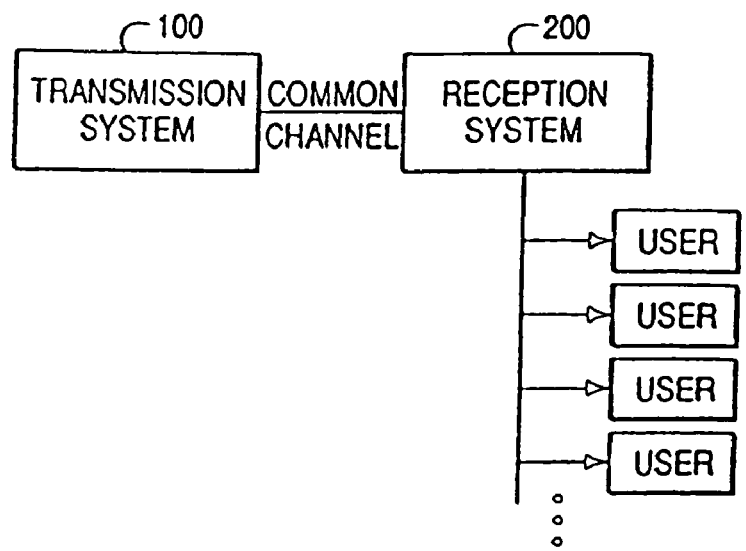
Figure 1C:
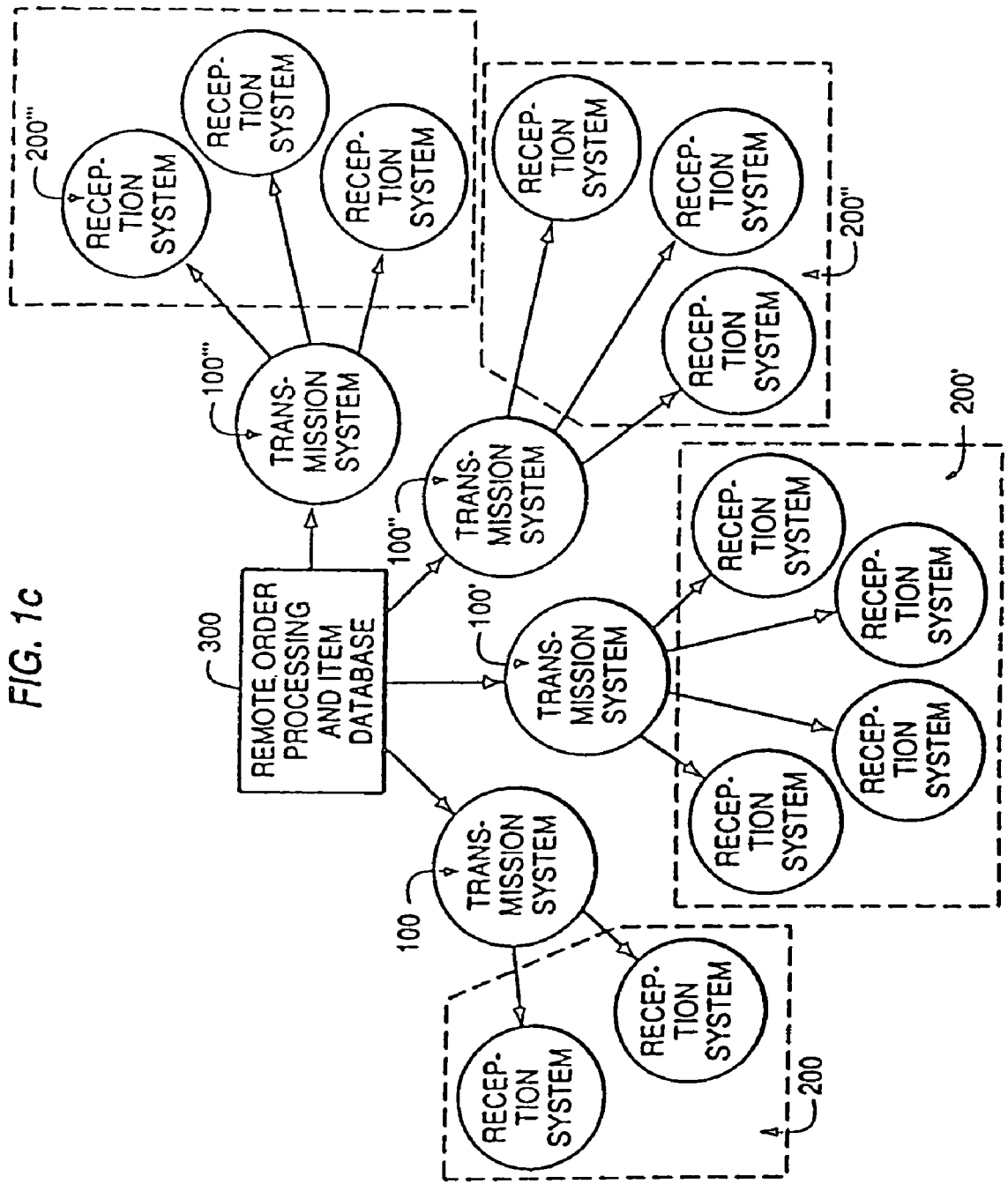
Figure 3:
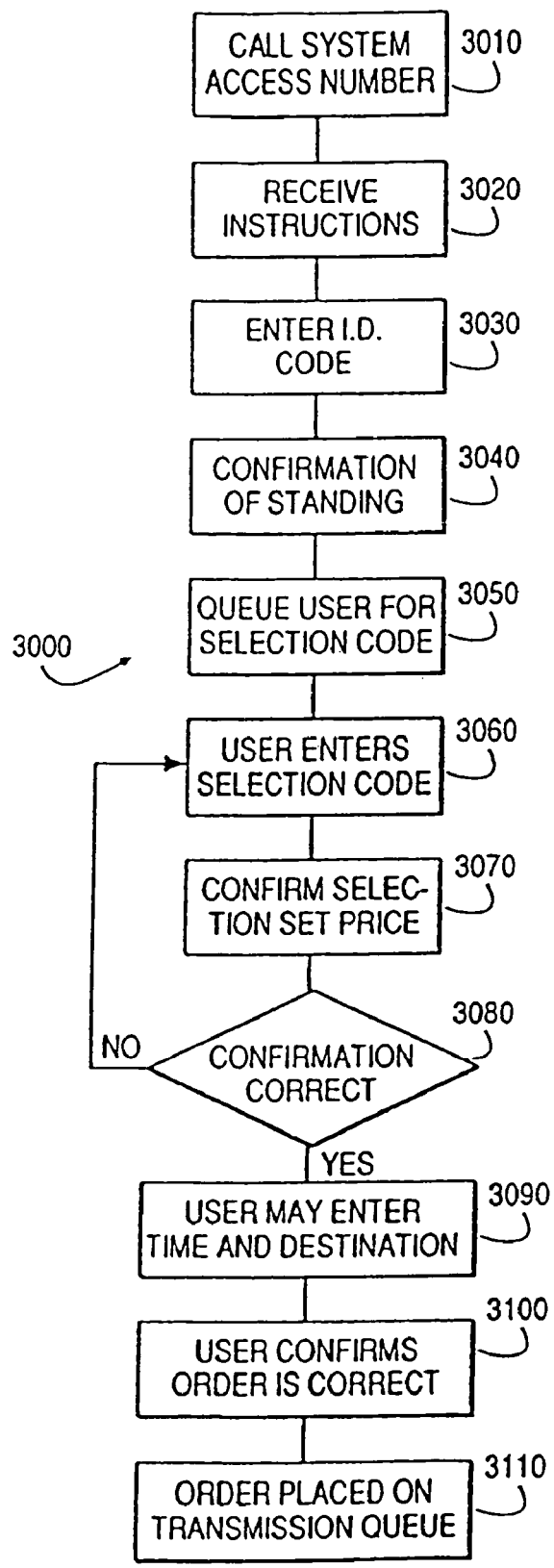
FIG. 3 is a flowchart of a preferred method of ordering a selection from a library in accordance with the present invention.

FIG. 1*c* shows a high level block diagram of the transmission and receiving system of the present invention including remote order processing and item database 300, described in more detail with respect to FIG. 3. Remote order processing and item database 300 preferably enables users to access desired items by remote communication. The remote order processing and item database 300 may communicate with a plurality of transmission systems 100, 100', 100", and 100''', each of which communicates with a respective set of reception systems 200, 200', 200", and 200'''. Each of the reception systems in sets 200, 200', 200", and 200''' may preferably communicate with a plurality of users.

FIG. 1*d* shows a high level block diagram of the transmission and receiving system of the present invention including a transmission system 100 distributing to a plurality of users via a reception system 200 configured as a cable television system.

Figure 1E:
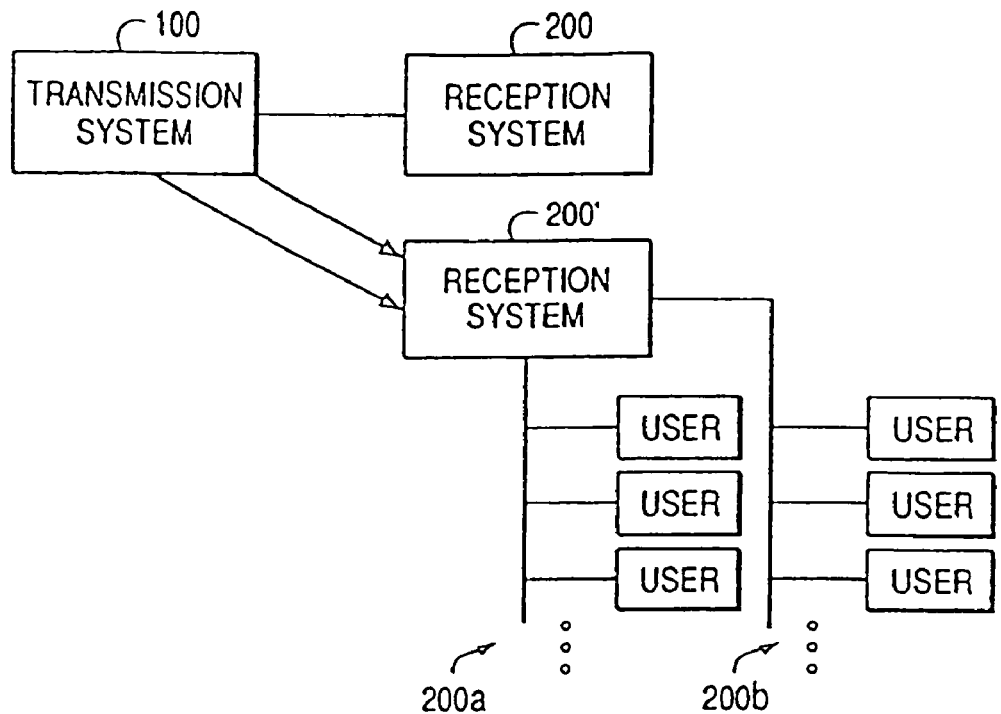

FIG. 1*e* shows a high level block diagram of the transmission and receiving system of the present invention including a transmission system 100 distributing to a plurality reception systems 200 and 200'. In the configuration shown in FIG. 1*e*, reception system 200 is a direct connection system wherein a user is directly connected to transmission system 100. Reception system 200' preferably includes a first cable television system 200*a* and a second cable television system 200*b*. Users of cable television systems 200*a* and 200*b* are indirectly connected to transmission system 100.

Figure 1F:
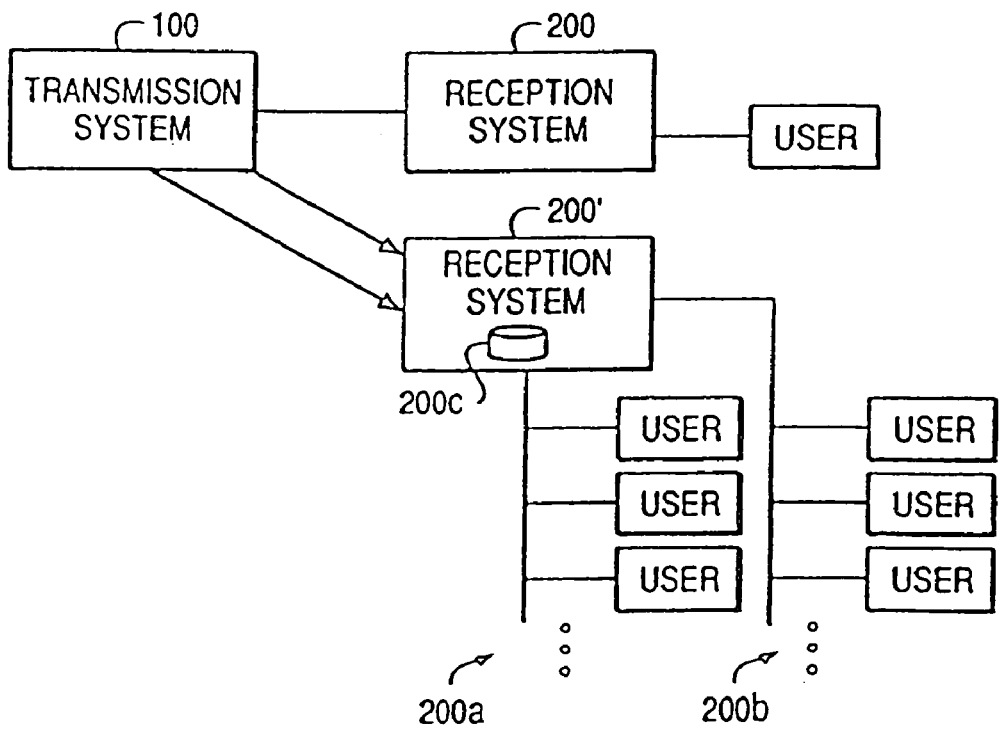

FIG. 1*f* shows a high level block diagram of the transmission and receiving system of the present invention including transmission system 100 distributing via several channels to reception systems 200 and 200'. Reception system 200 is preferably non-buffering. In such a system, users are directly connected to transmission system 100, as in reception system 200 in FIG. 1*e*.

Reception system 200' shown in FIG. 1*f* is a cable television system, as shown in reception system 200' of FIG. 1*e*. In FIG. 1*f*, the reception system 200' is preferably buffering, which means that users may receive requested material at a delayed time. The material is buffered in intermediate storage device 200*c* in reception system 200'.

In the configuration of FIG. 1*f*, decompression of the requested material may preferably occur at the head end of a cable television reception system 200'. Thus, distribution may be provided to users via standard television encoding methods downstream of the head end of the cable distribution system. This method is preferred for users who only have cable television decoders and standard television receivers.

Figure 1G:
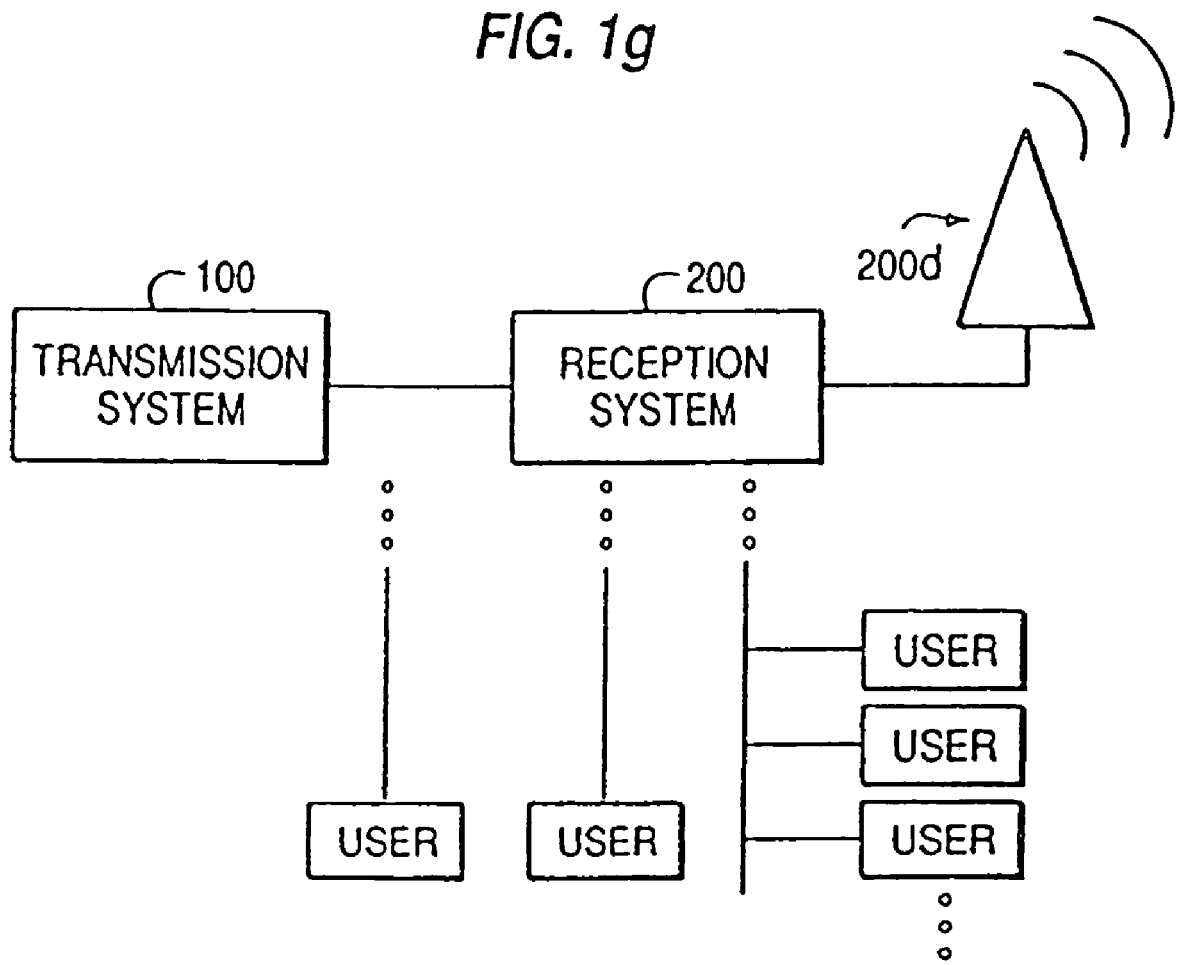

FIG. 1*g* shows a high level block diagram of the transmission and receiving system of the present invention including transmission system 100 distributing to a reception system 200, which then preferably transmits requested material over airwave communication channels 200*d*, to a plurality of users. The transmission and receiving system shown in FIG. 1*g* may preferably transmit either compressed or uncompressed data, depending on the requirements and existing equipment of the user. The airwave transmission and receiving system shown in FIG. 1*g* may preferably employ either VHF, UHF or satellite broadcasting systems.

With respect to the transmission and receiving systems set forth in FIGS. 1a-1g, the requested material may be fully compressed and encoded, partly decompressed at some stage in transmission system 100, or fully decompressed prior to transmission. The reception systems 200 may either buffer the requested material for later viewing, or decompress in real time the requested material as it is distributed by transmission system 100. Alternatively, the reception systems 200 of the present invention may perform a combination of buffering and non-buffering by buffering some of the requested material and decompressing the remainder of the requested material for immediate viewing as it is distributed by transmission system 100.

In direct connection configurations, such as reception systems 200 shown in FIGS. 1e and 1f, the user preferably selects the reception system 200 to which the requested material is sent, and optionally selects the time playback of the requested material as desired. Accordingly, the user may remotely access the transmission system 100 from a location different than the location of reception system 200 where the material will be sent and/or played back. Thus, for example, a user may preferably call transmission system 100 from work and have a movie sent to their house to be played back after dinner or at any later time of their choosing.

In non-direct connection reception systems such as shown in reception system 200' of FIG. 1f, intermediate storage device 200c may preferably include, for example, sixteen hours of random access internal audio and video storage. A reception system with such storage is capable of storing several requested items for future playback. The user could then view and/or record a copy of the decompressed requested material in real time, or compressed in non-real time, at a time of their choosing. Accordingly, the user would not have to make a trip to the store to purchase or rent the requested material.

In any of the transmission and receiving systems illustrated in FIGS. 1a-1g, the requested material may be copy protected. To achieve copy protection, the requested material, as an item, is encoded as copy protected during storage encoding in transmission system 100. The user may then play back the item only one time. The user may also optionally review select portions of the item prior to its automatic erasure from the memory of the reception system 200. In this way, requested material may be distributed to "view only" users and also to "view and copy" users who wish to retain copies of the distributed items.

Copy protected programs, when decompressed and played back, would have a copy protection technique applied to the analog and digital output signals. The analog video output is protected from copying through the use of irregular sync signals, which makes the signal viewable on a standard television but not recordable on an audio/video recorder. The receiving system recognizes copy protected programs. Digital output protection is effected through copy protect bit settings in the digital output signal, thus preventing a compatible digital recorder from recording the digital audio and/or video signal stream. A protected item will not be passed to the compressed data port of the digital recorder for off-line storage.

Figure 2A:
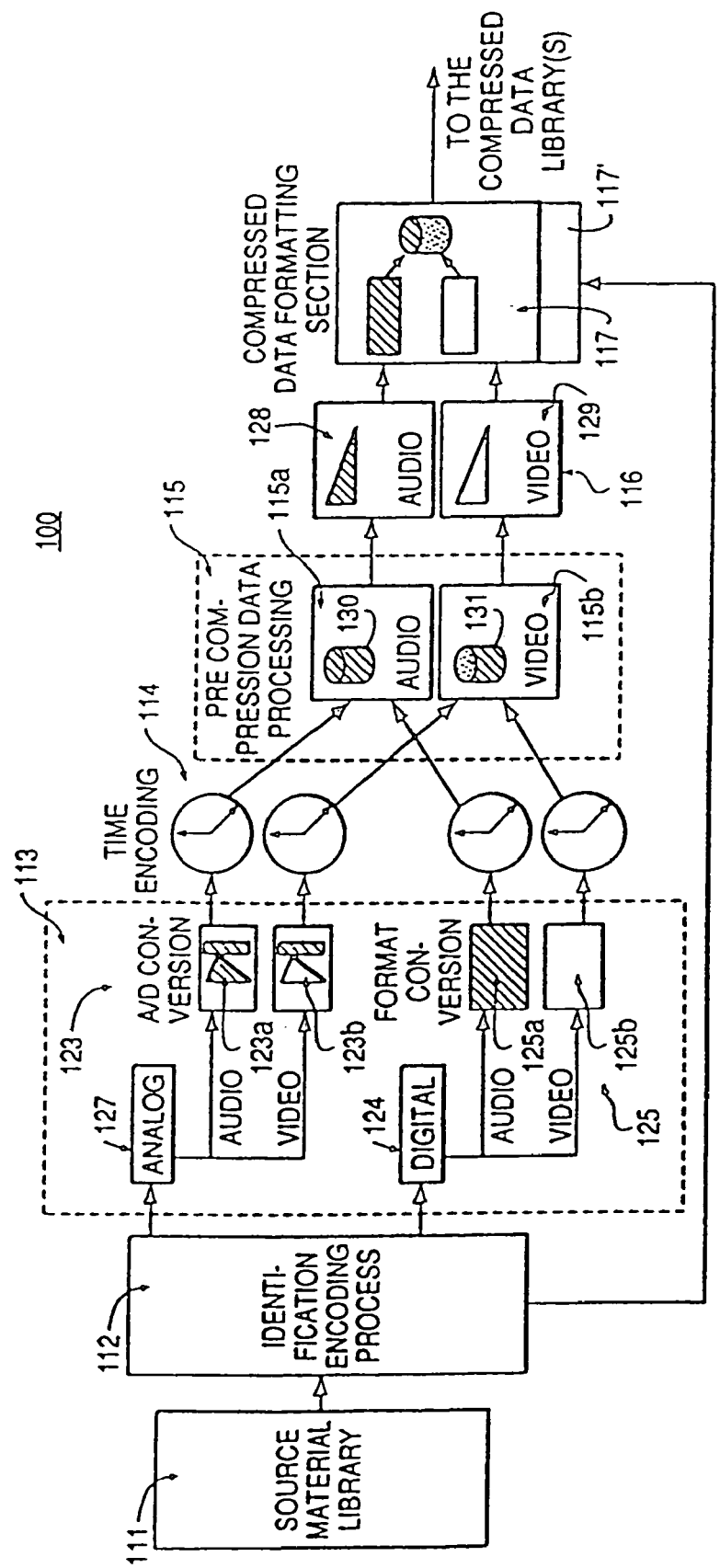
FIGS. 2*a* and 2*b* are detailed block diagrams of preferred implementations of the transmission system of the present invention.
Figure 2B:
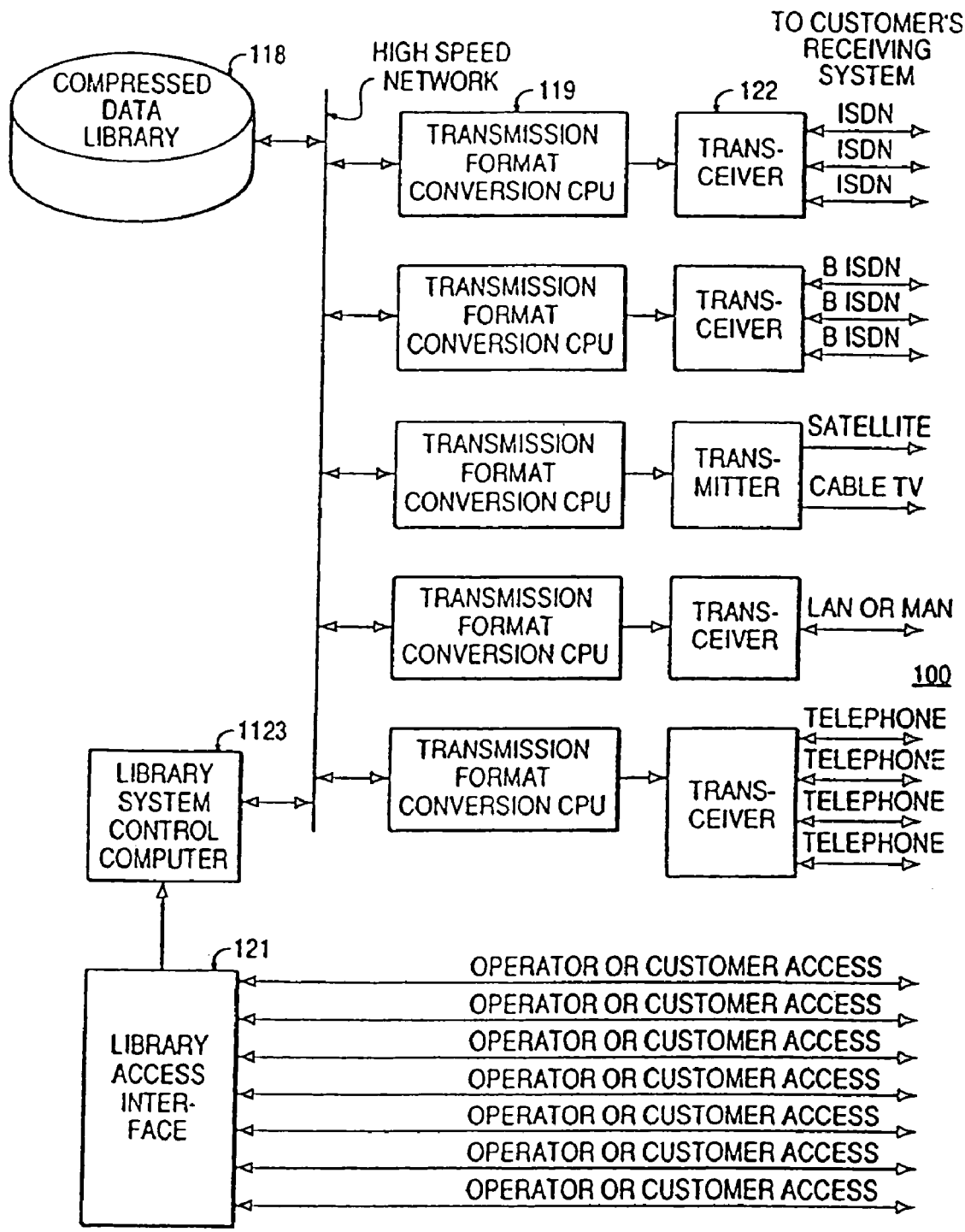

FIGS. 2a and 2b illustrate detailed block diagrams of preferred implementations of the transmission system 100 of the present invention. Transmission system 100 may either be located in one facility or may be spread over a plurality of facilities. A preferred embodiment of transmission system 100 may preferably include only some of the elements shown in FIGS. 2a and 2b.

Transmission system 100 of a preferred embodiment of the present invention preferably includes source material library means for temporary storage of items prior to conversion and storage in a compressed data library means. The items of information may include analog and digital audio and video information as well as physical objects such as books and records which require conversion to a compatible media type before converting, compressing and storing their audio and video data in the compressed data library means.

As shown in FIG. 2a, the source material library means included in transmission system 100 preferably includes a source material library 111. The source material library 111 may include different types of materials including television programs, movies, audio recordings, still pictures, files, books, computer tapes, computer disks, documents of various sorts, musical instruments, and other physical objects. These materials are converted to or recorded on a media format compatible to the digital and analog inputs of the system prior to being compressed and stored in a compressed data library 118. The different media formats preferably include digital or analog audio and video tapes, laser disks, film images, optical disks, magnetic disks, computer tapes, disks and, cartridges.

The source material library 111, according to a preferred embodiment of the present invention, may preferably include a single source material library or a plurality of source material libraries. If there are a plurality of source material libraries, they may be geographically located close together or may be located far apart. The plurality of source material libraries may communicate using methods and channels similar to the methods and channel types which libraries may employ for communication with the receiving system 200 of the user, or the source material libraries may communicate via any available method.

Prior to being made accessible to a user of the transmission and receiving system of the present invention, the item must be stored in at least one compressed data library 118, and given a unique identification code by identification encoder 112. Storage encoding, performed by identification encoder 112, aside form giving the item a unique identification code, optionally involves logging details about the item, called program notes, and assigning the item a popularity code. Storage encoding may be performed just prior to conversion of the item for transmission to reception system 200, at any time after starting the conversion process, or after storing the item in the compressed data library 118.

In a preferred embodiment of the present invention, the method of encoding the information involves assigning a unique identification code and a file address to the item, assigning a popularity code, and inputting the program notes. This process is identical for any of the different media types stored in the source material library 111.

The transmission system 100 of the present invention also preferably includes conversion means 113 for placing the items from source material library 111 into a predetermined format as formatted data. In the preferred embodiment, after identification encoding is performed by identification encoder 112, the retrieved information is placed into a predetermined format as formatted data by the converter 113. The items stored in source material library 111 and encoded by identification encoder 112 may be in either analog or digital form. Converter 113 therefore includes analog input receiver 127 and digital input receiver 124. If items have only one format, only one type of input receiver 124 or 127 is necessary.

When the information from identification encoder 112 is digital, the digital signal is input to the digital input receiver 124 where it is converted to a proper voltage. A formatter 125 sets the correct bit rates and encodes into least significant bit (lsb) first pulse code modulated (pcm) data. Formatter 125 includes digital audio formatter 125a and digital video formatter 125b. The digital audio information is input into a digital audio formatter 125a and the digital video information, if any, is input into digital video formatter 125b. Formatter 125 outputs the data in a predetermined format.

When the retrieved information from identification encoder 112 is analog, the information is input to an analog-to-digital converter 123 to convert the analog data of the retrieved information into a series of digital data bytes. Converter 123 preferably forms the digital data bytes into the same format as the output of formatter 125.

Converter 123 preferably includes an analog audio converter 123a and an analog video converter 123b. The analog audio converter 123a preferably converts the retrieved audio signal into pcm data samples at a fixed sampling rate. The analog video converter 123b preferably converts the analog video information, retrieved from identification encoder 123, into pcm data also at fixed sampling rates.

If the retrieved information being converted contains only audio information, then the audio signal is fed to the appropriate digital audio input or analog audio input. When the retrieved information contains both audio and video information, the audio and video signals are passed simultaneously to the audio and video converter inputs. Synchronization between the audio and video data can be maintained in this way.

If, for example, the retrieved information to be converted from the source material library 111 is a motion picture film, the picture frames in the film are passed through a digital telecine device to the digital input receiver 124. Format conversion is then preferably performed by digital video formatter 125b. Accompanying audio information is passed through an optical or magnetic digital playback device. This device is connected to digital audio formatter 125a.

In some cases, such as in inter-library transfers, incoming materials may be in a previously compressed form so that there is no need to perform compression by precompression processor 115 and compressors 128 and 129. In such a case, retrieved items are passed directly from identification encoder 112 to the compressed data formatter 117. The item database records, such as the program notes that may also be input from another system, to the compressed data formatting section 117, where this data, if necessary, is reformatted to make it compatible with the material stored in compressed data library 118. Such material may be received in the form of digital tapes or via existing communication channels and may preferably input directly to a short term storage 117' in the compressed data formatting section 117.

The transmission system 100 of the present invention also preferably includes ordering means for placing the formatted information into a sequence of addressable data blocks. As shown in FIG. 2a, the ordering means in the preferred embodiment includes time encoder 114. After the retrieved information is converted and formatted by the converter 113, the information may be time encoded by the time encoder 114. Time encoder 114 places the blocks of converted formatted information from converter 113 into a group of addressable blocks. The preferred addressing scheme employs time encoding. Time encoding allows realignment of the audio and video information in the compressed data formatting section 117 after separate audio and video compression processing by precompression processor 115 and compressor 116.

The converted formatted information of the requested material is then preferably in the form of a series of digital data bytes which represent frames of video data and samples of the audio data. A preferred relationship of the audio and video bytes to each other is shown in FIG. 8. Incoming signals are input and converted in sequence, starting with the first and ending with the last frame of the video data, and starting with the first and ending with the last sample of the audio data. Time encoding by time encoder 114 is achieved by assigning relative time markers to the audio and video data as it passes from the converter 113 through the time encoder 114 to the precompression processor 115. Realignment of audio and video data, system addressing of particular data byes, and user addressing of particular portions of items are all made possible through time encoding.

Through the use of the address of an item and its frame number it is possible to address any particular block of audio or video data desired. From here, further addressing down to the individual byte is possible. Frames and groups of frames may preferably be further broken down, as necessary to the individual bytes and bits, as required for certain processing within the system.

User and system addressing requirements dictate the level of granularity available to any particular section of the system. Users are able to move through data in various modes, thus moving through frame addresses at various rates. For example, a user may desire to listen to a particular song. They may preferably enter the song number either when requesting the item from the compressed data library 118 and only have that song sent to their receiving system 200 or they may preferably select that particular song from the items buffered in their receiving system 200. Internal to the system, the song is associated with a starting frame number, which was indexed by the system operator via the storage encoding process. The system item database may contain information records for individual frames or groups of frames. These can represent still frames, chapters, songs, book pages, etc. The frames are a subset of, and are contained within, the items stored in the compressed data library 118. Time encoding by time encoder 114 makes items and subsets of items retrievable and addressable throughout the transmission system 100. Time encoding enables subsequent compression of the information to be improved because data reduction processes may be performed in the time dimension. This is described in greater detail below.

The transmission system 100 of the present invention also preferably includes data compression means for compressing the formatted and sequenced data. The sequence of addressable data blocks which was time encoded and output by time encoder 114 is preferably sent to precompression processor 115. The data arriving from time encoder 114 may be at various frame rates and of various formats. Precompression processor 115 preferably includes audio precompressor 115a and video precompressor 115b.

Video precompression processor 115b buffers incoming video data and converts the aspect ratio and frame rate of the data, as required by compression processor 116. The frame buffer 131 of video precompression processor 115b holds all incoming data until the data is compressed by the data compressor 116. The incoming video data is processed for sample rate optimization, aspect ratio fitting and buffered in buffer 130 for compression processing by the video precompression processor 115b.

Video precompression processor 115b processes the incoming video data so that it fits into the aspect ratio of the transmission and receiving system of the present invention. When incoming material with a different aspect ratio than the aspect ratio of the system is selected, a chosen background is preferably placed around the inactive region of the video information. In this way, no data is lost to differences in the aspect ratio between incoming material, and the converted and compressed data stored in the transmission system 100. Images resulting from a different aspect ratio may have an inactive region where background information is contained, or may be converted into a best fit arrangement. Output from the video precompression processor 115b is stored in the frame buffer 131, which is dual ported and is directly addressable by video compressor 129.

The incoming audio data is processed for sample rate and word length optimization and is then buffered in buffer 130 for compression processing by the audio precompression processor 115a. Audio precompression processor 115a may preferably transcode incoming audio information, as required, to create the optimum sample rate and word lengths for compression processing. The output of the audio precompression processor 115a is a constant sample rate signal of a fixed word length which is buffered in frame buffer 130. The frame buffer 130 is dual ported and is directly addressable by audio compressor 128. Blocking the audio data into frames at audio precompression processor 115a makes it possible to work with the audio data as addressable packets of information.

Once precompression processing is finished, the frames are compressed by the data processor 116. Compressor 116 preferably comprises an audio data compressor 128 and a video data compressor 129. The benefits of data compression performed by data compressor 116 are shortened transmission time, faster access time, greater storage capacity, and smaller storage space requirements. Compression processing performed by compressors 128 and 129 requires multiple samples of data to perform optimum compression. Audio and video information is preferably converted into blocks of data organized in groups for compression processing by audio compressor 128 and video compressor 129, respectively. These blocks are organized as frames, and a number of frames are contained respectively in the buffers 130 and 131. By analyzing a series of frames it is possible to optimize the compression process.

Audio data is preferably compressed by audio compressor 128 by application of an adaptive differential pulse code modulation (ADPCM) process to the audio data. This compression process, which may be implemented by the apt-x 100 digital audio compression system, is manufactured by Audio Processing Technology (APT). Audio compression ratios of 8× or greater are achieved with the APT system.

Compression by compressor 116 may be performed on a group of 24 video frames may preferably be passed in sequence to the frame buffer 130 of the video precompression processor 115b where they are analyzed by video compressor 129 which performs data reduction processing on the video data. Video compression is preferably performed by video compressor 129. Video compression is achieved by the use of processors running algorithms designed to provide the greatest amount of data compression possible. Video data compression preferably involves applying two processes: a discrete cosine transform, and motion compensation. This process is described in "A Chip Set Core of Image Compression", by Artieri and Colavin. Multiple frames of video data may preferably be analyzed for patterns in the horizontal (H), vertical (V), diagonal (zigzag) and time (Z) axis. By finding repetition in the video data, redundancy may be removed and the video data may be compressed with a minimal loss of information.

In accordance with a preferred embodiment of the present invention, the transmission system 100 may further comprise compressed data storing means, coupled to the compression means, for storing as a file the compressed sequenced data with the unique identification code received from the data compression means. After compression processing by compressor 116, the compressed audio and video data is preferably formatted and placed into a single file by the compressed data storage means 117. The file may contain the compressed audio and/or video data, time markers, and the program notes. The file is addressable through the unique identification code assigned to the data by the identification encoder 112.

Further, according to the present invention, the transmission system preferably includes compressed data library means for separately storing composite formatted data blocks for each of the files. The compressed data storage means preferably includes compressed data library 118, as shown in FIG. 2b. After the data is processed into a file by the compressed data storage means 117, it is preferably stored in a compressed data library 118. In a preferred embodiment, compressed data library 118 is a network of mass storage devices connected together via a high speed network. Access to any of the files stored in compressed data library 118 is available from multiple reception systems 200 connected to the transmission and receiving system.

Stored items are preferably accessed in compressed data library 118 through a unique address code. The unique address code is a file address for uniquely identifying the compressed data items stored in the compressed data library section of a library system. This file address, combined with the frame number, and the library system address allow for complete addressability of all items stored in one or more compressed data libraries 118. Compressed data library addresses along with receiving system addresses are used to form a completely unique address for distribution system control.

The unique address code is an address assigned to the item by the system operator during storage encoding, which is preferably done prior to long term storage in the compressed data library 118. In a preferred embodiment, the unique address code is used for requesting and accessing information and items throughout the transmission and receiving system. The unique address code makes access to the requested data possible.

The storage encoding process performed by encoder 112 also allows entry of item notes and production credits. Production credits may include the title, names of the creators of the item such as the producer, director, actors, etc. Other details regarding the item which may be of interest and which may make the items more accessible are kept in an item database.

Item addresses are mapped to item names by identification encoder 112 and may preferably be used as an alternative method of accessing items. The item names are easier to remember, thus making user access more intuitive by using item names. The storage encoding entry process performed in identification encoder 112 operates a program which updates a master item database containing facts regarding items in the compressed data library system. The storage encoding process may be run by the system operator whereby the system operator accesses the master item database to track and describe items stored in one or more compressed data libraries. The names and other facts in the item database may preferably be updated at any time via the storage encoding process. Changes made to the master item database may be periodically sent to the remote order processing and item database 300.

As described in more detail later, a user may preferably access an item via its unique identification code, via its title, or the user may use other known facts for accessing an item.

The user may access items in the compressed data library 118 directly using the unique address code or the user may obtain access via the remote order processing and item database 300. Indirect access via the remote order processing and item database 300 is possible using, for example, a synthesized voice system, a query type of computer program interface, or customer assistance operators. In addition to providing interactive access to the remote order processing and item database 300, a catalog listing some or all available titles may also preferably be published. With a published catalog, users may obtain the unique address code for an item very easily thereby allowing for retrieval from the compressed data library 118 without any help from an interactive system.

To achieve user access via an interactive system, facts about the items may be kept in files as a part of the items or the facts may be kept separately, for example, by systems which only inform users of the available items and take orders. For example, in systems which have portions split in separate locations, the facts about the items may be separated from the items themselves and stored in separate files. A system of this type can distribute user orders to other portions of the transmission and receiving system for ultimate distribution to the requesting user. Further, to support a plurality of users, multiple versions of the item database may preferably reside either on multiple database servers, in catalogs, or on other computer systems.

The item database master may reside in the system control computer 1123 which may be updated and kept current to the contents of the compressed data library 118. The data stored in the item database master may be accessed by users via application programs, running on the system control computer 1123, and on the reception system 200 of the user. Users may connect to the item database via any available telecommunication channels. Copies of the item database master may be updated and informed of new entries into compressed data library 118 at periodic intervals determined by the system manager.

Other copies of the item database master may also be made available to users from the remote order processing and item database 300 which batch processes and downloads user requests to the control computer 1123 of the compressed data library 118 via standard telecommunications or high speed communication channels. Moreover, multiple remote order processing and item database 300 sites make it possible for more locations to process orders than there are library facilities, and thus make order processing more efficient.

Preferably, access of a requested item via the remote order processing and item database 300 operates as follows. If the user does not know the title of the desired item, he or she may request the item by naming other unique facts related to the item. For example, a user would be able to access an item about Tibetan Medicine by asking for all items which include information about "Tibet" and include information about "Medicine." The remote order processing and item database 300 would then be searched for all records matching this request. If there is more than one item with a match, each of the names of the matching items are preferably indicated to the user. The user then selects the item or items that he or she desires. Upon selection and confirmation, by the user, a request for transmission of a particular item or items is sent to the distribution manager program of the system control computer 1123. The request contains the address of the user, the address of the item, and optionally includes specific frame numbers, and a desired viewing time of the item.

The storage encoding process performed by identification encoder 112 also allows entry of a popularity code. The popularity code is preferably assigned on the basis of how often the corresponding item is expected to be requested from the compressed data library 118. This popularity code can be used to determine the most appropriate form of media for storage of the compressed data in a mixed media system. Mixed media systems are preferably employed as more cost effective storage in very large compressed data libraries 118. Once assigned, the popularity code may be dynamically updated, by factoring item usage against system usage. Thus, stored items are dynamically moved to the most appropriate media over their life in the compressed data library 118. If a particular item stored in compressed data library 118 is retrieved frequently by users, storage in compressed data library 118 is preferably on higher speed, more reliable, and probably more expensive media. Such media includes Winchester and magneto-optical disks.

If an item stored in compressed data library 118 is retrieved less frequently, it may be stored in the compressed data library 118 on a digital cassette tape. Examples of such cassette tapes are a Honeywell RSS-600 (Honeywell Inc. Minneapolis Minn.), Summus JukeBoxFilm and tape library (Summus Computer Systems, Houston, Tex. 800-255-9638), or equivalent cassette tapes. All items stored in the compressed data library 118 are on line and are connected to the high speed network. Thus, they may be readily accessed.

Instead of using a remote order processing and item database 300, the compressed data library 118 may include the program notes which were input by the system operator. The program notes may preferably include the title of the item stored in the compressed data library 118, chapter or song titles, running times, credits, the producer of the item, acting and production credits, etc. The program notes of an item stored in the compressed data library 118 may be thus contained within the compressed data file formed in the compressed data formatter 117.

In some cases, where multiple compressed data libraries 118 are organized, the popularity code may dictate distribution of a particular item to multiple distribution systems. In such cases, a copy of the compressed data is sent to another library and the other library can then distribute the compressed data to users concurrently with the original compressed data library 118.

The compressed data library 118 is composed of a network of storage devices connected through a High Performance Parallel Interface (HPPI) Super Controller (available from Maximum Strategy Inc., San Jose, Calif.). Therefore, multiple communication controllers may preferably access the large quantity of data stored in compressed data library 118 at very high speeds for transfer to a reception system 200 of a user upon request. For more details on this configuration see Ohrenstein, "Supercomputers Seek High Throughput and Expandable Storage", Computer Technology Review, pp. 33-39 April 1990.

The use of an HPPI controller allows file placement onto multiple mass storage devices of the compressed data library 118 with a minimum of overhead. Database management software controls the location and tracking of the compressed data library 118 which can be located across multiple clusters of file servers connected together by one or more high speed networks over multiple systems.

The transmission system 100 of the present invention may also preferably include library access/interface means for receiving transmission requests to transmit items and for retrieving formatted data blocks stored in the compressed data library 118 corresponding to the requests from users. The compressed audio and/or video data blocks, along with any of the information about the item stored in the compressed data library 118 may be accessed via library access interface 121.

The library access interface 121 receives transmission requests either directly from the users or indirectly by remote order processing and item database 300. The transmission format means 119 receives the request and retrieves the composite formatted data block of the requested item stored in compressed data library 118 and converts the compressed formatted data block into a format suitable for transmission. The requested item is then sent to the user via the transmitter 122 or directly via interface 121.

In a preferred embodiment of the present invention, customer access of an item stored in compressed data library 118 via the library access interface 121 may be performed in various ways. The methods of requesting a stored item are analogous to making an airline reservation or transferring funds between bank accounts. Just as there are different methods available for these processes it is desirable to have several ordering methods available to the users of the system of the present invention. For example, telephone tone decoders and voice response hardware may be employed. Additionally, operator assisted service or user terminal interfaces may be used.

Customer access via telephone tone decoders and voice response hardware is completely electronic and may preferably be performed between a system user and a computer order entry system. The user may obtain help in ordering an item from a computer synthesized voice. With such an access method, the user will normally be accessing a dynamic catalog to assist them. Confirmation of selections and pricing information may preferably be given to the user prior to completion of the transaction.

This process of access, performed by remote order processing and item database configuration 300, shown in FIG. 1c, preferably includes the following steps, shown in flowchart 3000 of FIG. 3. First, the user calls the system access number (step 3010). Upon successfully dialing the system access number, the user receives instructions from the system (step 3020). The instructions may preferably include steps the user must take in order to place an order. Preferably, the instructions may be bypassed by the experienced user who knows how to place an order.

The user then enters a customer ID code by which the system accesses the user's account, and indicates to the system that the user is a subscriber of the system (step 3030). In response to the user entering his ID code in step 3030 the system confirms whether the user is in good standing (step 3040). If the user is in good standing, the system queues the user to input his request (step 3050).

The user request may preferably be made from a catalog sent to each of the subscribers of the system. The user will preferably identify his choice and enter the corresponding identification code of the item (step 3060). The system then preferably confirms the selection that the user has made and informs the user of the price of the selection (step 3070).

The user then indicates whether the confirmation performed in step 3070 is correct (step 3080). If the confirmation performed in step 3070 is correct, the user so indicates and then inputs a desired delivery time and delivery location (step 3090).

If the confirmation performed in step 3070 does not result in the selection desired by the user, the user re-inputs the item identification code in step 3060 and the confirmation steps 3070 and 3080 are repeated. Therefore, proper selection of the selected item is insured. Once there is confirmation, the user enters the playback time and destination in step 3090.

The user then preferably confirms that the order is correct (step 3100). The confirmation performed in step 3100 includes confirmation of the entire transaction including the selected item, the selected time of playback, and the location of playback. The transaction is then completed and the request is placed on a transmission queue at the appropriate compressed data library 118 (step 3110).

Access by the users via operator assisted service includes telephone operators who answer calls from the users. The operators can sign up new customers, take orders, and help with any billing problems. The operators will preferably have computer terminals which give them access to account information and available program information. Operators can also assist a user who does not know a title by looking up information stored in files which may contain the program notes, as described above. Once the chosen program is identified, the operator informs the user of the price. After the user confirms the order, the user indicates the desired delivery time and destination. The operator then enters the user request into the system. The request is placed in the transmission queue.

Access by a user terminal interface method provides the user with access from various terminals including personal computers, and specialized interfaces built into the reception system 200 for the user. Such access allows a user to do a search of available programs from a computer screen. This process involves the steps 4000 shown in FIG. 4.

Figure 4:
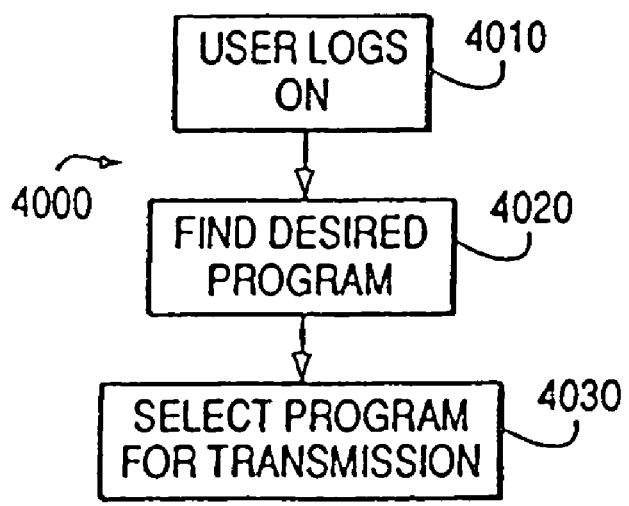
FIG. 4 is a flowchart of a preferred method of user request via a user interface of the present invention.

FIG. 4 is a flowchart of a preferred method of user request via a user interface of the present invention. In the preferred method of FIG. 4, the user first logs onto the user terminal interface (step 4010). After the user logs on, the user may preferably select a desired item by searching the database of available titles in the library system control computer 1123 or any remote order processing and item database 300 (step 4020). The search may preferably be performed using the database containing the program notes, described above with respect to FIGS. 2a and 2b. It is possible to process orders and operate a database of available titles at multiple locations remote of the source material library 111. Users and order processing operators may preferably access such remote systems and may place transmission requests from these systems. Orders placed on these systems will be processed and distributed to the appropriate libraries. After the desired item is found, the user selects the item for transmission at a specific time and location (step 4030).

To complete an order, the remote order processing and item database 300 preferably connects to the compressed data library 118 of choice via the library access interface 121 and communicates with the library system control computer 1123. Preferably the user's account ID, identification of the item for transmission and the chosen destination for the item are communicated. Through employment of distributed order processing systems of this type many orders may be processed with minimal library overhead.

All transmission requests from the access methods are placed into a transmission queue managed by the library system control computer 1123. This queue is managed by a program that controls the distribution of the requested items to the reception system 200 of the user. The queue manager program also operates in the system control computer and keeps track of the user ID, the chosen program and price, the user channel type, the number of requests for a given program, the latest delivery time, and the compressed data library media type (for example, high speed or low speed). From this information, the queue manager program makes best use of the available distribution channels and media for efficient transmission and storage of the requested items.

The queue manager program also manages the file transmission process for multiple requests for a single file, stored in the compressed data library 118. During a given time period, the queue manager program will optimize access to the compressed data library 118, wherever possible it will place the data on multiple outputs for simultaneous transmission to more than one requesting user.

The conversion performed by transmission data converter 119 encodes the data for the transmission channel. The transmission data converter transfers the desired segments of data from the compressed data library 118 onto the communication channel which is used to deliver the data to the reception system 200.

The transmission system 100 of the present invention preferably further includes transmitter means 122, coupled to the compressed data library 118, for sending at least a portion of a specific file to at least one remote location. The transmission and receiving system of the present invention preferably operates with any available communication channels. Each channel type is accessed through the use of a communications adaptor board or processor connecting the data processed in the transmission format converter 119 to the transmission channel.

A preferred embodiment of the present invention also includes means by which to access users via common access lines. These may include standard telephone, ISDN or B-ISDN, microwave, DBS, cable television systems, MAN, high speed modems, or communication couplers. Metropolitan Area Networks (MANs) which are common carrier or private communication channels are designed to link sites in a region. MANs are described by Morreale and Campbell in "Metropolitan-area networks" (IEEE Spectrum, May 1990 pp. 40-42). The communication lines are used to transmit the compressed data at rates up to, typically, 10 Mb/sec.

In order to serve a multitude of channel types, a preferred embodiment of the present invention includes a multitude of output ports of each type connected to one or more computers on the transmission and receiving system. The management of transmission is then distributed. That is, the computer controlling the transmission queue tells the transmission encoding computer its task and then the task is executed by the transmission encoding computer, independent of the transmission queue computer. The transmission queue computer provides the data for transmission by the file server which also distributes to other transmitters located in the same or other transmission encoding computers.

Figure 5:
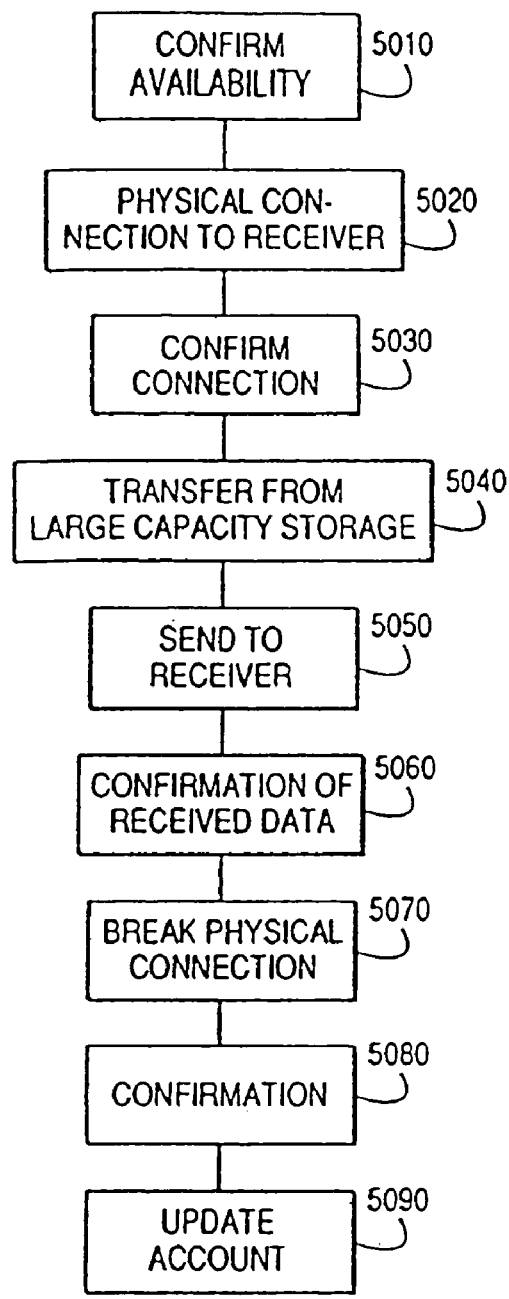
FIG. 5 is a flowchart of a preferred method of implementing a queue manager program of the present invention.

FIG. 5 is a flowchart of a preferred method of implementing a queue manager program of the present invention. The queue manager program, in the distribution process, preferably confirms availability of an item from the compressed data library 118 and logically connects the item stored in compressed data library 118 to the communications controller, illustrated in FIG. 2a (step 5010). After availability is confirmed in step 5010, the data awaits transmission by the transmitter 122.

After availability is confirmed in step 5010, the communications controller preferably makes the physical connection to the reception system 200 of the user (step 5020). This is normally done by dialing the receiving device of the user. The reception system 200 preferably answers the incoming call and confirms the connection (step 5030).

Once connected to the reception system 200, in steps 5020 and 5030, the data stored in compressed data library 118 is preferably transferred in data blocks from the compressed data library 118 to the communications controller (step 5040). The data blocks are buffered by the communications controller. The buffered data is sent down the communications channel to the reception system 200 by transmitter 122 (step 5050).

The transmitter 122 places the formatted data onto the communications channel. This is an electrical conversion section and the output depends upon the chosen communication path. The signal is sent to the reception system 200 in either a two way or a one way communication process. In a standard telephone connection, the transmitter 122 is preferably a modem. When using an ISDN channel, the transmitter 122 is preferably a data coupler.

In a preferred embodiment of the present invention, many forms of communication channels may be employed. Distribution of information is by common carrier communication channels whenever possible. These channels include common telephone service, ISDN and Broadband ISDN, DBS, cable television systems, microwave, and MAN.

In order that reception is performed efficiently, the reception system 200 confirms reception of the initial data block before receiving the remaining data blocks whenever possible (step 5060). After all data blocks have been received and reception is confirmed, the communications controller breaks the physical connection to the reception system 200 (step 5070). Then, confirmation of the transmission is sent to the queue manager (step 5080). Finally, the queue manager updates the list and sends the information to the billing program, which updates the account of the user (step 5090).

When item distribution occurs through a broadcasting method such as a communications satellite, the process is one way, with ongoing reception not being confirmed by the reception system 200. In these situations, some further redundancy is included by transmission formatter 122 with the data blocks for error correction processing to be performed in the reception system 200. In such one way communication situations, the queue manager program running in library system control computer 1123 confirms reception, via telephone line connection for example, to the reception system 200 after distribution. This should occur prior to updating the user's account and the dispatch lists.

The real time output signals are output to a playback system such as an audio amplifier and/or television. This output may also be sent to an audio/video recorder for more permanent storage. Moreover, in the preferred embodiment only non-copy protected data can be recorded on an audio/video recorder. Any material which is copy protected will be scrambled at the video output in a way which makes it viewable on a standard audio/video receiver but does not allow for recording of the material.

The reception system 200 has playback controls similar to the controls available on a standard audio/video recorder. These include: play, fast forward, rewind, stop, pause, and play slow. Since items are preferably stored on random access media, the fast forward and rewinding functions are simulations of the actual events which occur on a standard audio/video recorder. Frames do not tear as on an audio/video recorder, but in fast play modes they go by very quickly.

The library access interface 121 in the reception system 200 preferably includes a title window where a list of available titles are alphabetically listed. This window has two modes: local listing of material contained within the library system control computer 1123, and library listing for all available titles which may be received from the available, remotely accessible libraries. The titles listed in this window are sent from the database on the library system control computer 1123 or the remote order processing and item database 300.

The system may also preferably include dispatching control software which receives input from the remote order processing and item database 300 and sends distribution requests to the distribution systems. In instances where not all items are contained in each of the compressed data libraries 118, the dispatching software will keep a list of the available titles in a particular compressed data library 118. The dispatch software may also preferably coordinate network traffic, source material library 111 utilization, source material library 111 contents, and connection costs. By proper factoring of these variables, efficient use of the available distribution channels may be achieved.

Figure 6:
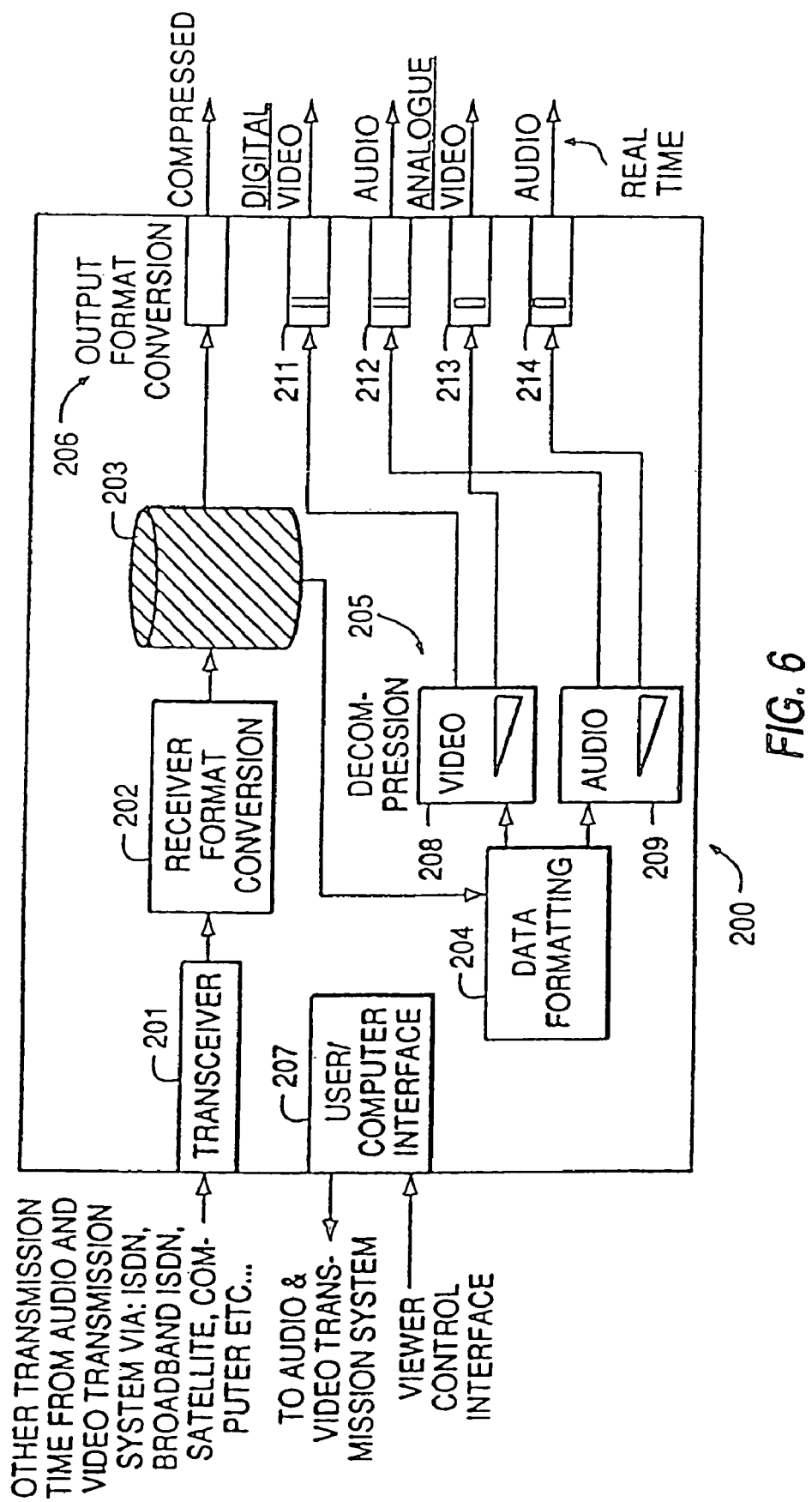
FIG. 6 is a block diagram of a preferred implementation of the receiving system of the present invention.

FIG. 6 illustrates a block diagram of a preferred implementation of the reception system 200 according to the present invention. The reception system 200 is responsive to user requests for information stored in source material library 111. The reception system 200 includes transceiver 201 which receives the audio and/or video information transmitted by transmitter 122 of the transmission system 100. The transceiver 201 automatically receives the information from the transmitter 122 as compressed formatted data blocks.

The transceiver 201 is preferably connected to receiver format converter 202. The receiver format converter 202 converts the compressed formatted data blocks into a format suitable for playback by the user in real time.

In the reception system 200 of the present invention, the user may want to play back the requested item from the source material library 111 at a time later than when initially requested. If that is the case, the compressed formatted data blocks from receiver format converter 202 are stored in storage 203. Storage 203 allows for temporary storage of the requested item until playback is requested.

When playback is requested, the compressed formatted data blocks are sent to data formatter 204. Data formatter 204 processes the compressed formatted data blocks and distinguishes audio information from video information.

The separated audio and video information are respectively decompressed by audio decompressor 209 and video decompressor 208. The decompressed video data is then sent simultaneously to digital video output converter 211 and analog video output converter 213. The decompressed audio data is sent simultaneously to digital audio output converter 212 and analog audio output converter 214. The outputs from converters 211-214 are produced in real time.

The real time output signals are output to a playback system such as a TV or audio amplifier. They may also be sent to an audio/video recorder of the user. By using the reception system 200 of the present invention, the user may utilize the stop, pause, and multiple viewing functions of the receiving device. Moreover, in a preferred embodiment of the present invention, the output format converters may be connected to a recorder which enables the user to record the requested item for future multiple playbacks.

Figure 7:
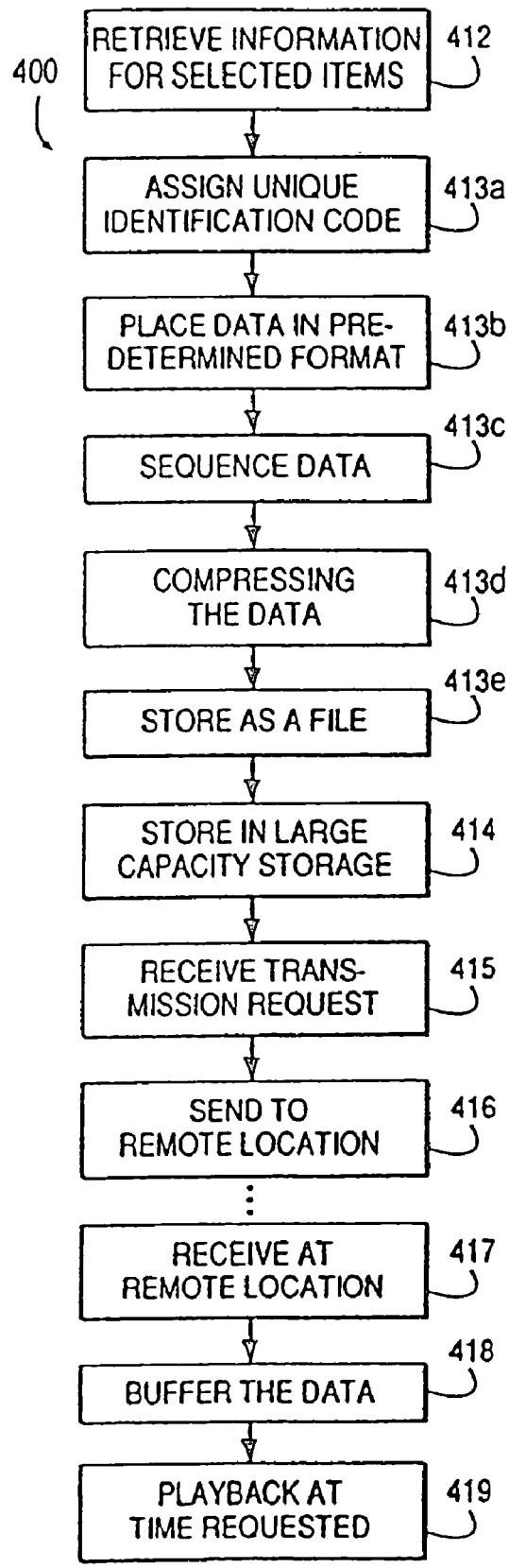
FIG. 7 is a flowchart of a preferred method of distribution of the present invention.

FIG. 7 is a flow chart 400 of a preferred method of distribution of the present invention. The distribution method is preferably responsive to requests identifying information to be sent from the transmission system 100 to remote locations. Method 400 assumes that the items have already been stored in compressed data library 118.

As illustrated in FIG. 7, the first step of the distribution method 400 involves retrieving the information for selected items in the source material library 111, upon a request by a user of the distribution system (step 412). This is analogous to taking books off of a shelf at the local public library after the person has decided that he or she would like to read them.

After the information for the selected items is retrieved in step 412, the distribution method 400 of the present invention further comprises the step of processing the information for efficient transfer (step 413). The processing performed in step 413 preferably includes assigning a unique identification code to the retrieved information performed by identification encoder 112, shown and described with respect to FIG. 2a (step 413a). The processing also preferably includes placing the retrieved information into a predetermined format as formatted data by converter 113 (step 413b), and placing the formatted data into a sequence of addressable data blocks by ordering means 114 (step 413c).

Processing step 413 also includes compressing the formatted and sequenced data performed by data compressor 116 (step 413d), and storing as a file the compressed sequenced data received from the data compression means with the unique identification assigned by the identification encoding means (step 413e).

After the information is processed for efficient transfer, in substeps 413a-e of step 413, the distribution method 400 of the present invention preferably includes the step of storing the processed information is stored in a compressed data library (step 414). Preferably, the compressed data library is analogous to compressed data library 118, described with respect to FIG. 2a.

After the information is stored in a compressed data library 118, the transmission and receiving system preferably waits to receive a transmission request (step 415). Upon receiving a transmission request, from transmission system 100, the compressed formatted data is preferably converted for output to a reception system 200, selected by the user. The information is preferably transmitted over an existing communication channel to a reception system 200, and is received by that system (step 417). When the information is received in step 417, it is preferably formatted for the particular type of reception system 200 to which the information is sent.

The received information is preferably buffered (step 418) by a storage means analogous to element 203 shown in FIG. 3. The information is preferably buffered so that it may be stored by the user for possible future viewings. The requested information is then played back to the reception system 200 of the user at the time requested by the user (step 419).

Figure 8E:
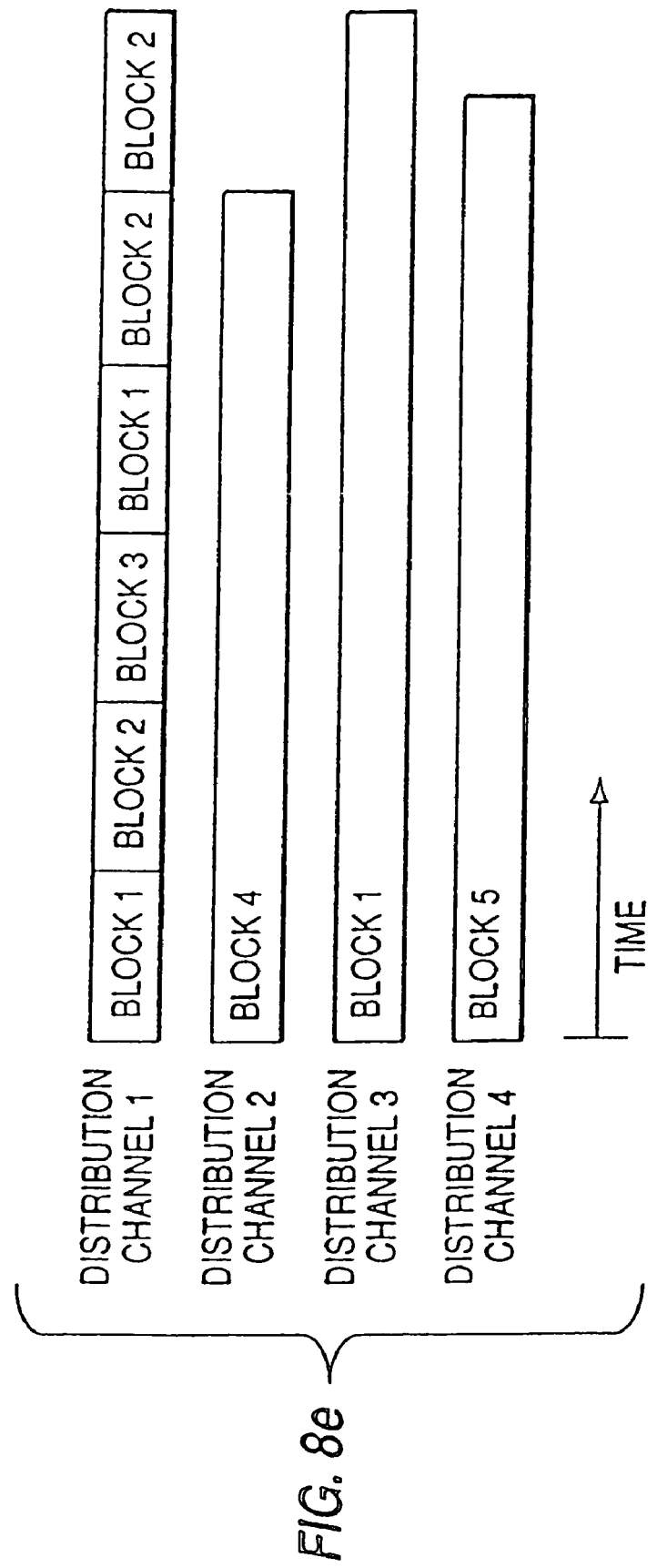

FIGS. 8a-8e are block diagrams of preferred implementations of data structures and data blocking for items in the audio and video distribution system. FIG. 8a shows the block structure of video data where a video frame 812 is composed of a plurality of video samples 811, and a second of video 813 is composed of a plurality of video frames 812.

FIG. 8b shows the block structure of audio data where an audio data frame 822 is composed of a plurality of audio samples 821, and a second of audio 823 is composed of a plurality of audio data frames 822. FIG. 8c shows the block structure of a data frame 832 composed of a plurality of data bytes 831. The combination of the audio frames 812, video frames 822, and data frames 832 comprise the elements of a single item. FIG. 8d shows a block representation of for three illustrative items which may be stored in the source material library 111. Each of items 1-3 contains its own arrangement of video frames 812, audio frames 822, and data frames 832.

FIG. 8e shows methods of distribution to reception systems 200 with both multiplexed and non-multiplexed signal paths, both addressed and non-addressed blocks of items. A block of an item may be an entire item or, alternatively, may be only a portion of an item, as selected by a user. Further, the blocks may be composed of either compressed, partially compressed, or fully decompressed data, as required by the configuration of the reception system 200.

As shown in FIG. 8e, the same block, for example, block 1, may be simultaneously transmitted over different distribution channels. The blocks when transmitted over one of the distribution channels may have receiver addresses appended to the blocks or the reception system 200 may have been preconfigured to receive the blocks comprising data frames for particular items from the active distribution channel.

Other embodiments of the invention will be apparent to those skilled in the art from consideration of the specification and practice of the invention disclosed herein. It is intended that the specification and examples be considered as exemplary only, with the true scope and spirit of the invention being indicated by the following claims.

What is claimed is:

1. A method of obtaining data blocks comprising compressed digital audiovisual information transmitted via satellite on a multiplexed distribution channel to a remotely located user reception system, comprising:

accessing an item database containing items of factual information, each item of factual information being associated with a corresponding item comprising compressed digital audiovisual data blocks, via a user terminal interface including a screen for presentation of a plurality of the items of factual information at the user location;

selecting one of the items comprising compressed digital audiovisual data blocks from the multiplexed distribution channel by preconfiguring the user reception system;

receiving via satellite at the user reception system, a signal from the multiplexed distribution channel comprising a plurality of items of audiovisual information, including the selected item, wherein at least some of the received compressed digital audiovisual data blocks of the selected item are addressable by first relative time markers assigned to audio information and at least some of the received compressed digital audiovisual data blocks are addressable by second relative time markers assigned to video information, the first relative time markers and the second relative time markers allowing for realignment of the audio information and the video information;

separating audio information from video information in the selected item received via satellite at the user reception system;

decompressing the audio information using an audio decompressor of the user reception system and decompressing the video information using a video decompressor of the user reception system;

converting the decompressed audio information and video information into a format suitable for playback; and transmitting information of receipt of the selected item via a telephone network.

2. The method of claim 1, wherein the compressed digital audiovisual data blocks are organized into frames.

3. The method of claim 1, wherein the video information was compressed using a compression technique comprising discrete cosine transform and motion compensation.

4. The method of claim 1, wherein at least a portion of the selected item is copy protected.

5. The method of claim 1, wherein the selected item includes redundancy.

6. The method of claim 1, wherein the selected item is converted for playback on a television.

7. The method of claim 1, further comprising playing the decompressed audio information and the decompressed video information on a playback device.

8. The method of claim 1, further comprising recording the decompressed audiovisual information of the selected comprising audiovisual information.

9. The method of claim 1, further comprising buffering some of the received selected item and decompressing a remainder of the received selected item for immediate viewing as the remainder of the received selected item is received.

10. The method of claim 1, wherein the item database is accessed via an application running on the reception system.

11. The method of claim 1, further comprising decompressing the audio information and the video information separately.

12. The method of claim 1, wherein the information of receipt of the selected item comprises a confirmation of receipt of the selected item.

\* \* \* \* \*

UNITED STATES PATENT AND TRADEMARK OFFICE
CERTIFICATE OF CORRECTION

PATENT NO. : 7,730,512 B2  Page 1 of 2
APPLICATION NO. : 11/414699
DATED : June 1, 2010
INVENTOR(S) : Paul Yurt et al.

It is certified that error appears in the above-identified patent and that said Letters Patent is hereby corrected as shown below:

Title Page 5, Column 2:
Line 11: change "Jull" to -- Jul. --; and
Line 40: change "99 201 346.63-2223" to -- 99 201 346.6-2223 --.

Title Page 6, Column 2:
Line 48: change "Exhibit." to -- Exhibit B, --; and
Lines 56 and 61: change "U.S.0" to -- U.S.C. --.

Title Page 7, Column 2:
Line 45: after "magnified" insert -- copy of --.

Title Page 8, Column 1:
Line 32: change "Resequnecing" to -- Resequencing --.

Title Page 8, Column 2:
Line 22: change "Netorks" to -- Networks --; and
Line 44: change "CCII" to -- CCIII --.

Title Page 9, Column 1:
Line 37: change "Techincal" to -- Technical --.

Title Page 13, Column 2:
Line 38: change "Margara" to -- Magara --.

Title Page 15, Column 1:
Line 19: change "Techincal" to -- Technical --.

Title Page 16, Column 1:
Line 61: change "151" to -- ISI --.

Title Page 16, Column 2:
Line 11: change "Videocommunciation" to -- Videocommunication --.

Signed and Sealed this

Twenty-fourth Day of August, 2010

David J. Kappos
*Director of the United States Patent and Trademark Office*

CERTIFICATE OF CORRECTION (continued)
U.S. Pat. No. 7,730,512 B2

Title Page 17, Column 1:
Line 20: change "IDGGI/I" to -- IDGG/I --.

Title Page 17, Column 2:
Line 16: change "(INS)" to -- (IHS) --; and
Line 49: change "IDGGI/" to -- IDGG/I --.